US00RE49990E

(19) United States
(12) Reissued Patent
Shivadas et al.

(10) Patent Number: US RE49,990 E
(45) **Date of Reissued Patent: *May 28, 2024**

(54) USE OF OBJECTIVE QUALITY MEASURES OF STREAMED CONTENT TO REDUCE STREAMING BANDWIDTH

(71) Applicant: DIVX, LLC, San Diego, CA (US)

(72) Inventors: Abhishek Shivadas, San Diego, CA (US); William David Amidei, San Diego, CA (US)

(73) Assignee: DIVX, LLC, San Diego, CA (US)

( * ) Notice: This patent is subject to a terminal disclaimer.

(21) Appl. No.: 17/485,109

(22) Filed: Sep. 24, 2021

Related U.S. Patent Documents

Reissue of:
(64) Patent No.: 9,313,510
Issued: Apr. 12, 2016
Appl. No.: 13/731,949
Filed: Dec. 31, 2012

U.S. Applications:
(63) Continuation of application No. 15/950,950, filed on Apr. 11, 2018, now Pat. No. Re. 48,761, which is an application for the reissue of Pat. No. 9,313,510.

(51) Int. Cl.
*H04N 19/177* (2014.01)
*H04N 19/102* (2014.01)
(Continued)

(52) U.S. Cl.
CPC ..... *H04N 19/177* (2014.11); *H04N 19/102* (2014.11); *H04N 19/154* (2014.11); *H04N 19/164* (2014.11); *H04N 19/46* (2014.11)

(58) Field of Classification Search
CPC .. H04N 19/102; H04N 19/154; H04N 19/164; H04N 19/177; H04N 19/46
See application file for complete search history.

(56) References Cited

U.S. PATENT DOCUMENTS 3,609,227 A 9/1971 Kuljian
4,009,331 A 2/1977 Goldmark et al.
(Continued)

FOREIGN PATENT DOCUMENTS

AU 2010203605 B2 5/2015
CA 2237293 A1 7/1997
(Continued)

OTHER PUBLICATIONS

3GPP TS 26.247, V10.1.0, 3rd Generation Partnership Project; Technical Specification Group Services and System Aspects Transparent end-to-end Packet-switches Streaming Services (PSS); Nov. 2011, 112 pages.
(Continued)

*Primary Examiner* — Woo H Choi
(74) *Attorney, Agent, or Firm* — KPPB LLP

(57) ABSTRACT

A method includes encoding video at a first bitrate to produce first encoded sections, and at a second bitrate that is less than the first bitrate to produce second encoded sections. The method further includes measuring levels of objective quality, indicative of perceptual quality, of the first and second encoded sections. The method includes determining, based on the measured objective quality levels, replaceable sections among the first encoded sections, and replacement sections among the second encoded sections, each of the replacement sections to replace a corresponding one of the replaceable sections. The method includes streaming the first encoded sections except for the replaceable sections, and the replacement sections instead of their corresponding replaceable sections.

11 Claims, 13 Drawing Sheets

(51) Int. Cl.

| | |
|---|---|
| ***H04N 19/154*** | (2014.01) |
| ***H04N 19/164*** | (2014.01) |
| ***H04N 19/46*** | (2014.01) |

(56) References Cited

U.S. PATENT DOCUMENTS

| | | | |
|---|---|---|---|
| 4,694,357 | A | 9/1987 | Rahman et al. |
| 4,802,170 | A | 1/1989 | Trottier |
| 4,964,069 | A | 10/1990 | Ely |
| 5,119,474 | A | 6/1992 | Beitel et al. |
| 5,132,992 | A | 7/1992 | Yurt et al. |
| 5,274,758 | A | 12/1993 | Beitel et al. |
| 5,341,474 | A | 8/1994 | Gelman et al. |
| 5,361,332 | A | 11/1994 | Yoshida et al. |
| 5,396,497 | A | 3/1995 | Veltman |
| 5,400,401 | A | 3/1995 | Wasilewski et al. |
| 5,404,436 | A | 4/1995 | Hamilton |
| 5,420,801 | A | 5/1995 | Dockter et al. |
| 5,420,974 | A | 5/1995 | Morris et al. |
| 5,471,576 | A | 11/1995 | Yee |
| 5,477,263 | A | 12/1995 | Ocallaghan et al. |
| 5,479,303 | A | 12/1995 | Suzuki et al. |
| 5,487,167 | A | 1/1996 | Dinallo et al. |
| 5,502,766 | A | 3/1996 | Boebert et al. |
| 5,509,070 | A | 4/1996 | Schull |
| 5,533,021 | A | 7/1996 | Branstad et al. |
| 5,537,408 | A | 7/1996 | Branstad et al. |
| 5,539,908 | A | 7/1996 | Chen et al. |
| 5,541,662 | A | 7/1996 | Adams et al. |
| 5,544,318 | A | 8/1996 | Schmitz et al. |
| 5,550,863 | A | 8/1996 | Yurt et al. |
| 5,574,785 | A | 11/1996 | Ueno et al. |
| 5,583,652 | A | 12/1996 | Ware |
| 5,589,993 | A | 12/1996 | Naimpally et al. |
| 5,600,721 | A | 2/1997 | Kitazato |
| 5,614,940 | A | 3/1997 | Cobbley et al. |
| 5,621,794 | A | 4/1997 | Matsuda et al. |
| 5,627,936 | A | 5/1997 | Prasad |
| 5,630,005 | A | 5/1997 | Ort |
| 5,633,472 | A | 5/1997 | DeWitt et al. |
| 5,642,171 | A | 6/1997 | Baumgartner et al. |
| 5,642,338 | A | 6/1997 | Fukushima et al. |
| 5,655,117 | A | 8/1997 | Goldberg et al. |
| 5,664,044 | A | 9/1997 | Ware |
| 5,675,382 | A | 10/1997 | Bauchspies |
| 5,675,511 | A | 10/1997 | Prasad et al. |
| 5,684,542 | A | 11/1997 | Tsukagoshi |
| 5,715,403 | A | 2/1998 | Stefik |
| 5,717,816 | A | 2/1998 | Boyce et al. |
| 5,719,786 | A | 2/1998 | Nelson et al. |
| 5,745,643 | A | 4/1998 | Mishina |
| 5,751,280 | A | 5/1998 | Abbott |
| 5,751,358 | A | 5/1998 | Suzuki et al. |
| 5,754,648 | A | 5/1998 | Ryan et al. |
| 5,757,968 | A | 5/1998 | Ando |
| 5,761,417 | A | 6/1998 | Henley et al. |
| 5,763,800 | A | 6/1998 | Rossum et al. |
| 5,765,164 | A | 6/1998 | Prasad et al. |
| 5,794,018 | A | 8/1998 | Vrvilo et al. |
| 5,805,700 | A | 9/1998 | Nardone et al. |
| 5,813,010 | A | 9/1998 | Kurano et al. |
| 5,819,160 | A | 10/1998 | Foladare et al. |
| 5,822,524 | A | 10/1998 | Chen et al. |
| 5,828,370 | A | 10/1998 | Moeller et al. |
| 5,838,791 | A | 11/1998 | Torii et al. |
| 5,841,432 | A | 11/1998 | Carmel et al. |
| 5,844,575 | A | 12/1998 | Reid |
| 5,848,217 | A | 12/1998 | Tsukagoshi et al. |
| 5,852,664 | A | 12/1998 | Iverson et al. |
| 5,854,873 | A | 12/1998 | Mori et al. |
| 5,867,625 | A | 2/1999 | McLaren |
| 5,874,986 | A | 2/1999 | Gibbon et al. |
| 5,878,135 | A | 3/1999 | Blatter et al. |
| 5,887,110 | A | 3/1999 | Sakamoto et al. |
| 5,892,900 | A | 4/1999 | Ginter et al. |
| 5,892,915 | A | 4/1999 | Duso et al. |
| 5,903,261 | A | 5/1999 | Walsh et al. |
| 5,907,597 | A | 5/1999 | Mark |
| 5,907,658 | A | 5/1999 | Murase et al. |
| 5,923,869 | A | 7/1999 | Kashiwagi et al. |
| 5,946,446 | A | 8/1999 | Yanagihara |
| 5,956,729 | A | 9/1999 | Goetz et al. |
| 5,959,690 | A | 9/1999 | Toebes, VIII et al. |
| 5,970,147 | A | 10/1999 | Davis |
| 5,973,679 | A | 10/1999 | Abbott et al. |
| 5,999,812 | A | 12/1999 | Himsworth |
| 6,002,834 | A | 12/1999 | Hirabayashi et al. |
| 6,009,237 | A | 12/1999 | Hirabayashi et al. |
| 6,016,381 | A | 1/2000 | Taira et al. |
| 6,031,622 | A | 2/2000 | Ristow et al. |
| 6,038,257 | A | 3/2000 | Brusewitz et al. |
| 6,038,316 | A | 3/2000 | Dwork et al. |
| 6,044,469 | A | 3/2000 | Horstmann |
| 6,046,778 | A | 4/2000 | Nonomura et al. |
| 6,047,100 | A | 4/2000 | McLaren |
| 6,057,832 | A | 5/2000 | Lev et al. |
| 6,058,240 | A | 5/2000 | McLaren |
| 6,064,794 | A | 5/2000 | McLaren et al. |
| 6,065,050 | A | 5/2000 | DeMoney |
| 6,018,611 | A | 6/2000 | Nogami et al. |
| 6,079,566 | A | 6/2000 | Eleftheriadis et al. |
| 6,097,877 | A | 8/2000 | Katayama et al. |
| 6,108,422 | A | 8/2000 | Newby et al. |
| 6,141,754 | A | 10/2000 | Choy |
| 6,151,634 | A | 11/2000 | Glaser et al. |
| 6,155,840 | A | 12/2000 | Sallette |
| 6,169,242 | B1 | 1/2001 | Fay et al. |
| 6,175,921 | B1 | 1/2001 | Rosen |
| 6,192,075 | B1 | 2/2001 | Jeng et al. |
| 6,195,388 | B1 | 2/2001 | Choi et al. |
| 6,199,107 | B1 | 3/2001 | Dujari |
| 6,204,883 | B1 | 3/2001 | Tsukagoshi |
| 6,222,981 | B1 | 4/2001 | Rijckaert |
| 6,266,483 | B1 | 7/2001 | Okada et al. |
| 6,282,320 | B1 | 8/2001 | Hasegawa et al. |
| 6,282,653 | B1 | 8/2001 | Berstis et al. |
| 6,289,450 | B1 | 9/2001 | Pensak et al. |
| 6,292,621 | B1 | 9/2001 | Tanaka et al. |
| 6,308,005 | B1 | 10/2001 | Ando et al. |
| 6,320,905 | B1 | 11/2001 | Konstantinides |
| 6,330,286 | B1 | 12/2001 | Lyons et al. |
| 6,347,145 | B2 | 2/2002 | Kato et al. |
| 6,351,538 | B1 | 2/2002 | Uz |
| 6,373,803 | B2 | 4/2002 | Ando et al. |
| 6,374,144 | B1 | 4/2002 | Viviani et al. |
| 6,389,218 | B2 | 5/2002 | Gordon et al. |
| 6,389,473 | B1 | 5/2002 | Carmel et al. |
| 6,395,969 | B1 | 5/2002 | Fuhrer |
| 6,397,230 | B1 | 5/2002 | Carmel et al. |
| 6,415,031 | B1 | 7/2002 | Colligan et al. |
| 6,418,270 | B1 | 7/2002 | Steenhof et al. |
| 6,441,754 | B1 | 8/2002 | Wang et al. |
| 6,445,877 | B1 | 9/2002 | Okada et al. |
| 6,449,719 | B1 | 9/2002 | Baker |
| 6,453,115 | B1 | 9/2002 | Boyle |
| 6,453,116 | B1 | 9/2002 | Ando et al. |
| 6,466,671 | B1 | 10/2002 | Maillard et al. |
| 6,466,733 | B1 | 10/2002 | Kim |
| 6,504,873 | B1 | 1/2003 | Vehvilaeinen |
| 6,510,513 | B1 | 1/2003 | Danieli |
| 6,510,554 | B1 | 1/2003 | Gordon et al. |
| 6,512,883 | B2 | 1/2003 | Shim et al. |
| 6,516,064 | B1 | 2/2003 | Osawa et al. |
| 6,532,262 | B1 | 3/2003 | Fukuda et al. |
| 6,535,920 | B1 | 3/2003 | Parry et al. |
| 6,578,200 | B1 | 6/2003 | Takao et al. |
| 6,587,506 | B1 | 7/2003 | Noridomi et al. |
| 6,594,699 | B1 | 7/2003 | Sahai et al. |
| 6,621,979 | B1 | 9/2003 | Eerenberg et al. |
| 6,625,320 | B1 | 9/2003 | Nilsson et al. |
| 6,628,713 | B1 | 9/2003 | Kojima et al. |
| 6,642,967 | B1 | 11/2003 | Saunders |
| 6,654,933 | B1 | 11/2003 | Abbott et al. |
| 6,658,056 | B1 | 12/2003 | Duruöz et al. |

(56) References Cited

U.S. PATENT DOCUMENTS 6,665,835 B1 12/2003 Gutfreund et al.
6,671,408 B1 12/2003 Kaku
6,690,838 B2 2/2004 Zhou
6,697,568 B1 2/2004 Kaku
6,714,909 B1 3/2004 Gibbon et al.
6,721,794 B2 4/2004 Taylor et al.
6,724,944 B1 4/2004 Kalevo et al.
6,725,281 B1 4/2004 Zintel
6,742,082 B1 5/2004 Lango et al.
6,751,623 B1 6/2004 Basso et al.
6,771,703 B1 8/2004 Oguz et al.
6,807,306 B1 10/2004 Girgensohn et al.
6,810,031 B1 10/2004 Hegde et al.
6,810,131 B2 10/2004 Nakagawa et al.
6,810,389 B1 10/2004 Meyer
6,813,437 B2 11/2004 Ando et al.
6,819,394 B1 11/2004 Nomura et al.
6,850,252 B1 2/2005 Hoffberg
6,856,997 B2 2/2005 Lee et al.
6,859,496 B1 2/2005 Boroczky et al.
6,868,525 B1 3/2005 Szabo
6,871,006 B1 3/2005 Oguz et al.
6,912,253 B1 6/2005 Li et al.
6,912,513 B1 6/2005 Candelore
6,917,652 B2 7/2005 Lyu
6,931,531 B1 8/2005 Takahashi
6,931,543 B1 8/2005 Pang et al.
6,944,621 B1 9/2005 Collart
6,944,629 B1 9/2005 Shioi et al.
6,956,901 B2 10/2005 Boroczky et al.
6,957,350 B1 10/2005 Demos
6,965,646 B1 11/2005 Firestone
6,965,724 B1 11/2005 Boccon-Gibod et al.
6,965,993 B2 11/2005 Baker
6,970,564 B1 11/2005 Kubota et al.
6,983,079 B2 1/2006 Kim
6,985,588 B1 1/2006 Glick et al.
6,988,144 B1 1/2006 Luken et al.
7,006,757 B2 2/2006 Ando et al.
7,007,170 B2 2/2006 Morten
7,020,287 B2 3/2006 Unger
7,023,924 B1 4/2006 Keller et al.
7,023,992 B1 4/2006 Kubota et al.
7,043,021 B2 5/2006 Graunke et al.
7,043,473 B1 5/2006 Rassool et al.
7,051,110 B2 5/2006 Hagai et al.
7,054,968 B2 5/2006 Shrader et al.
7,058,177 B1 6/2006 Trimberger et al.
7,073,191 B2 7/2006 Srikantan et al.
7,103,906 B1 9/2006 Katz et al.
7,110,542 B1 9/2006 Tripathy
7,120,250 B2 10/2006 Candelore
7,124,303 B2 10/2006 Candelore et al.
7,127,155 B2 10/2006 Ando et al.
7,139,868 B2 11/2006 Parry et al.
7,143,289 B2 11/2006 Denning et al.
7,150,045 B2 12/2006 Koelle et al.
7,151,832 B1 12/2006 Fetkovich et al.
7,151,833 B2 12/2006 Candelore et al.
7,165,175 B1 1/2007 Kollmyer et al.
7,167,560 B2 1/2007 Yu
7,181,438 B1 2/2007 Szabo
7,185,363 B1 2/2007 Narin et al.
7,188,183 B1 3/2007 Paul et al.
7,191,335 B1 3/2007 Maillard
7,197,234 B1 3/2007 Chatterton
7,203,313 B2 4/2007 England et al.
7,206,940 B2 4/2007 Evans et al.
7,209,892 B1 4/2007 Galuten et al.
7,212,726 B2 5/2007 Zetts
7,231,132 B1 6/2007 Davenport
7,231,516 B1 6/2007 Sparrell et al.
7,233,669 B2 6/2007 Candelore
7,233,948 B1 6/2007 Shamoon et al.
7,237,061 B1 6/2007 Boic
7,242,772 B1 7/2007 Tehranchi
7,243,346 B1 7/2007 Seth et al.
7,274,861 B2 9/2007 Yahata et al.
7,295,673 B2 11/2007 Grab et al.
7,302,490 B1 11/2007 Gupta et al.
7,315,829 B1 1/2008 Tagawa et al.
7,328,345 B2 2/2008 Morten et al.
7,330,875 B1 2/2008 Parasnis et al.
7,340,528 B2 3/2008 Noblecourt et al.
7,346,163 B2 3/2008 Pedlow, Jr. et al.
7,349,886 B2 3/2008 Morten et al.
7,349,976 B1 3/2008 Glaser et al.
7,352,956 B1 4/2008 Winter et al.
7,356,143 B2 4/2008 Morten
7,356,245 B2 4/2008 Belknap et al.
7,363,647 B1 4/2008 Fakharzadeh
7,366,788 B2 4/2008 Jones et al.
7,376,233 B2 5/2008 Candelore et al.
7,376,831 B2 5/2008 Kollmyer et al.
7,382,879 B1 6/2008 Miller
7,397,853 B2 7/2008 Kwon et al.
7,400,679 B2 7/2008 Kwon et al.
7,406,174 B2 7/2008 Palmer
7,406,176 B2 7/2008 Zhu et al.
7,418,132 B2 8/2008 Hoshuyama
7,421,411 B2 9/2008 Kontio et al.
7,443,449 B2 10/2008 Momosaki et al.
7,454,780 B2 11/2008 Katsube et al.
7,457,359 B2 11/2008 Mabey et al.
7,457,415 B2 11/2008 Reitmeier et al.
7,460,668 B2 12/2008 Grab et al.
7,472,280 B2 12/2008 Giobbi
7,478,325 B2 1/2009 Foehr et al.
7,484,103 B2 1/2009 Woo et al.
7,493,018 B2 2/2009 Kim
7,499,930 B2 3/2009 Naka et al.
7,499,938 B2 3/2009 Collart
7,515,710 B2 4/2009 Russell et al.
7,526,450 B2 4/2009 Hughes et al.
7,539,213 B2 5/2009 Guillemot et al.
7,546,641 B2 6/2009 Robert et al.
7,577,980 B2 8/2009 Kienzle et al.
7,594,271 B2 9/2009 Zhuk et al.
7,610,365 B1 10/2009 Kraft et al.
7,623,759 B2 11/2009 Shimoda
7,624,337 B2 11/2009 Sull et al.
7,627,750 B1 12/2009 Chan
7,627,888 B2 12/2009 Ganesan et al.
7,639,921 B2 12/2009 Seo et al.
7,640,358 B2 12/2009 Deshpande
7,640,435 B2 12/2009 Morten
7,644,172 B2 1/2010 Stewart et al.
7,653,686 B2 1/2010 Yoneda
7,664,262 B2 2/2010 Haruki
7,664,872 B2 2/2010 Osborne et al.
7,676,555 B2 3/2010 Bushee et al.
7,689,510 B2 3/2010 Lamkin et al.
7,697,686 B2 4/2010 Puiatti et al.
7,702,925 B2 4/2010 Hanko et al.
7,711,052 B2 5/2010 Hannuksela et al.
7,711,647 B2 5/2010 Gunaseelan et al.
7,720,352 B2 5/2010 Belknap et al.
7,734,806 B2 6/2010 Park
7,747,853 B2 6/2010 Candelore
7,756,270 B2 7/2010 Shimosato et al.
7,756,271 B2 7/2010 Zhu et al.
7,761,892 B2 7/2010 Ellis et al.
7,779,097 B2 8/2010 Lamkin et al.
7,787,622 B2 8/2010 Sprunk
7,788,271 B2 8/2010 Soma et al.
7,797,720 B2 9/2010 Gopalakrishnan et al.
7,817,608 B2 10/2010 Rassool et al.
7,840,693 B2 11/2010 Gupta et al.
7,853,980 B2 12/2010 Pedlow et al.
7,864,186 B2 1/2011 Robotham et al.
7,869,691 B2 1/2011 Kelly et al.
7,873,740 B2 1/2011 Sitaraman et al.
7,877,002 B2 1/2011 Ikeda et al.
7,881,478 B2 2/2011 Derouet

(56) References Cited

U.S. PATENT DOCUMENTS

| | | | |
|---|---|---|---|
| 7,882,034 | B2 | 2/2011 | Hug et al. |
| 7,885,405 | B1 | 2/2011 | Bong |
| 7,895,311 | B1 | 2/2011 | Juenger |
| 7,907,833 | B2 | 3/2011 | Lee |
| 7,913,277 | B1 | 3/2011 | Rahrer |
| 7,945,143 | B2 | 5/2011 | Yahata et al. |
| 7,949,703 | B2 | 5/2011 | Matsuzaki et al. |
| 7,962,942 | B1 | 6/2011 | Craner |
| 7,970,835 | B2 | 6/2011 | St |
| 7,974,714 | B2 | 7/2011 | Hoffberg |
| 7,984,513 | B1 | 7/2011 | Kyne et al. |
| 7,991,156 | B1 | 8/2011 | Miller |
| 8,001,471 | B2 | 8/2011 | Shaver et al. |
| 8,015,491 | B2 | 9/2011 | Shaver et al. |
| 8,023,562 | B2 | 9/2011 | Zheludkov et al. |
| 8,046,453 | B2 | 10/2011 | Olaiya |
| 8,054,880 | B2 | 11/2011 | Yu et al. |
| 8,065,708 | B1 | 11/2011 | Smyth et al. |
| 8,069,260 | B2 | 11/2011 | Speicher et al. |
| 8,073,900 | B2 | 12/2011 | Guedalia et al. |
| 8,074,083 | B1 | 12/2011 | Lee et al. |
| 8,078,644 | B2 | 12/2011 | Hannuksela |
| 8,082,442 | B2 | 12/2011 | Keljo et al. |
| 8,131,875 | B1 | 3/2012 | Chen |
| 8,135,041 | B2 | 3/2012 | Ramaswamy |
| 8,160,157 | B2 | 4/2012 | Lamy-Bergot et al. |
| 8,169,916 | B1 | 5/2012 | Pai et al. |
| 8,170,210 | B2 | 5/2012 | Manders et al. |
| 8,195,714 | B2 | 6/2012 | Mckibben et al. |
| 8,201,264 | B2 | 6/2012 | Grab et al. |
| 8,213,607 | B2 | 7/2012 | Rose et al. |
| 8,213,768 | B2 | 7/2012 | Morioka et al. |
| 8,218,439 | B2 | 7/2012 | Deshpande |
| 8,225,061 | B2 | 7/2012 | Greenebaum |
| 8,233,768 | B2 | 7/2012 | Soroushian et al. |
| 8,243,924 | B2 | 8/2012 | Chen et al. |
| 8,245,124 | B1 | 8/2012 | Gupta |
| 8,249,168 | B2 | 8/2012 | Graves |
| 8,261,356 | B2 | 9/2012 | Choi et al. |
| 8,265,168 | B1 | 9/2012 | Masterson et al. |
| 8,270,473 | B2 | 9/2012 | Chen et al. |
| 8,270,819 | B2 | 9/2012 | Vannier |
| 8,275,871 | B2 | 9/2012 | Ram et al. |
| 8,286,213 | B2 | 10/2012 | Seo |
| 8,286,621 | B2 | 10/2012 | Halmone |
| 8,289,338 | B2 | 10/2012 | Priyadarshi et al. |
| 8,290,157 | B2 | 10/2012 | Candelore |
| 8,291,460 | B1 | 10/2012 | Peacock |
| 8,296,434 | B1 | 10/2012 | Miller et al. |
| 8,311,094 | B2 | 11/2012 | Kamariotis et al. |
| 8,311,111 | B2 | 11/2012 | Xu et al. |
| 8,311,115 | B2 | 11/2012 | Gu et al. |
| 8,312,079 | B2 | 11/2012 | Newsome et al. |
| 8,321,556 | B1 | 11/2012 | Chatterjee et al. |
| 8,325,800 | B2 | 12/2012 | Holcomb et al. |
| 8,327,009 | B2 | 12/2012 | Prestenback et al. |
| 8,341,715 | B2 | 12/2012 | Sherkin et al. |
| 8,346,753 | B2 | 1/2013 | Hayes |
| 8,365,235 | B2 | 1/2013 | Hunt et al. |
| 8,369,421 | B2 | 2/2013 | Kadono et al. |
| 8,380,041 | B2 | 2/2013 | Barton et al. |
| 8,386,621 | B2 | 2/2013 | Park |
| 8,396,114 | B2 | 3/2013 | Gu et al. |
| 8,397,265 | B2 | 3/2013 | Henocq et al. |
| 8,401,188 | B1 | 3/2013 | Swaminathan |
| 8,401,900 | B2 | 3/2013 | Cansler et al. |
| 8,407,753 | B2 | 3/2013 | Kuo |
| 8,412,841 | B1 | 4/2013 | Swaminathan et al. |
| 8,423,889 | B1 | 4/2013 | Zagorie et al. |
| 8,452,110 | B2 | 5/2013 | Shoham et al. |
| 8,456,380 | B2 | 6/2013 | Pagan |
| 8,464,066 | B1 | 6/2013 | Price et al. |
| 8,472,792 | B2 | 6/2013 | Butt |
| 8,473,630 | B1 | 6/2013 | Galligan |
| 8,484,368 | B2 | 7/2013 | Robert et al. |
| 8,510,303 | B2 | 8/2013 | Soroushian et al. |
| 8,510,404 | B2 | 8/2013 | Carmel et al. |
| 8,514,926 | B2 | 8/2013 | Ro et al. |
| 8,515,265 | B2 | 8/2013 | Kwon et al. |
| 8,516,529 | B2 | 8/2013 | Lajoie et al. |
| 8,526,610 | B2 | 9/2013 | Shamoon et al. |
| 8,527,645 | B1 | 9/2013 | Proffit et al. |
| 8,543,842 | B2 | 9/2013 | Ginter et al. |
| 8,555,329 | B2 | 10/2013 | Fröjdh et al. |
| 8,571,993 | B2 | 10/2013 | Kocher et al. |
| 8,595,378 | B1 | 11/2013 | Cohn et al. |
| 8,606,069 | B2 | 12/2013 | Okubo et al. |
| 8,630,419 | B2 | 1/2014 | Mori |
| 8,631,247 | B2 | 1/2014 | O'loughlin et al. |
| 8,640,166 | B1 | 1/2014 | Craner et al. |
| 8,649,669 | B2 | 2/2014 | Braness et al. |
| 8,650,599 | B2 | 2/2014 | Shindo et al. |
| 8,656,183 | B2 | 2/2014 | Russell et al. |
| 8,677,428 | B2 | 3/2014 | Lewis et al. |
| 8,681,866 | B1 | 3/2014 | Jia |
| 8,683,066 | B2 | 3/2014 | Hurst et al. |
| 8,689,267 | B2 | 4/2014 | Hunt |
| 8,726,264 | B1 | 5/2014 | Allen et al. |
| 8,731,193 | B2 | 5/2014 | Farkash et al. |
| 8,731,369 | B2 | 5/2014 | Li et al. |
| RE45,052 | E | 7/2014 | Li |
| 8,767,825 | B1 | 7/2014 | Wang et al. |
| 8,774,609 | B2 | 7/2014 | Drake et al. |
| 8,781,122 | B2 | 7/2014 | Chan et al. |
| 8,782,268 | B2 | 7/2014 | Pyle et al. |
| 8,804,956 | B2 | 8/2014 | Hiriart |
| 8,805,109 | B2 | 8/2014 | Shoham et al. |
| 8,806,188 | B2 | 8/2014 | Braness et al. |
| 8,818,896 | B2 | 8/2014 | Candelore |
| 8,819,116 | B1 | 8/2014 | Tomay et al. |
| 8,832,434 | B2 | 9/2014 | Apostolopoulos et al. |
| 8,843,586 | B2 | 9/2014 | Pantos et al. |
| 8,849,950 | B2 | 9/2014 | Stockhammer et al. |
| 8,850,205 | B2 | 9/2014 | Choi et al. |
| 8,850,498 | B1 | 9/2014 | Roach et al. |
| 8,856,218 | B1 | 10/2014 | Inskip |
| 8,908,984 | B2 | 12/2014 | Shoham et al. |
| 8,909,922 | B2 | 12/2014 | Kiefer et al. |
| 8,914,534 | B2 | 12/2014 | Braness et al. |
| 8,914,836 | B2 | 12/2014 | Shivadas et al. |
| 8,918,533 | B2 | 12/2014 | Chen et al. |
| 8,918,535 | B2 | 12/2014 | Ma et al. |
| 8,918,636 | B2 | 12/2014 | Kiefer |
| 8,918,908 | B2 | 12/2014 | Ziskind et al. |
| 8,948,249 | B2 | 2/2015 | Sun et al. |
| 8,964,977 | B2 | 2/2015 | Ziskind et al. |
| 8,997,161 | B2 | 3/2015 | Priyadarshi et al. |
| 8,997,254 | B2 | 3/2015 | Amidei et al. |
| 9,014,471 | B2 | 4/2015 | Shoham et al. |
| 9,015,782 | B2 | 4/2015 | Acharya et al. |
| 9,025,659 | B2 | 5/2015 | Soroushian et al. |
| 9,038,116 | B1 | 5/2015 | Knox et al. |
| 9,038,121 | B2 | 5/2015 | Kienzle et al. |
| 9,042,670 | B2 | 5/2015 | Carmel et al. |
| 9,049,497 | B2 | 6/2015 | Chen et al. |
| 9,060,207 | B2 | 6/2015 | Scherkus et al. |
| 9,094,737 | B2 | 7/2015 | Shivadas et al. |
| 9,098,335 | B2 | 8/2015 | Muthiah et al. |
| 9,111,098 | B2 | 8/2015 | Smith et al. |
| 9,124,773 | B2 | 9/2015 | Chan et al. |
| 9,125,073 | B2 | 9/2015 | Oyman et al. |
| 9,184,920 | B2 | 11/2015 | Grab et al. |
| 9,191,151 | B2 | 11/2015 | Luby et al. |
| 9,191,457 | B2 | 11/2015 | Van der Schaar |
| 9,197,685 | B2 | 11/2015 | Soroushian |
| 9,201,922 | B2 | 12/2015 | Soroushian et al. |
| 9,203,816 | B2 | 12/2015 | Brueck et al. |
| 9,210,481 | B2 | 12/2015 | Braness et al. |
| 9,215,466 | B2 | 12/2015 | Zhai et al. |
| 9,247,311 | B2 | 1/2016 | Kiefer |
| 9,247,312 | B2 | 1/2016 | Braness et al. |
| 9,247,317 | B2 | 1/2016 | Shivadas et al. |
| 9,253,178 | B2 | 2/2016 | Blom et al. |
| 9,264,475 | B2 | 2/2016 | Shivadas et al. |

(56) References Cited

U.S. PATENT DOCUMENTS

| | | | |
|---|---|---|---|
| 9,294,531 | B2 | 3/2016 | Zhang et al. |
| 9,313,510 | B2 | 4/2016 | Shivadas et al. |
| 9,343,112 | B2 | 5/2016 | Amidei et al. |
| 9,344,517 | B2 | 5/2016 | Shivadas et al. |
| 9,344,721 | B2 | 5/2016 | Dikvall |
| 9,380,096 | B2 | 6/2016 | Luby et al. |
| 9,386,064 | B2 | 7/2016 | Luby et al. |
| 9,479,805 | B2 | 10/2016 | Rothschild et al. |
| 9,485,469 | B2 | 11/2016 | Kahn et al. |
| 9,485,546 | B2 | 11/2016 | Chen et al. |
| 9,571,827 | B2 | 2/2017 | Su et al. |
| 9,584,557 | B2 | 2/2017 | Panje et al. |
| 9,584,847 | B2 | 2/2017 | Ma et al. |
| 9,615,061 | B2 | 4/2017 | Carney et al. |
| 9,621,522 | B2 | 4/2017 | Kiefer et al. |
| 9,628,536 | B2 | 4/2017 | Luby et al. |
| 9,667,684 | B2 | 5/2017 | Ziskind et al. |
| 9,672,286 | B2 | 6/2017 | Soroushian et al. |
| 9,674,254 | B2 | 6/2017 | Pare et al. |
| 9,686,332 | B1 | 6/2017 | Binns et al. |
| 9,706,259 | B2 | 7/2017 | Chan et al. |
| 9,712,890 | B2 | 7/2017 | Shivadas et al. |
| 9,761,274 | B2 | 9/2017 | Delpuch et al. |
| 9,798,863 | B2 | 10/2017 | Grab et al. |
| 9,813,740 | B2 | 11/2017 | Panje et al. |
| 9,866,878 | B2 | 1/2018 | van der Schaar et al. |
| 9,883,204 | B2 | 1/2018 | Braness et al. |
| 9,906,785 | B2 | 2/2018 | Naletov et al. |
| 9,967,189 | B2 | 5/2018 | Patel et al. |
| 9,967,305 | B2 | 5/2018 | Braness |
| 9,967,521 | B2 | 5/2018 | Kahn et al. |
| 10,169,094 | B2 | 1/2019 | Iyer |
| 10,171,873 | B2 | 1/2019 | Krebs |
| 10,212,486 | B2 | 2/2019 | Chan et al. |
| 10,225,299 | B2 | 3/2019 | van der Schaar et al. |
| 10,225,588 | B2 | 3/2019 | Kiefer et al. |
| 10,244,272 | B2 | 3/2019 | Kiefer et al. |
| 10,264,255 | B2 | 4/2019 | Naletov et al. |
| 10,321,168 | B2 | 6/2019 | van der Schaar et al. |
| 10,341,698 | B2 | 7/2019 | Kiefer et al. |
| 10,368,096 | B2 | 7/2019 | Braness et al. |
| 10,382,785 | B2 | 8/2019 | Braness et al. |
| 10,437,896 | B2 | 10/2019 | Soroushian et al. |
| 10,462,537 | B2 | 10/2019 | Shivadas et al. |
| 10,715,806 | B2 | 7/2020 | Naletov et al. |
| 10,805,368 | B2 | 10/2020 | van der Schaar et al. |
| 10,856,020 | B2 | 12/2020 | Kiefer et al. |
| 10,893,305 | B2 | 1/2021 | van der Schaar et al. |
| 10,992,955 | B2 | 4/2021 | Braness et al. |
| RE48,761 | E | 9/2021 | Shivadas et al. |
| 11,638,033 | B2 | 4/2023 | Braness et al. |
| 2001/0021276 | A1 | 9/2001 | Zhou |
| 2001/0030710 | A1 | 10/2001 | Werner |
| 2001/0036355 | A1 | 11/2001 | Kelly et al. |
| 2001/0046299 | A1 | 11/2001 | Wasilewski et al. |
| 2001/0052077 | A1 | 12/2001 | Fung et al. |
| 2001/0052127 | A1 | 12/2001 | Seo et al. |
| 2001/0053222 | A1 | 12/2001 | Wakao et al. |
| 2001/0055337 | A1 | 12/2001 | Matsuzaki et al. |
| 2002/0026560 | A1 | 2/2002 | Jordan et al. |
| 2002/0034252 | A1 | 3/2002 | Owen et al. |
| 2002/0048450 | A1 | 4/2002 | Zetts |
| 2002/0051494 | A1 | 5/2002 | Yamaguchi et al. |
| 2002/0057739 | A1 | 5/2002 | Hasebe et al. |
| 2002/0057898 | A1 | 5/2002 | Normile |
| 2002/0062313 | A1 | 5/2002 | Lee et al. |
| 2002/0067432 | A1 | 6/2002 | Kondo et al. |
| 2002/0075572 | A1 | 6/2002 | Boreczky et al. |
| 2002/0076112 | A1 | 6/2002 | Devara |
| 2002/0087569 | A1 | 7/2002 | Fischer et al. |
| 2002/0091665 | A1 | 7/2002 | Beek et al. |
| 2002/0093571 | A1 | 7/2002 | Hyodo |
| 2002/0107802 | A1 | 8/2002 | Philips |
| 2002/0110193 | A1 | 8/2002 | Yoo et al. |
| 2002/0114330 | A1 | 8/2002 | Cheung et al. |
| 2002/0116481 | A1 | 8/2002 | Lee |
| 2002/0118953 | A1 | 8/2002 | Kim |
| 2002/0120934 | A1 | 8/2002 | Abrahams et al. |
| 2002/0135607 | A1 | 9/2002 | Kato et al. |
| 2002/0136298 | A1 | 9/2002 | Anantharamu et al. |
| 2002/0141503 | A1 | 10/2002 | Kobayashi et al. |
| 2002/0143413 | A1 | 10/2002 | Fay et al. |
| 2002/0143547 | A1 | 10/2002 | Fay et al. |
| 2002/0147980 | A1 | 10/2002 | Satoda |
| 2002/0154779 | A1 | 10/2002 | Asano et al. |
| 2002/0159528 | A1 | 10/2002 | Graziani et al. |
| 2002/0159598 | A1 | 10/2002 | Rubinstein et al. |
| 2002/0161462 | A1 | 10/2002 | Fay |
| 2002/0161797 | A1 | 10/2002 | Gallo et al. |
| 2002/0164024 | A1 | 11/2002 | Arakawa et al. |
| 2002/0169926 | A1 | 11/2002 | Pinckney et al. |
| 2002/0169971 | A1 | 11/2002 | Asano et al. |
| 2002/0180929 | A1 | 12/2002 | Tseng et al. |
| 2002/0184159 | A1 | 12/2002 | Tadayon et al. |
| 2002/0184515 | A1 | 12/2002 | Oho et al. |
| 2002/0191112 | A1 | 12/2002 | Akiyoshi et al. |
| 2002/0191959 | A1 | 12/2002 | Lin et al. |
| 2002/0191960 | A1 | 12/2002 | Fujinami et al. |
| 2003/0001964 | A1 | 1/2003 | Masukura et al. |
| 2003/0002577 | A1 | 1/2003 | Pinder |
| 2003/0002578 | A1 | 1/2003 | Tsukagoshi et al. |
| 2003/0005442 | A1 | 1/2003 | Brodersen et al. |
| 2003/0021296 | A1 | 1/2003 | Wee et al. |
| 2003/0031178 | A1 | 2/2003 | Haeri |
| 2003/0035488 | A1 | 2/2003 | Barrau |
| 2003/0035545 | A1 | 2/2003 | Jiang |
| 2003/0035546 | A1 | 2/2003 | Jiang et al. |
| 2003/0041257 | A1 | 2/2003 | Wee et al. |
| 2003/0043847 | A1 | 3/2003 | Haddad |
| 2003/0044080 | A1 | 3/2003 | Frishman et al. |
| 2003/0051237 | A1 | 3/2003 | Sako et al. |
| 2003/0053541 | A1 | 3/2003 | Sun et al. |
| 2003/0061305 | A1 | 3/2003 | Copley et al. |
| 2003/0061369 | A1 | 3/2003 | Aksu et al. |
| 2003/0063675 | A1 | 4/2003 | Kang et al. |
| 2003/0065777 | A1 | 4/2003 | Mattila et al. |
| 2003/0077071 | A1 | 4/2003 | Lin et al. |
| 2003/0078891 | A1 | 4/2003 | Capitant |
| 2003/0078930 | A1 | 4/2003 | Surcouf et al. |
| 2003/0079222 | A1 | 4/2003 | Boykin et al. |
| 2003/0081776 | A1 | 5/2003 | Candelore |
| 2003/0093799 | A1 | 5/2003 | Kauffman et al. |
| 2003/0123855 | A1 | 7/2003 | Okada et al. |
| 2003/0128296 | A1 | 7/2003 | Lee |
| 2003/0133506 | A1 | 7/2003 | Haneda |
| 2003/0135633 | A1 | 7/2003 | Dror et al. |
| 2003/0135742 | A1 | 7/2003 | Evans |
| 2003/0142594 | A1 | 7/2003 | Tsumagari et al. |
| 2003/0152224 | A1 | 8/2003 | Candelore et al. |
| 2003/0152370 | A1 | 8/2003 | Otomo et al. |
| 2003/0163824 | A1 | 8/2003 | Gordon et al. |
| 2003/0165328 | A1 | 9/2003 | Grecia |
| 2003/0174844 | A1 | 9/2003 | Candelore |
| 2003/0185302 | A1 | 10/2003 | Abrams |
| 2003/0185542 | A1 | 10/2003 | McVeigh et al. |
| 2003/0206558 | A1 | 11/2003 | Parkkinen et al. |
| 2003/0206717 | A1 | 11/2003 | Yogeshwar et al. |
| 2003/0210821 | A1 | 11/2003 | Yogeshwar et al. |
| 2003/0216922 | A1 | 11/2003 | Gonzales et al. |
| 2003/0229900 | A1 | 12/2003 | Reisman |
| 2003/0231863 | A1 | 12/2003 | Eerenberg et al. |
| 2003/0231867 | A1 | 12/2003 | Gates et al. |
| 2003/0233464 | A1 | 12/2003 | Walpole et al. |
| 2003/0236836 | A1 | 12/2003 | Borthwick |
| 2003/0236907 | A1 | 12/2003 | Stewart et al. |
| 2004/0001594 | A1 | 1/2004 | Krishnaswamy et al. |
| 2004/0003008 | A1 | 1/2004 | Wasilewski et al. |
| 2004/0006701 | A1 | 1/2004 | Kresina |
| 2004/0021684 | A1 | 2/2004 | Millner |
| 2004/0022391 | A1 | 2/2004 | Obrien |
| 2004/0024688 | A1 | 2/2004 | Bi et al. |
| 2004/0025180 | A1 | 2/2004 | Begeja et al. |
| 2004/0028227 | A1 | 2/2004 | Yu |
| 2004/0031058 | A1 | 2/2004 | Reisman |

(56) References Cited

U.S. PATENT DOCUMENTS

2004/0037421 A1 2/2004 Truman
2004/0039916 A1 2/2004 Aldis et al.
2004/0047592 A1 3/2004 Seo et al.
2004/0047607 A1 3/2004 Seo et al.
2004/0047614 A1 3/2004 Green
2004/0049690 A1 3/2004 Candelore et al.
2004/0049694 A1 3/2004 Candelore
2004/0052501 A1 3/2004 Tam
2004/0071453 A1 4/2004 Valderas
2004/0073917 A1 4/2004 Pedlow et al.
2004/0076237 A1 4/2004 Kadono et al.
2004/0081333 A1 4/2004 Grab et al.
2004/0081434 A1 4/2004 Jung et al.
2004/0084035 A1 5/2004 Newton
2004/0088557 A1 5/2004 Malcolm et al.
2004/0093494 A1 5/2004 Nishimoto et al.
2004/0093618 A1 5/2004 Baldwin et al.
2004/0101059 A1 5/2004 Joch et al.
2004/0101142 A1 5/2004 Nasypny
2004/0105549 A1 6/2004 Suzuki et al.
2004/0107356 A1 6/2004 Shamoon et al.
2004/0114687 A1 6/2004 Ferris et al.
2004/0117347 A1 6/2004 Seo et al.
2004/0136698 A1 7/2004 Mock
2004/0139335 A1 7/2004 Diamand et al.
2004/0143760 A1 7/2004 Alkove et al.
2004/0146276 A1 7/2004 Ogawa
2004/0158878 A1 8/2004 Ratnakar et al.
2004/0184534 A1 9/2004 Wang
2004/0184616 A1 9/2004 Morten et al.
2004/0202320 A1 10/2004 Amini et al.
2004/0213094 A1 10/2004 Suzuki
2004/0217971 A1 11/2004 Kim
2004/0243488 A1 12/2004 Yamamoto et al.
2004/0243714 A1 12/2004 Wynn et al.
2004/0255115 A1 12/2004 DeMello et al.
2004/0255236 A1 12/2004 Collart
2004/0267952 A1 12/2004 He et al.
2005/0004875 A1 1/2005 Kontio et al.
2005/0005025 A1 1/2005 Harville et al.
2005/0005143 A1 1/2005 Lang et al.
2005/0013494 A1 1/2005 Srinivasan et al.
2005/0015509 A1 1/2005 Sitaraman et al.
2005/0015797 A1 1/2005 Noblecourt et al.
2005/0038826 A1 2/2005 Bae et al.
2005/0055399 A1 3/2005 Savchuk
2005/0063541 A1 3/2005 Candelore
2005/0066063 A1 3/2005 Grigorovitch et al.
2005/0071280 A1 3/2005 Irwin et al.
2005/0076232 A1 4/2005 Kawaguchi
2005/0102371 A1 5/2005 Aksu
2005/0108320 A1 5/2005 Lord et al.
2005/0114534 A1 5/2005 Lee
2005/0114896 A1 5/2005 Hug
2005/0120132 A1 6/2005 Hutter
2005/0132208 A1 6/2005 Hug et al.
2005/0138655 A1 6/2005 Zimler et al.
2005/0144468 A1 6/2005 Northcutt
2005/0149450 A1 7/2005 Stefik et al.
2005/0177741 A1 8/2005 Chen et al.
2005/0180641 A1 8/2005 Clark
2005/0183120 A1 8/2005 Jain et al.
2005/0190911 A1 9/2005 Pare et al.
2005/0192904 A1 9/2005 Candelore
2005/0193070 A1 9/2005 Brown et al.
2005/0193322 A1 9/2005 Lamkin et al.
2005/0196147 A1 9/2005 Seo et al.
2005/0198364 A1 9/2005 Val et al.
2005/0204289 A1 9/2005 Mohammed et al.
2005/0207442 A1 9/2005 Zoest et al.
2005/0207578 A1 9/2005 Matsuyama et al.
2005/0216752 A1 9/2005 Hofmeyr et al.
2005/0227773 A1 10/2005 Lu et al.
2005/0243912 A1 11/2005 Kwon et al.
2005/0254508 A1 11/2005 Aksu et al.
2005/0262257 A1 11/2005 Major et al.
2005/0265555 A1 12/2005 Pippuri
2005/0273695 A1 12/2005 Schnurr
2005/0275656 A1 12/2005 Corbin et al.
2006/0013568 A1 1/2006 Rodriguez
2006/0015580 A1 1/2006 Gabriel et al.
2006/0020825 A1 1/2006 Grab
2006/0026294 A1 2/2006 Virdi et al.
2006/0026302 A1 2/2006 Bennett et al.
2006/0026654 A1 2/2006 An et al.
2006/0036549 A1 2/2006 Wu
2006/0037057 A1 2/2006 Xu
2006/0052095 A1 3/2006 Vazvan
2006/0053080 A1 3/2006 Edmonson et al.
2006/0059223 A1 3/2006 Klemets et al.
2006/0064605 A1 3/2006 Giobbi
2006/0078301 A1 4/2006 Ikeda et al.
2006/0093318 A1 5/2006 Cohen et al.
2006/0093320 A1 5/2006 Hallberg et al.
2006/0095472 A1 5/2006 Krikorian et al.
2006/0109856 A1 5/2006 Deshpande
2006/0120378 A1 6/2006 Usuki et al.
2006/0129909 A1 6/2006 Butt et al.
2006/0165163 A1 7/2006 Burazerovic et al.
2006/0165233 A1 7/2006 Nonaka et al.
2006/0168298 A1 7/2006 Aoki et al.
2006/0168639 A1 7/2006 Gan et al.
2006/0173887 A1 8/2006 Breitfeld et al.
2006/0179239 A1 8/2006 Fluhr et al.
2006/0181965 A1 8/2006 Collart
2006/0210245 A1 9/2006 Mccrossan et al.
2006/0212370 A1 9/2006 Shear et al.
2006/0218251 A1 9/2006 Tanabe
2006/0235880 A1 10/2006 Qian
2006/0235883 A1 10/2006 Krebs
2006/0245727 A1 11/2006 Nakano et al.
2006/0259588 A1 11/2006 Lerman et al.
2006/0263056 A1 11/2006 Lin et al.
2006/0267986 A1 11/2006 Bae
2006/0274835 A1 12/2006 Hamilton et al.
2006/0294164 A1 12/2006 Armangau et al.
2007/0005333 A1 1/2007 Setiohardjo et al.
2007/0031110 A1 2/2007 Rijckaert
2007/0033419 A1 2/2007 Kocher et al.
2007/0044010 A1 2/2007 Sull et al.
2007/0047645 A1 3/2007 Takashima
2007/0047901 A1 3/2007 Ando et al.
2007/0053513 A1 3/2007 Hoffberg
2007/0055982 A1 3/2007 Spilo
2007/0058928 A1 3/2007 Naito et al.
2007/0067472 A1 3/2007 Maertens et al.
2007/0067622 A1 3/2007 Nakano et al.
2007/0083467 A1 4/2007 Lindahl et al.
2007/0083617 A1 4/2007 Chakrabarti et al.
2007/0086528 A1 4/2007 Mauchly et al.
2007/0100757 A1 5/2007 Rhoads
2007/0101271 A1 5/2007 Hua et al.
2007/0101387 A1 5/2007 Hua et al.
2007/0106863 A1 5/2007 Bonwick et al.
2007/0133603 A1 6/2007 Weaver
2007/0136817 A1 6/2007 Nguyen
2007/0140647 A1 6/2007 Kusunoki et al.
2007/0154165 A1 7/2007 Hemmeryckx-Deleersnijder et al.
2007/0156770 A1 7/2007 Espelien
2007/0157267 A1 7/2007 Lopez-Estrada
2007/0162568 A1 7/2007 Gupta et al.
2007/0162981 A1 7/2007 Morioka et al.
2007/0166000 A1 7/2007 Nallur et al.
2007/0168541 A1 7/2007 Gupta et al.
2007/0168542 A1 7/2007 Gupta et al.
2007/0178933 A1 8/2007 Nelson
2007/0180051 A1 8/2007 Kelly et al.
2007/0180125 A1 8/2007 Knowles et al.
2007/0185982 A1 8/2007 Nakanowatari et al.
2007/0192810 A1 8/2007 Pritchett et al.
2007/0201502 A1 8/2007 Abramson
2007/0201695 A1 8/2007 Saarikivi
2007/0204003 A1 8/2007 Abramson

(56) References Cited

U.S. PATENT DOCUMENTS

| | | | |
|---|---|---|---|
| 2007/0204011 | A1 | 8/2007 | Shaver et al. |
| 2007/0204115 | A1 | 8/2007 | Abramson |
| 2007/0217339 | A1 | 9/2007 | Zhao |
| 2007/0217759 | A1 | 9/2007 | Dodd |
| 2007/0220118 | A1 | 9/2007 | Loyer |
| 2007/0234391 | A1 | 10/2007 | Hunter et al. |
| 2007/0239839 | A1 | 10/2007 | Buday et al. |
| 2007/0250536 | A1 | 10/2007 | Tanaka et al. |
| 2007/0255940 | A1 | 11/2007 | Ueno |
| 2007/0256141 | A1 | 11/2007 | Nakano et al. |
| 2007/0271317 | A1 | 11/2007 | Carmel |
| 2007/0271385 | A1 | 11/2007 | Davis et al. |
| 2007/0274679 | A1 | 11/2007 | Yahata et al. |
| 2007/0277219 | A1 | 11/2007 | Toebes et al. |
| 2007/0277234 | A1 | 11/2007 | Bessonov et al. |
| 2007/0280298 | A1 | 12/2007 | Hearn et al. |
| 2007/0288745 | A1 | 12/2007 | Kwan |
| 2007/0292107 | A1 | 12/2007 | Yahata et al. |
| 2007/0297422 | A1 | 12/2007 | Matsuo et al. |
| 2008/0005175 | A1 | 1/2008 | Bourke et al. |
| 2008/0008319 | A1 | 1/2008 | Poirier |
| 2008/0008455 | A1 | 1/2008 | De Lange et al. |
| 2008/0022005 | A1 | 1/2008 | Wu et al. |
| 2008/0043832 | A1 | 2/2008 | Barkley et al. |
| 2008/0046718 | A1 | 2/2008 | Grab et al. |
| 2008/0046925 | A1 | 2/2008 | Lee et al. |
| 2008/0066099 | A1 | 3/2008 | Brodersen et al. |
| 2008/0066181 | A1 | 3/2008 | Haveson et al. |
| 2008/0077592 | A1 | 3/2008 | Brodie et al. |
| 2008/0086456 | A1 | 4/2008 | Rasanen et al. |
| 2008/0086570 | A1 | 4/2008 | Dey et al. |
| 2008/0086747 | A1 | 4/2008 | Rasanen et al. |
| 2008/0101466 | A1 | 5/2008 | Swenson et al. |
| 2008/0101718 | A1 | 5/2008 | Yang et al. |
| 2008/0104633 | A1 | 5/2008 | Noblecourt et al. |
| 2008/0120330 | A1 | 5/2008 | Reed et al. |
| 2008/0120342 | A1 | 5/2008 | Reed et al. |
| 2008/0120389 | A1 | 5/2008 | Bassali et al. |
| 2008/0120637 | A1 | 5/2008 | Deiss |
| 2008/0126248 | A1 | 5/2008 | Lee et al. |
| 2008/0131078 | A1 | 6/2008 | Jeong et al. |
| 2008/0134043 | A1 | 6/2008 | Georgis |
| 2008/0137541 | A1 | 6/2008 | Agarwal et al. |
| 2008/0137736 | A1 | 6/2008 | Richardson et al. |
| 2008/0137847 | A1 | 6/2008 | Candelore et al. |
| 2008/0151817 | A1 | 6/2008 | Fitchett |
| 2008/0155615 | A1 | 6/2008 | Craner et al. |
| 2008/0160911 | A1 | 7/2008 | Chou et al. |
| 2008/0162949 | A1 | 7/2008 | Sato et al. |
| 2008/0168516 | A1 | 7/2008 | Flick et al. |
| 2008/0172441 | A1 | 7/2008 | Speicher et al. |
| 2008/0177793 | A1 | 7/2008 | Epstein et al. |
| 2008/0184119 | A1 | 7/2008 | Eyal et al. |
| 2008/0187283 | A1 | 8/2008 | Takahashi |
| 2008/0192818 | A1 | 8/2008 | DiPietro et al. |
| 2008/0195664 | A1 | 8/2008 | Maharajh et al. |
| 2008/0195744 | A1 | 8/2008 | Bowra et al. |
| 2008/0201705 | A1 | 8/2008 | Wookey |
| 2008/0205860 | A1 | 8/2008 | Holtman |
| 2008/0209534 | A1 | 8/2008 | Keronen et al. |
| 2008/0219449 | A1 | 9/2008 | Ball et al. |
| 2008/0229025 | A1 | 9/2008 | Plamondon |
| 2008/0240144 | A1 | 10/2008 | Kruse et al. |
| 2008/0256105 | A1 | 10/2008 | Nogawa et al. |
| 2008/0263354 | A1 | 10/2008 | Beuque |
| 2008/0271102 | A1 | 10/2008 | Kienzle et al. |
| 2008/0279535 | A1 | 11/2008 | Haque et al. |
| 2008/0294453 | A1 | 11/2008 | Baird-Smith et al. |
| 2008/0298358 | A1 | 12/2008 | John et al. |
| 2008/0310454 | A1 | 12/2008 | Bellwood et al. |
| 2008/0310496 | A1 | 12/2008 | Fang |
| 2008/0313541 | A1 | 12/2008 | Shafton et al. |
| 2008/0320100 | A1 | 12/2008 | Pantos et al. |
| 2008/0320160 | A1 | 12/2008 | Sitaraman et al. |
| 2009/0010429 | A1 | 1/2009 | Kim et al. |
| 2009/0010622 | A1 | 1/2009 | Yahata et al. |
| 2009/0013195 | A1 | 1/2009 | Ochi et al. |
| 2009/0031220 | A1 | 1/2009 | Tranchant et al. |
| 2009/0037959 | A1 | 2/2009 | Suh et al. |
| 2009/0048852 | A1 | 2/2009 | Burns et al. |
| 2009/0055546 | A1 | 2/2009 | Jung et al. |
| 2009/0060452 | A1 | 3/2009 | Chaudhri |
| 2009/0064341 | A1 | 3/2009 | Hartung et al. |
| 2009/0066839 | A1 | 3/2009 | Jung et al. |
| 2009/0067367 | A1 | 3/2009 | Buracchini et al. |
| 2009/0077143 | A1 | 3/2009 | Macy, Jr. |
| 2009/0097644 | A1 | 4/2009 | Haruki |
| 2009/0106082 | A1 | 4/2009 | Senti et al. |
| 2009/0132599 | A1 | 5/2009 | Soroushian et al. |
| 2009/0132721 | A1 | 5/2009 | Soroushian et al. |
| 2009/0132824 | A1 | 5/2009 | Terada et al. |
| 2009/0136216 | A1 | 5/2009 | Soroushian et al. |
| 2009/0138570 | A1 | 5/2009 | Miura et al. |
| 2009/0150406 | A1 | 6/2009 | Giblin |
| 2009/0150557 | A1 | 6/2009 | Wormley et al. |
| 2009/0165148 | A1 | 6/2009 | Frey et al. |
| 2009/0168795 | A1 | 7/2009 | Segel et al. |
| 2009/0169001 | A1 | 7/2009 | Tighe et al. |
| 2009/0169181 | A1 | 7/2009 | Priyadarshi et al. |
| 2009/0172201 | A1 | 7/2009 | Carmel et al. |
| 2009/0178090 | A1 | 7/2009 | Oztaskent |
| 2009/0196139 | A1 | 8/2009 | Bates et al. |
| 2009/0201988 | A1 | 8/2009 | Gazier et al. |
| 2009/0217317 | A1 | 8/2009 | White et al. |
| 2009/0226148 | A1 | 9/2009 | Nesvadba et al. |
| 2009/0228395 | A1 | 9/2009 | Wegner et al. |
| 2009/0249081 | A1 | 10/2009 | Zayas |
| 2009/0265737 | A1 | 10/2009 | Issa et al. |
| 2009/0268905 | A1 | 10/2009 | Matsushima et al. |
| 2009/0276636 | A1 | 11/2009 | Grab et al. |
| 2009/0282162 | A1 | 11/2009 | Mehrotra et al. |
| 2009/0290706 | A1 | 11/2009 | Amini et al. |
| 2009/0290708 | A1 | 11/2009 | Schneider et al. |
| 2009/0293116 | A1 | 11/2009 | DeMello |
| 2009/0303241 | A1 | 12/2009 | Priyadarshi et al. |
| 2009/0307258 | A1 | 12/2009 | Priyadarshi et al. |
| 2009/0307267 | A1 | 12/2009 | Chen et al. |
| 2009/0310819 | A1 | 12/2009 | Hatano |
| 2009/0310933 | A1 | 12/2009 | Lee |
| 2009/0313544 | A1 | 12/2009 | Wood et al. |
| 2009/0313564 | A1 | 12/2009 | Rottler et al. |
| 2009/0316783 | A1 | 12/2009 | Au et al. |
| 2009/0328124 | A1 | 12/2009 | Khouzam et al. |
| 2009/0328228 | A1 | 12/2009 | Schnell |
| 2010/0005393 | A1 | 1/2010 | Tokashiki et al. |
| 2010/0040351 | A1 | 2/2010 | Toma et al. |
| 2010/0057928 | A1 | 3/2010 | Kapoor et al. |
| 2010/0058405 | A1 | 3/2010 | Ramakrishnan et al. |
| 2010/0074324 | A1 | 3/2010 | Qian et al. |
| 2010/0074333 | A1 | 3/2010 | Au et al. |
| 2010/0083322 | A1 | 4/2010 | Rouse |
| 2010/0094969 | A1 | 4/2010 | Zuckerman et al. |
| 2010/0095121 | A1 | 4/2010 | Shetty et al. |
| 2010/0106968 | A1 | 4/2010 | Mori et al. |
| 2010/0107260 | A1 | 4/2010 | Orrell et al. |
| 2010/0111192 | A1 | 5/2010 | Graves |
| 2010/0138903 | A1 | 6/2010 | Medvinsky |
| 2010/0142915 | A1 | 6/2010 | Mcdermott et al. |
| 2010/0142917 | A1 | 6/2010 | Isaji |
| 2010/0158109 | A1 | 6/2010 | Dahlby et al. |
| 2010/0161825 | A1 | 6/2010 | Ronca et al. |
| 2010/0166060 | A1 | 7/2010 | Ezure et al. |
| 2010/0185854 | A1 | 7/2010 | Burns et al. |
| 2010/0186092 | A1 | 7/2010 | Takechi et al. |
| 2010/0189183 | A1 | 7/2010 | Gu et al. |
| 2010/0198943 | A1 | 8/2010 | Harrang et al. |
| 2010/0218208 | A1 | 8/2010 | Holden |
| 2010/0228795 | A1 | 9/2010 | Hahn |
| 2010/0235472 | A1 | 9/2010 | Sood et al. |
| 2010/0235528 | A1 | 9/2010 | Bocharov et al. |
| 2010/0250532 | A1 | 9/2010 | Soroushian et al. |
| 2010/0290761 | A1 | 11/2010 | Drake et al. |
| 2010/0299522 | A1 | 11/2010 | Khambete et al. |
| 2010/0306249 | A1 | 12/2010 | Hill et al. |

(56) References Cited

U.S. PATENT DOCUMENTS

2010/0313225 A1 12/2010 Cholas et al.
2010/0313226 A1 12/2010 Cholas et al.
2010/0316126 A1 12/2010 Chen et al.
2010/0319014 A1 12/2010 Lockett et al.
2010/0319017 A1 12/2010 Cook
2010/0332595 A1 12/2010 Fullagar et al.
2011/0002381 A1 1/2011 Yang et al.
2011/0010466 A1 1/2011 Fan et al.
2011/0016225 A1 1/2011 Park et al.
2011/0035517 A1 2/2011 Minnick et al.
2011/0047209 A1 2/2011 Lindholm et al.
2011/0055585 A1 3/2011 Lee
2011/0058675 A1 3/2011 Brueck et al.
2011/0060808 A1 3/2011 Martin et al.
2011/0066673 A1 3/2011 Outlaw
2011/0067057 A1 3/2011 Karaoguz et al.
2011/0069757 A1 3/2011 Ammu et al.
2011/0078440 A1 3/2011 Feng et al.
2011/0080940 A1 4/2011 Bocharov
2011/0082914 A1 4/2011 Robert et al.
2011/0082924 A1 4/2011 Gopalakrishnan
2011/0083009 A1 4/2011 Shamoon et al.
2011/0096828 A1 4/2011 Chen et al.
2011/0103374 A1 5/2011 Lajoie et al.
2011/0107379 A1 5/2011 Lajoie et al.
2011/0116772 A1 5/2011 Kwon et al.
2011/0126191 A1 5/2011 Hughes et al.
2011/0129011 A1 6/2011 Cilli et al.
2011/0135090 A1 6/2011 Chan et al.
2011/0138018 A1 6/2011 Raveendran et al.
2011/0142415 A1 6/2011 Rhyu
2011/0145726 A1 6/2011 Wei et al.
2011/0145858 A1 6/2011 Philpott et al.
2011/0149753 A1 6/2011 Bapst et al.
2011/0150100 A1 6/2011 Abadir
2011/0153785 A1 6/2011 Minborg et al.
2011/0153835 A1 6/2011 Rimac et al.
2011/0158470 A1 6/2011 Martin et al.
2011/0170687 A1 7/2011 Hyodo et al.
2011/0173345 A1 7/2011 Knox et al.
2011/0179185 A1 7/2011 Wang et al.
2011/0184738 A1 7/2011 Kalisky et al.
2011/0191439 A1 8/2011 Dazzi et al.
2011/0191803 A1 8/2011 Baldwin et al.
2011/0197237 A1 8/2011 Turner
2011/0197261 A1 8/2011 Dong et al.
2011/0197267 A1 8/2011 Gravel et al.
2011/0213827 A1 9/2011 Kaspar et al.
2011/0222786 A1 9/2011 Carmel et al.
2011/0225302 A1 9/2011 Park et al.
2011/0225315 A1 9/2011 Wexler et al.
2011/0225417 A1 9/2011 Maharajh et al.
2011/0238789 A1 9/2011 Luby et al.
2011/0239078 A1 9/2011 Luby et al.
2011/0246657 A1 10/2011 Glow
2011/0246659 A1 10/2011 Bouazizi
2011/0246661 A1 10/2011 Manzari et al.
2011/0252118 A1 10/2011 Pantos et al.
2011/0264530 A1 10/2011 Santangelo et al.
2011/0268178 A1 11/2011 Park
2011/0276555 A1 11/2011 Fiero
2011/0276695 A1 11/2011 Maldaner et al.
2011/0283012 A1 11/2011 Melnyk
2011/0291723 A1 12/2011 Hashimoto
2011/0296048 A1 12/2011 Knox et al.
2011/0302319 A1 12/2011 Ha et al.
2011/0305273 A1 12/2011 He et al.
2011/0314130 A1 12/2011 Strasman
2011/0314176 A1 12/2011 Frojdh et al.
2011/0314500 A1 12/2011 Gordon et al.
2012/0005312 A1 1/2012 Mcgowan et al.
2012/0005368 A1* 1/2012 Knittle ..... 709/235
2012/0017282 A1 1/2012 Kang et al.
2012/0023251 A1 1/2012 Pyle et al.
2012/0036365 A1 2/2012 Kyslov et al.
2012/0036544 A1 2/2012 Chen et al.
2012/0042090 A1 2/2012 Chen et al.
2012/0047542 A1 2/2012 Lewis et al.
2012/0066360 A1 3/2012 Ghosh
2012/0093214 A1 4/2012 Urbach
2012/0110120 A1 5/2012 Willig et al.
2012/0114302 A1 5/2012 Randall
2012/0124191 A1 5/2012 Lyon
2012/0134496 A1 5/2012 Farkash et al.
2012/0137336 A1 5/2012 Applegate et al.
2012/0144117 A1 6/2012 Weare et al.
2012/0144445 A1 6/2012 Bonta et al.
2012/0147958 A1 6/2012 Ronca et al.
2012/0166633 A1 6/2012 Baumback et al.
2012/0167132 A1 6/2012 Mathews et al.
2012/0170642 A1 7/2012 Braness et al.
2012/0170643 A1 7/2012 Soroushian et al.
2012/0170906 A1 7/2012 Soroushian et al.
2012/0170915 A1 7/2012 Braness et al.
2012/0173751 A1 7/2012 Braness et al.
2012/0177101 A1 7/2012 van der Schaar
2012/0179834 A1 7/2012 Van Der
2012/0188069 A1 7/2012 Colombo et al.
2012/0189069 A1 7/2012 Iannuzzelli et al.
2012/0201475 A1 8/2012 Carmel et al.
2012/0201476 A1 8/2012 Carmel et al.
2012/0233345 A1 9/2012 Hannuksela
2012/0240176 A1 9/2012 Ma et al.
2012/0254455 A1 10/2012 Adimatyam et al.
2012/0257678 A1 10/2012 Zhou et al.
2012/0260277 A1 10/2012 Kosciewicz
2012/0263434 A1 10/2012 Wainner et al.
2012/0265562 A1 10/2012 Daouk et al.
2012/0278496 A1 11/2012 Hsu
2012/0288015 A1 11/2012 Zhang et al.
2012/0289147 A1 11/2012 Raleigh et al.
2012/0294355 A1 11/2012 Holcomb et al.
2012/0297039 A1 11/2012 Acuna et al.
2012/0307883 A1 12/2012 Graves
2012/0311094 A1 12/2012 Biderman et al.
2012/0311174 A1 12/2012 Bichot et al.
2012/0314778 A1 12/2012 Salustri et al.
2012/0317235 A1 12/2012 Nguyen et al.
2012/0331167 A1 12/2012 Hunt
2013/0007223 A1 1/2013 Luby et al.
2013/0013730 A1 1/2013 Li et al.
2013/0013803 A1 1/2013 Bichot et al.
2013/0019107 A1 1/2013 Grab et al.
2013/0019273 A1 1/2013 Ma et al.
2013/0041808 A1 2/2013 Pham et al.
2013/0044821 A1 2/2013 Braness et al.
2013/0046849 A1 2/2013 Wolf
2013/0046902 A1 2/2013 Villegas Nuñez et al.
2013/0051554 A1 2/2013 Braness et al.
2013/0054958 A1 2/2013 Braness et al.
2013/0055084 A1 2/2013 Soroushian et al.
2013/0058480 A1 3/2013 Ziskind et al.
2013/0061040 A1 3/2013 Kiefer et al.
2013/0061045 A1 3/2013 Kiefer et al.
2013/0064466 A1 3/2013 Carmel et al.
2013/0066838 A1 3/2013 Singla et al.
2013/0080267 A1 3/2013 McGowan
2013/0094565 A1* 4/2013 Yang et al. ..... 375/240.02
2013/0097309 A1 4/2013 Ma et al.
2013/0114944 A1 5/2013 Soroushian et al.
2013/0124859 A1 5/2013 Pestoni et al.
2013/0128962 A1 5/2013 Rajagopalan et al.
2013/0152767 A1 6/2013 Katz et al.
2013/0159633 A1 6/2013 Lilly
2013/0166580 A1 6/2013 Maharajh
2013/0166765 A1 6/2013 Kaufman
2013/0166906 A1 6/2013 Swaminathan et al.
2013/0170561 A1 7/2013 Hannuksela
2013/0170764 A1 7/2013 Carmel et al.
2013/0173513 A1 7/2013 Chu et al.
2013/0179199 A1 7/2013 Ziskind et al.
2013/0179589 A1 7/2013 McCarthy et al.
2013/0179992 A1 7/2013 Ziskind et al.
2013/0182952 A1 7/2013 Carmel et al.

(56) References Cited

U.S. PATENT DOCUMENTS

2013/0196292 A1 8/2013 Brennen et al.
2013/0212228 A1 8/2013 Butler et al.
2013/0223812 A1 8/2013 Rossi
2013/0226578 A1 8/2013 Bolton et al.
2013/0226635 A1 8/2013 Fisher
2013/0227081 A1 8/2013 Luby et al.
2013/0227111 A1 8/2013 Wright et al.
2013/0227122 A1 8/2013 Gao et al.
2013/0297602 A1 11/2013 Soroushian et al.
2013/0301424 A1 11/2013 Kotecha et al.
2013/0311670 A1 11/2013 Tarbox et al.
2013/0329781 A1 12/2013 Su et al.
2014/0003516 A1 1/2014 Soroushian
2014/0019592 A1 1/2014 Arana et al.
2014/0019593 A1 1/2014 Reznik et al.
2014/0037620 A1 2/2014 Ferree et al.
2014/0052823 A1 2/2014 Gavade et al.
2014/0059156 A1 2/2014 Freeman, II et al.
2014/0096171 A1 4/2014 Shivadas et al.
2014/0096269 A1 4/2014 Amidei et al.
2014/0101722 A1 4/2014 Moore
2014/0114951 A1 4/2014 Sasaki et al.
2014/0115650 A1 4/2014 Zhang et al.
2014/0119432 A1 5/2014 Wang et al.
2014/0140253 A1 5/2014 Lohmar et al.
2014/0140396 A1 5/2014 Wang et al.
2014/0140417 A1* 5/2014 Shaffer et al. ..... 375/240.28
2014/0143301 A1 5/2014 Watson et al.
2014/0143431 A1 5/2014 Watson et al.
2014/0143440 A1* 5/2014 Ramamurthy et al. ..... 709/231
2014/0149557 A1 5/2014 Lohmar et al.
2014/0177734 A1 6/2014 Carmel et al.
2014/0189065 A1 7/2014 Schaar et al.
2014/0201382 A1 7/2014 Shivadas et al.
2014/0211840 A1 7/2014 Butt et al.
2014/0211859 A1 7/2014 Carmel et al.
2014/0241420 A1 8/2014 Orton-jay et al.
2014/0241421 A1 8/2014 Orton-jay et al.
2014/0247869 A1 9/2014 Su et al.
2014/0250473 A1 9/2014 Braness et al.
2014/0258714 A1 9/2014 Grab
2014/0269927 A1 9/2014 Naletov et al.
2014/0269936 A1 9/2014 Shivadas et al.
2014/0280763 A1 9/2014 Grab et al.
2014/0297804 A1 10/2014 Shivadas et al.
2014/0297881 A1 10/2014 Shivadas et al.
2014/0355668 A1 12/2014 Shoham et al.
2014/0359678 A1 12/2014 Shivadas et al.
2014/0359679 A1 12/2014 Shivadas et al.
2014/0359680 A1 12/2014 Shivadas et al.
2014/0376720 A1 12/2014 Chan et al.
2015/0006662 A1 1/2015 Braness
2015/0019550 A1 1/2015 Maharajh et al.
2015/0026677 A1 1/2015 Stevens et al.
2015/0043554 A1 2/2015 Meylan et al.
2015/0049957 A1 2/2015 Shoham et al.
2015/0063693 A1 3/2015 Carmel et al.
2015/0067715 A1 3/2015 Koat et al.
2015/0104153 A1 4/2015 Braness et al.
2015/0117836 A1 4/2015 Amidei et al.
2015/0117837 A1 4/2015 Amidei et al.
2015/0139419 A1 5/2015 Kiefer et al.
2015/0188758 A1 7/2015 Amidei et al.
2015/0188842 A1 7/2015 Amidei et al.
2015/0188921 A1 7/2015 Amidei et al.
2015/0189017 A1 7/2015 Amidei et al.
2015/0189373 A1 7/2015 Amidei et al.
2015/0281310 A1 10/2015 Ziskind et al.
2015/0288530 A1 10/2015 Oyman
2015/0288996 A1 10/2015 Van Der Schaar et al.
2015/0334435 A1 11/2015 Shivadas et al.
2015/0373421 A1 12/2015 Chan et al.
2016/0048593 A1 2/2016 Soroushian et al.
2016/0070890 A1 3/2016 Grab et al.
2016/0112382 A1 4/2016 Kiefer et al.
2016/0149981 A1 5/2016 Shivadas et al.
2016/0219303 A1 7/2016 Braness et al.
2016/0323342 A1 11/2016 Luby et al.
2017/0011055 A1 1/2017 Pitts
2017/0083474 A1 3/2017 Meswani et al.
2017/0214947 A1 7/2017 Kiefer et al.
2017/0223389 A1 8/2017 Soroushian et al.
2017/0238030 A1 8/2017 Ziskind et al.
2017/0280203 A1 9/2017 Chan et al.
2018/0007451 A1 1/2018 Shivadas et al.
2018/0046949 A1 2/2018 Kahn et al.
2018/0060543 A1 3/2018 Grab et al.
2018/0081548 A1 3/2018 Barzik et al.
2018/0131980 A1 5/2018 Van Der Schaar et al.
2018/0220153 A1 8/2018 Braness et al.
2018/0255366 A1 9/2018 Lockett et al.
2018/0262757 A1 9/2018 Naletov et al.
2018/0285261 A1 10/2018 Mandal et al.
2018/0332094 A1 11/2018 Braness
2019/0020907 A1 1/2019 Kiefer et al.
2019/0020928 A1 1/2019 Chan et al.
2019/0045219 A1 2/2019 Braness et al.
2019/0045220 A1 2/2019 Braness et al.
2019/0045234 A1 2/2019 Kiefer et al.
2019/0158553 A1 5/2019 Van Der Schaar et al.
2019/0268596 A1 8/2019 Naletov et al.
2019/0297364 A1 9/2019 van der Schaar et al.
2019/0342587 A1 11/2019 Kiefer et al.
2019/0356928 A1 11/2019 Braness et al.
2020/0059706 A1 2/2020 Shivadas et al.
2020/0396454 A1 12/2020 Naletov et al.
2021/0076082 A1 3/2021 Kiefer et al.
2021/0099504 A1 4/2021 Van Der Schaar et al.
2021/0136429 A1 5/2021 Van Der Schaar et al.
2021/0250608 A1 8/2021 Braness et al.

FOREIGN PATENT DOCUMENTS

CA 2749170 A1 7/2010
CA 2749170 C 6/2016
CA 2823829 C 1/2019
CN 1169229 12/1997
CN 1221284 A 6/1999
CN 1235473 A 11/1999
CN 1629939 A 6/2005
CN 1723696 1/2006
CN 101252401 A 8/2008
CN 102549557 A 7/2012
CN 102549557 B 9/2015
CN 105072454 A 11/2015
CN 105072454 B 4/2019
EP 757484 A2 2/1997
EP 813167 A2 12/1997
EP 0818111 A1 1/1998
EP 0936812 A1 8/1999
EP 0818111 B1 1/2000
EP 1056273 A2 11/2000
EP 1158799 A1 11/2001
EP 1187483 A2 3/2002
EP 1420580 A1 5/2004
EP 1453319 A1 9/2004
EP 1536646 A1 6/2005
EP 1553779 A1 7/2005
EP 1657835 A1 5/2006
EP 1283640 B1 10/2006
EP 1718074 A1 11/2006
EP 2180664 A1 4/2010
EP 2360923 A1 8/2011
EP 2384475 A1 11/2011
EP 2486517 A1 8/2012
EP 2486727 A1 8/2012
EP 2507995 A1 10/2012
EP 2564354 A1 3/2013
EP 2616991 7/2013
EP 2616991 A2 7/2013
EP 2617192 7/2013
EP 2617192 A2 7/2013
EP 2661696 A1 11/2013
EP 2661875 A1 11/2013

(56) References Cited

FOREIGN PATENT DOCUMENTS

| | | | |
|---|---|---|---|
| EP | 2661895 | A2 | 11/2013 |
| EP | 2486727 | A4 | 3/2014 |
| EP | 2564354 | A4 | 3/2014 |
| EP | 2616991 | A4 | 3/2014 |
| EP | 2617192 | A4 | 3/2014 |
| EP | 2716048 | A1 | 4/2014 |
| EP | 2721826 | A1 | 4/2014 |
| EP | 2486517 | | 6/2014 |
| EP | 2486517 | A4 | 6/2014 |
| EP | 2751990 | | 7/2014 |
| EP | 2751990 | A1 | 7/2014 |
| EP | 2807821 | | 12/2014 |
| EP | 2807821 | A2 | 12/2014 |
| EP | 2751990 | A4 | 4/2015 |
| EP | 2661875 | B1 | 11/2019 |
| EP | 2661696 | B1 | 5/2020 |
| EP | 3697096 | A1 | 8/2020 |
| EP | 3700219 | A1 | 8/2020 |
| EP | 3742740 | A1 | 11/2020 |
| EP | 3975574 | A1 | 3/2022 |
| EP | 3742740 | B1 | 5/2022 |
| FR | 2360923 | | 8/2011 |
| GB | 2398210 | A | 8/2004 |
| HK | 1125765 | A | 8/2009 |
| JP | 08046902 | A | 2/1996 |
| JP | 08111842 | A | 4/1996 |
| JP | 08163488 | A | 6/1996 |
| JP | 08287613 | A | 11/1996 |
| JP | 09037225 | A | 2/1997 |
| JP | H1175178 | A | 3/1999 |
| JP | 11164307 | A | 6/1999 |
| JP | 11275576 | A | 10/1999 |
| JP | 11328929 | A | 11/1999 |
| JP | 2000201343 | A | 7/2000 |
| JP | 2001043668 | A | 2/2001 |
| JP | 2001209726 | A | 8/2001 |
| JP | 2001346165 | A | 12/2001 |
| JP | 2002164880 | A | 6/2002 |
| JP | 2002170363 | A | 6/2002 |
| JP | 2002518898 | A | 6/2002 |
| JP | 2002218384 | A | 8/2002 |
| JP | 2003179597 | A | 6/2003 |
| JP | 2003250113 | A | 9/2003 |
| JP | 2004013823 | A | 1/2004 |
| JP | 2004515941 | A | 5/2004 |
| JP | 2004172830 | A | 6/2004 |
| JP | 2004187161 | A | 7/2004 |
| JP | 2004234128 | A | 8/2004 |
| JP | 2004304767 | A | 10/2004 |
| JP | 2004328218 | A | 11/2004 |
| JP | 2005027153 | | 1/2005 |
| JP | 2005504480 | A | 2/2005 |
| JP | 2005080204 | A | 3/2005 |
| JP | 2005173241 | A | 6/2005 |
| JP | 2005284041 | A | 10/2005 |
| JP | 2005286881 | A | 10/2005 |
| JP | 2006155500 | A | 6/2006 |
| JP | 2006521035 | A | 9/2006 |
| JP | 2006524007 | A | 10/2006 |
| JP | 2007036666 | A | 2/2007 |
| JP | 2007174375 | A | 7/2007 |
| JP | 2007235690 | A | 9/2007 |
| JP | 2007535881 | A | 12/2007 |
| JP | 2008235999 | A | 10/2008 |
| JP | 2009522887 | A | 6/2009 |
| JP | 2009530917 | A | 8/2009 |
| JP | 4516082 | B2 | 5/2010 |
| JP | 2012514951 | A | 6/2012 |
| JP | 2013513298 | A | 4/2013 |
| JP | 5200204 | B2 | 6/2013 |
| JP | 2014506430 | A | 3/2014 |
| JP | 5681641 | | 1/2015 |
| JP | 5723888 | B2 | 5/2015 |
| JP | 2015167357 | A | 9/2015 |
| JP | 6038805 | B2 | 12/2016 |
| JP | 6078574 | B2 | 2/2017 |
| JP | 2017063453 | | 3/2017 |
| JP | 2018160923 | A | 10/2018 |
| JP | 6453291 | B2 | 1/2019 |
| JP | 6657313 | B2 | 2/2020 |
| JP | 202080551 | A | 5/2020 |
| JP | 2021158694 | A | 10/2021 |
| JP | 7000475 | B2 | 12/2021 |
| KR | 100221423 | B1 | 9/1999 |
| KR | 2002013664 | | 2/2002 |
| KR | 1020020064888 | A | 8/2002 |
| KR | 20040039852 | A | 5/2004 |
| KR | 20060030164 | A | 4/2006 |
| KR | 20060106250 | A | 10/2006 |
| KR | 20060116967 | A | 11/2006 |
| KR | 100669616 | B1 | 1/2007 |
| KR | 20070005699 | A | 1/2007 |
| KR | 20070020727 | A | 2/2007 |
| KR | 20090016282 | A | 2/2009 |
| KR | 20100106418 | A | 10/2010 |
| KR | 20110133024 | A | 12/2011 |
| KR | 1020130133830 | | 12/2013 |
| KR | 101635876 | B1 | 7/2016 |
| KR | 101874907 | B1 | 7/2018 |
| KR | 101917763 | B1 | 11/2018 |
| KR | 10-1988877 | B1 | 6/2019 |
| KR | 10-2072839 | | 1/2020 |
| KR | 10-2122189 | B1 | 6/2020 |
| KR | 10-2195414 | B1 | 12/2020 |
| KR | 102191317 | B1 | 12/2020 |
| KR | 10-2274290 | B1 | 7/2021 |
| KR | 10-2352043 | B1 | 1/2022 |
| KR | 102408120 | B1 | 6/2022 |
| KR | 102445689 | B1 | 9/2022 |
| MX | 2011007344 | A | 2/2012 |
| MX | 316584 | B | 12/2013 |
| RU | 2328040 | C2 | 6/2008 |
| SG | 146026 | | 12/2010 |
| WO | 1995015660 | A1 | 6/1995 |
| WO | 1996013121 | | 5/1996 |
| WO | 199800973 | A1 | 1/1998 |
| WO | 9731445 | A3 | 4/1998 |
| WO | 1997031445 | A3 | 4/1998 |
| WO | 199834405 | A1 | 8/1998 |
| WO | 1998047290 | | 10/1998 |
| WO | 9910836 | A1 | 3/1999 |
| WO | 1999010836 | A1 | 3/1999 |
| WO | 1999065239 | A2 | 12/1999 |
| WO | 2000049762 | A2 | 8/2000 |
| WO | 2000049763 | A1 | 8/2000 |
| WO | 0104892 | A1 | 1/2001 |
| WO | 2001031497 | A1 | 5/2001 |
| WO | 2001050732 | A2 | 7/2001 |
| WO | 2001065762 | A2 | 9/2001 |
| WO | 2002001880 | A1 | 1/2002 |
| WO | 2002008948 | A2 | 1/2002 |
| WO | 200223315 | A2 | 3/2002 |
| WO | 2003028293 | | 4/2002 |
| WO | 2002035832 | A2 | 5/2002 |
| WO | 2002037210 | A2 | 5/2002 |
| WO | 2002054196 | A2 | 7/2002 |
| WO | 2002054776 | | 7/2002 |
| WO | 2002073437 | A1 | 9/2002 |
| WO | 2002087241 | A1 | 10/2002 |
| WO | 2003030000 | A1 | 4/2003 |
| WO | 2003046750 | A1 | 6/2003 |
| WO | 2003047262 | A2 | 6/2003 |
| WO | 2003061173 | A2 | 7/2003 |
| WO | 2003096136 | A2 | 11/2003 |
| WO | 2004012378 | A2 | 2/2004 |
| WO | 2004054247 | A1 | 6/2004 |
| WO | 2004097811 | A1 | 11/2004 |
| WO | 2004100158 | A1 | 11/2004 |
| WO | 2004102571 | A1 | 11/2004 |
| WO | 2005008385 | A2 | 1/2005 |
| WO | 2005015935 | A1 | 2/2005 |
| WO | 2005050373 | A2 | 6/2005 |
| WO | 2005057906 | A2 | 6/2005 |
| WO | 2005109224 | A2 | 11/2005 |

(56) References Cited

FOREIGN PATENT DOCUMENTS

| | | | |
|---|---|---|---|
| WO | 2005125214 | A2 | 12/2005 |
| WO | 2006018843 | A2 | 2/2006 |
| WO | 20060012398 | A2 | 2/2006 |
| WO | 2006018843 | A3 | 12/2006 |
| WO | 2007044590 | A2 | 4/2007 |
| WO | 2007072257 | A1 | 6/2007 |
| WO | 2007073347 | A1 | 6/2007 |
| WO | 2007093923 | A1 | 8/2007 |
| WO | 2007101182 | A2 | 9/2007 |
| WO | 2007113836 | A2 | 10/2007 |
| WO | 2008010275 | A1 | 1/2008 |
| WO | 2008032908 | A1 | 3/2008 |
| WO | 2008042242 | A2 | 4/2008 |
| WO | 2008086313 | A1 | 7/2008 |
| WO | 2008090859 | A1 | 7/2008 |
| WO | 2007113836 | A3 | 11/2008 |
| WO | 2008135932 | A2 | 11/2008 |
| WO | 2007113836 | B1 | 12/2008 |
| WO | 2009006302 | A1 | 1/2009 |
| WO | 2009065137 | A1 | 5/2009 |
| WO | 2009070770 | A1 | 6/2009 |
| WO | 2009109976 | A2 | 9/2009 |
| WO | 2010005673 | | 1/2010 |
| WO | 2010060106 | A1 | 5/2010 |
| WO | 2010080911 | A1 | 7/2010 |
| WO | 2010089962 | A1 | 8/2010 |
| WO | 2010108053 | A1 | 9/2010 |
| WO | 2010111261 | A1 | 9/2010 |
| WO | 2010122447 | A1 | 10/2010 |
| WO | 2010147878 | A1 | 12/2010 |
| WO | 2011042898 | A1 | 4/2011 |
| WO | 2011042900 | A1 | 4/2011 |
| WO | 2011068668 | A1 | 6/2011 |
| WO | 2011086190 | A1 | 7/2011 |
| WO | 2011087449 | A1 | 7/2011 |
| WO | 2011101371 | A1 | 8/2011 |
| WO | 2011103364 | A1 | 8/2011 |
| WO | 2011132184 | A1 | 10/2011 |
| WO | 2011135558 | A1 | 11/2011 |
| WO | 2012035533 | A2 | 3/2012 |
| WO | 2012035534 | A2 | 3/2012 |
| WO | 2012035534 | A3 | 7/2012 |
| WO | 2012094171 | A1 | 7/2012 |
| WO | 2012094181 | A2 | 7/2012 |
| WO | 2012094189 | A1 | 7/2012 |
| WO | 20120094181 | A2 | 7/2012 |
| WO | 20120094189 | A1 | 7/2012 |
| WO | 2012035533 | A3 | 8/2012 |
| WO | 2012162806 | A1 | 12/2012 |
| WO | 2012171113 | A1 | 12/2012 |
| WO | 2013030833 | A1 | 3/2013 |
| WO | 2013032518 | A2 | 3/2013 |
| WO | 2013103986 | A2 | 7/2013 |
| WO | 2013111126 | A2 | 8/2013 |
| WO | 2013111126 | A3 | 8/2013 |
| WO | 2013032518 | A3 | 9/2013 |
| WO | 2013144942 | A1 | 10/2013 |
| WO | 2014145901 | A1 | 9/2014 |
| WO | 2014193996 | A2 | 12/2014 |
| WO | 2014193996 | A3 | 2/2015 |
| WO | 2015031982 | A1 | 3/2015 |
| WO | 2013111126 | A3 | 6/2015 |

OTHER PUBLICATIONS

Chinese Patent Application 201180060590.1 office action dated Aug. 6, 2015, 11 pgs.
Examination report for GB1308663.2, dated May 18, 2016, 3 pgs.
Extended European Search Report for European Application No. 21208230.9, Search completed Feb. 18, 2022, dated Mar. 1, 2022, 15 Pgs.
Filed Application and Filing Receipt for U.S. Appl. No. 61/359,748, Application filed Jun. 29, 2010, Receipt mailed Jul. 13, 2010, 38 pages.
Great Britain Application GB1308663.2 search report dated Jan. 5, 2017, 1 pg.
ISO/IEC 14496-12 Information technology—Coding of audio-visual objects—Part 12: ISO base media file format, Amendment 3: DASH support and RTP reception hint track processing, 2011, 44 pgs.
ISO/IEC CD 23001-6 MPEG systems technologies Part 6: Dynamic adaptive streaming over HTTP (DASH), Oct. 15, 2010, 70 pgs.
ISO/IEC DIS 23009-1, Information technology—Dynamic adaptive streaming over HTTP (DASH)—Part 1: Media presentation description and segment formats, dated Aug. 30, 2011, 132 pgs.
ISO/IEC JTC1/SC29/WG11, MPEG/M18620, Oct. 2010, Text of ISO/IEC 23001-6: Dynamic adaptive streaming over http (DASH), 72 pgs.
ISO/IEC JTC1/SC29/WG11, MPEG/N11578, Text of ISO/IEC 23001-6: Dynamic adaptive streaming over HTTP (DASH), Oct. 2010, 70 pgs.
ISO/IEC JTC1/SC29-WG11—Coding of Moving Pictures and Audio, MPEG2010/M18692, Jan. 2010, 10 pgs.
Search Report for Canadian patent application 2,816,621, dated Oct. 30, 2014, 6 pgs.
Search report for European Patent Application 11838186.2, dated Jul. 13, 2017, 6 pgs.
"Pixel aspect ratio—Wikipedia", Nov. 24, 2010, pp. 1-8.
Hunt, "Encoding for streaming", The Netflix Blog, Nov. 6, 2008, printed from https://web.archive.org/web/20081216044437/http://blog.netflix.com/2008/11/encoding-for-streaming.htm., retrieved on Feb. 8, 2022, 28 pgs.
Pereira, "Security on Over the Top TV Services", Thesis, Nov. 2011, 114 pgs.
Stockhammer, "MPEG's Dynamic Adaptive Streaming over HTTP (DASH)—An Enabling Standard for Internet TV", Qualcomm Incorporated, Apr. 11, 2015, Retrieved from the Internet, https://www.w3.org/2011/09/webtv/slides/W3C-Workshop.pdf, 30 pgs.
"IBM Closes Cryptolopes Unit," Dec. 17, 1997, CNET News, Printed on Apr. 25, 2014 from http://news.cnet.com/IBM-closes-Cryptolopes-unit/2100-1001_3206465.html, 3 pages.
Written Opinion for International Application No. PCT/US2007/063950 filed Mar. 14, 2007, report completed Mar. 1, 2008; report dated Mar. 19, 2008, 6 pgs.
U.S. Appl. No. 13/905,804, "Notice of Allowance," dated Aug. 12, 2015, 8 pgs.
Broadq—The Ultimate Home Entertainment Software, printed May 11, 2009 from ittp://web.srchive.org/web/20030401122010/www.broadq.com/qcasttuner/, 1 pg.
Cloakware Corporation, "Protecting Digital Content Using Cloakware Code Transformation Technology", Version 1.2, May 2002, pp. 1-10.
EP11774529 Supplementary European Search Report, completed Jan. 31, 2014, 2 pgs.
European Search Report Application No. EP 08870152, Search Completed May 19, 2011, dated May 26, 2011, 9 pgs.
European Supplementary Search Report for Application EP09759600, completed Jan. 25, 2011, 11 pgs.
Extended European Search Report for European Application EP10821672, completed Jan. 30, 2014, 3 pgs.
Extended European Search Report for European Application EP11824682, completed Feb. 6, 2014, 4 pgs.
Extended European Search Report for European Application No. 14763140.2, Search completed Sep. 26, 2016, dated Oct. 5, 2016, 9 Pgs.
Extended European Search Report for European Application No. 20172313.7 Search completed Aug. 19, 2020 dated Aug. 27, 2020, 11 Pgs.
Final draft ETSI ES 202 109, V1.1.1, ETSI Standard, Terrestrial Trunked Radio (TETRA); Security; Synchronization mechanism for end-to-end encryption, Oct. 2002, 17 pgs.
IBM Corporation and Microsoft Corporation, "Multimedia Programming Interface and Data Specifications 1.0", Aug. 1991, printed from http://www.kk.iij4u.or.jp/~kondo/wave/mpidata.txt on Mar. 6, 2006, 100 pgs.

(56) References Cited

OTHER PUBLICATIONS

Information Technology—MPEG Systems Technologies—Part 7: Common Encryption in ISO Base Media File Format Files (ISO/IEC 23001-7), Apr. 2015, 24 pgs.
InformationWeek, "Internet on Wheels", InformationWeek: Front End: Daily Dose, Jul. 20, 1999, Printed on Mar. 26, 2014, 3 pgs.
International Preliminary Report for Application No. PCT/US2011/066927, Filed Dec. 22, 2011, Report dated Jul. 10, 2013, 13 pgs.
International Preliminary Report for International Application No. PCT/US2011/067243, International Filing Date Dec. 23, 2011, dated Jul. 10, 2013, 7 pgs.
International Preliminary Report on Patentability for International Application PCT/US14/30747, Report dated Sep. 15, 2015, dated Sep. 24, 2015, 6 Pgs.
International Preliminary Report on Patentability for International Application No. PCT/US2007/063950, Report Completed Dec. 18, 2009, 3 pgs.
International Preliminary Report on Patentability for International Application No. PCT/US2008/083816, dated May 18, 2010, 6 pgs.
International Preliminary Report on Patentability for International Application No. PCT/US2010/56733, dated Jun. 5, 2012, 5 pgs.
International Preliminary Report on Patentability for International Application No. PCT/US2011/068276, dated Mar. 4, 2014, 23 pgs.
International Preliminary Report on Patentability for International Application PCT/US2011/067167, dated Feb. 25, 2014, 8 pgs.
International Preliminary Report on Patentability for International Application PCT/US2013/043181, dated Dec. 31, 2014, dated Jan. 8, 2015, 11 Pgs.
International Preliminary Report on Patentability for International Application PCT/US2014/039852, dated Dec. 1, 2015, dated Dec. 5, 2015, 8 Pgs.
International Search Report and Written Opinion for International Application No. PCT/US07/63950, completed Feb. 19, 2008; dated Mar. 19, 2008, 9 pgs.
International Search Report and Written Opinion for International Application No. PCT/US08/87999, completed Feb. 7, 2009, dated Mar. 19, 2009, 6 pgs.
International Search Report and Written Opinion for International Application No. PCT/US09/46588, completed Jul. 13, 2009, dated Jul. 23, 2009, 7 pgs.
International Search Report and Written Opinion for International Application No. PCT/US2004/041667, completed May 24, 2007, dated Jun. 20, 2007, 6 pgs.
International Search Report and Written Opinion for International Application No. PCT/US2005/025845, completed Feb. 5, 2007 and dated May 10, 2007, 8 pgs.
International Search Report and Written Opinion for International Application No. PCT/US2008/083816, completed Jan. 10, 2009, dated Jan. 22, 2009, 7 pgs.
International Search Report and Written Opinion for International Application No. PCT/US2010/020372, Completed Feb. 10, 2009, dated Mar. 1, 2010, 8 pgs.
International Search Report and Written Opinion for International Application No. PCT/US2010/56733, Completed Jan. 3, 2011, dated Jan. 14, 2011, 9 pgs.
International Search Report and Written Opinion for International Application No. PCT/US2011/067243, International Filing Date Dec. 23, 2011, Search Completed Apr. 24, 2012, dated May 8, 2012, 8 pgs.
International Search Report and Written Opinion for International Application No. PCT/US2013/043181, completed Nov. 27, 2013, dated Dec. 6, 2013, 12 pgs.
International Search Report and Written Opinion for International Application PCT/US14/30747, completed Jul. 30, 2014, dated Aug. 22, 2014, 7 Pgs.
International Search Report and Written Opinion for International Application PCT/US14/39852, completed Oct. 21, 2014, dated Dec. 5, 2014, 11 pgs.
International Search Report and Written Opinion for International Application PCT/US2011/066927, completed Apr. 3, 2012, dated Apr. 20, 2012, 14 pgs.
International Search Report and Written Opinion for International Application PCT/US2011/067167, completed Jun. 19, 2012, dated Jul. 2, 2012, 11 pgs.
International Search Report and Written Opinion for International Application PCT/US2011/068276, completed Jun. 19, 2013, dated Jul. 8, 2013, 24 pgs.
International Search Report and Written Opinion for PCT/US2013/020572, International Filing Date Jan. 7, 2013, Search Completed Mar. 19, 2013, dated Apr. 29, 2013, 10 pgs.
International Telecommunication Union, Telecommunication Standardization Sector of ITU, H.233, Line Transmission of Non-Telephone Signals, Confidentiality System for Audiovisual Services, ITU-T Recommendation H.233, Mar. 1993, 18 pgs.
ISO/IEC 14496-12 Information technology—Coding of audio-visual objects—Part 12: ISO base media file format, Feb. 2004 ("MPEG-4 Part 12 Standard"), 62 pgs.
ISO/IEC 14496-12:2008(E) Informational Technology—Coding of Audio-Visual Objects Part 12: ISO Base Media File Format, Oct. 2008, 120 pgs.
ISO/IEC FCD 23001-6 MPEG systems technologies Part 6: Dynamic adaptive streaming over HTTP (DASH), Jan. 28, 2011, 86 pgs.
ITS International, "Fleet System Opts for Mobile Server", Aug. 26, 1999, Printed on Oct. 21, 2011 from http://www.itsinternational.com/News/article.cfm?recordID=547, 2 pgs.
Lifehacker—Boxqueue Bookmarklet Saves Videos for Later Boxee Watching, printed Jun. 16, 2009 from http://feeds.gawker.com/~r/lifehacker/full/~3/OHvDmrlgZZc/boxqueue-bookmarklet-saves-videos-for-late-boxee-watching, 2 pgs.
Linksys Wireless-B Media Adapter Reviews, printed May 4, 2007 from http://reviews.cnet.com/Linksys_Wireless_B_Media_Adapter/4505-6739_7-30421900.html?tag=box, 5 pgs.
Linksys, Kiss DP-500, printed May 4, 2007 from http://www.kiss-technology.com/?p=dp500, 2 pgs.
Linksys®: "Enjoy your digital music and pictures on your home entertainment center, without stringing wires!", Model No. WMA 11B, printed May 9, 2007 from http://www.linksys.com/servlet/Satellite?c=L_Product_C2&childpagename=US/Layout&cid=1115416830950&p.
Microsoft Corporation, "Chapter 8, Multimedia File Formats" 1991, Microsoft Windows Multimedia Programmer's Reference, 3 cover pgs, pp. 8-1 to 8-20.
Microsoft Corporation, Advanced Systems Format (ASF) Specification, Revision 01.20.03, Dec. 2004, 121 pgs.
Microsoft Media Platform: Player Framework, "Microsoft Media Platform: Player Framework v2.5 (formerly Silverlight Media Framework)", May 3, 2011, 2 pages.
Microsoft Media Platform: Player Framework, "Silverlight Media Framework v1.1", Jan. 2010, 2 pages.
Microsoft Windows® XP Media Center Edition 2005, Frequently asked Questions, printed May 4, 2007 from http://www.microsoft.com/windowsxp/mediacenter/evaluation/faq.mspx.
Microsoft Windows® XP Media Center Edition 2005: Features, printed May 9, 2007, from http://www.microsoft.com/windowsxp/mediacenter/evaluation/features.mspx, 4 pgs.
MPEG-DASH presentation at Streaming Media West 2011, Nov. 2011, 14 pgs.
Office Action for Chinese Patent Application No. CN200880127596.4, dated May 6, 2014, 8 pgs.
Office Action for U.S. Appl. No. 13/223,210, dated Apr. 30, 2015, 14 pgs.
Office Action for U.S. Appl. No. 14/564,003, dated Apr. 17, 2015, 28 pgs.
Open DML AVI-M-JPEG File Format Subcommittee, "Open DML AVI File Format Extensions", Version 1.02, Feb. 28, 1996, 29 pgs.
PC world.com, Future Gear: PC on the HiFi, and the TV, from http://www.pcworld.com/article/id, 108818-page, 1/article.html, printed May 4, 2007, from IDG Networks, 2 pgs.
Pomelo, LLC Tech Memo, Analysis of Netflix's Security Framework for 'Watch Instantly' Service, March-Apr. 2009, 18 pgs.

(56) References Cited

OTHER PUBLICATIONS

Qtv—About BroadQ, printed May 11, 2009 from http://www.broadq.com/en/about.php, 1 pg.
Server-Side Stream Repackaging (Streaming Video Technologies Panorama, Part 2), Jul. 2011, 15 pgs.
Supplementary European Search Report for Application No. EP 04813918, Search Completed Dec. 19, 2012, 3 pgs.
Supplementary European Search Report for Application No. EP 10729513, completed Dec. 9, 2013, 4 pgs.
Supplementary European Search Report for EP Application 11774529, completed Jan. 31, 2014, 2 pgs.
Supplementary European Search Report for European Application No. 07758499.3, Report Completed Jan. 25, 2013, 8 pgs.
Text of ISO/IEC 23001-6: Dynamic adaptive streaming over HTTP (DASH), Oct. 2010, 71 pgs.
Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
Windows Media Center Extender for Xbox, printed May 9, 2007 from http://www.xbox.com/en-US/support/systemuse/xbox/console/mediacenterextender.htm, 2 pgs.
Windows® XP Media Center Edition 2005, "Experience more entertainment", retrieved from http://download.microsoft.com/download/c/9/a/c9a7000a-66b3- 455b-860b-1c16f2eecfec/MCE.pdf on May 9, 2007, 2 pgs.
3GPP TS 26.247, V1.3.0, 3rd Generation Partnership Project; Technical Specification Group Services and System Aspects Transparent end-to-end Packet-switches Streaming Services (PSS);, Progressive Download and Dynamic Adaptive Streaming over http (3GP-DASH) (Release 10), Mar. 2011, 72 pgs.
Written Opinion for International Application No. PCT/US2008/083816, Opinion completed Jan. 10, 2009, dated Jan. 22, 2009, 5 pgs.
Written Opinion for International Application No. PCT/US2009/046588, completed Jul. 14, 2009, dated Jul. 23, 2009, 5 pgs.
Written Opinion of the International Searching Authority for International Application No. PCT/US 08/87999, date completed Feb. 7, 2009, dated Mar. 19, 2009, 4 pgs.
International Search Report and Written Opinion for International Application PCT/US2010/020372, Search Report dated Mar. 1, 2010, 7 pgs.
Written Opinion for International Application No. PT/US2005/025845 filed Jul. 21, 2005, report completed Feb. 5, 2007 and dated May 10, 2007, 5 pgs.
Written Opinion for International Application No. PCT/US2004/041667, Filing Date Dec. 8, 2004, Report Completed May 24, 2007, dated Jun. 20, 2007, 4 pgs.
Written Opinion for International Application No. PCT/US2005/025845, completed Feb. 5, 2007 and dated May 10, 2007, 6 pgs.
Innovation of technology arrived, I-O Data, Nov. 2004, Retrieved from http://www.iodata.com/catalogs/AVLP2DVDLA_Flyer200505.pdf on May 30, 2013, 2 pgs., I-O Data, 2 pgs.
"Adaptive Streaming Comparison", Jan. 28, 2010, 5 pgs.
"Adobe Flash Video File Format Specification", Aug. 2010, Version 10.1, 89 pages.
"Apple HTTP Live Streaming specification", Aug. 2017, 60 pgs.
"Best Practices for Multi-Device Transcoding", Kaltura Open Source Video, Printed on Nov. 27, 2013 from knowledge.kaltura.com/best-practices-multi-device-transcoding, 13 pgs.
"Container format (digital)", printed Aug. 22, 2009 from http://en.wikipedia.org/wiki/Container_format_(digital), 4 pgs.
"Data Encryption Decryption using AES Algorithm, Key and Salt with Java Cryptography Extension", Available at https://www.digizol.com/2009/10/java-encrypt-decrypt-jce-salt.html, Oct. 200, 6 pgs.
"Delivering Live and On-Demand Smooth Streaming", Microsoft Silverlight, 2009, 28 pgs.
"Diagram | Matroska", Dec. 17, 2010, Retrieved from http://web.archive.org/web/201 01217114656/http://matroska.org/technical/diagram/index.html on Jan. 29, 2016, 5 pages, Dec. 17, 2010.
"Draft CR: Trick Mode for HTTP Streaming", 3GPP TSG-SA4 Meeting #58, Apr. 26-30, 2010, Vancouver, Canada, S4-100237, 3 pgs.
"DVD—MPeg differences", printed Jul. 2, 2009 from http://dvd.sourceforge.net/dvdinfo/dvdmpeg.html, 1 pg.
"DVD subtitles", sam.zoy.org/writings/dvd/subtitles, dated Jan. 9, 2001, printed Jul. 2, 2009, 4 pgs.
"Final Committee Draft of MPEG-4 streaming text format", International Organisation for Standardisation, Feb. 2004, 22 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"IBM Spearheading Intellectual Property Protection Technology for Information on the Internet; Cryptolope Containers Have Arrived", May 1, 1996, Business Wire, Printed on Aug. 1, 2014 from http://www.thefreelibrary.com/IBM+Spearheading+Intellectual+Property+Protection+Technology+for...-a018239381, 6pg.
"Information Technology—Coding of audio-visual objects—Part 14: MP4 file format", International Standard, ISO/IEC 14496-14, First Edition, Nov. 15, 2003, 18 pages.
"Information Technology—Coding of audio-visual objects—Part 17: Streaming text", International Organisation for Standardisation, Feb. 2004, 22 pgs.
"Information technology—Coding of audio-visual objects—Part 18: Font compression and streaming", ISO/IEC 14496-18, First edition Jul. 1, 2004, 26 pgs.
"Information technology—Generic coding of moving pictures and associated audio information: Systems", International Standard ISO/IEC 13818-1, Second Edition, Dec. 1, 2000, 174 pages (presented in two parts).
"Information Technology—Coding of Audio Visual Objects—Part 2: Visual", International Standard, ISO/IEC 14496-2, Third Edition, Jun. 1, 2004, pp. 1-724. (presented in three parts).
"Information-Technology—Generic coding of moving pictures and associated audio: Systems, Recommendation H.222.0", International Standard, ISO/IEC 13818-1, Draft 1209, Apr. 25, 1995, 151 pages.
"Information-Technology—Generic coding of moving pictures and associated audio: Systems, Recommendation H.222.0", International Standard, ISO/IEC 13818-1, Draft 1540, Nov. 13, 1994, 161 pages.
"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
"Kiss Players, Kiss DP-500", retrieved from http://www.kiss-technology.com/?p=dp500 on May 4, 2007, 1 pg.
"Live and On-Demand Video with Silverlight and IIS Smooth Streaming", Microsoft Silverlight, Windows Server Internet Information Services 7.0, Feb. 2010, 15 pgs.
"Matroska", Wikipedia, Jul. 10, 2017, retrieved from https://en.wikipedia.org/wiki/Matroska on Jul. 20, 2017, 3 pages.
"Matroska Streaming | Matroska", Retrieved from the Internet: URL:http://web.archive.org/web/201 0121711431 O/http://matroska.org/technical!streaming/index.html [retrieved on Jan. 29, 2016], Dec. 17, 2010.
"Microsoft Smooth Streaming specification", Jul. 22, 2013, 56 pgs.
"MovieLabs Specification for Next Generation Video—Version 1.0", Motion Picture Laboratories, Inc., 2013, Retrieved from: http://movielabs.com/ngvideo/MovieLabs%20Specification%20for%20Next%20Generation%20Video%20v1.0.pdf, 5 pgs.
"MPEG-2", Wikipedia, Jun. 13, 2017, retrieved from https://en.wikipedia.org/wiki/MPEG-2 on Jul. 20, 2017, 13 pages.
"MPEG-4 File Format, Version 2", Sustainability of Digital Formats: Planning for Library of Congress Collections, Retrieved from:

(56) References Cited

OTHER PUBLICATIONS https://www.loc.gov/preservation/digital/formats/fdd/fdd000155.shtml, Last updated Feb. 21, 2017, 8 pgs.
"MPEG-4 Part 14", Wikipedia, Jul. 10, 2017, retrieved from https://en.wikipedia.org/wiki/MPEG-4_Part_14 on Jul. 20, 2017, 5 pages.
"Netflix turns on subtitles for PC, Mac streaming", Yahoo! News, Apr. 21, 2010, Printed on Mar. 26, 2014, 3 pgs.
"OpenDML AVI File Format Extensions",  check for duplicate OpenDML AVIM-JPEG File Format Subcommittee, retrieved from www.the-labs.com/Video/odmlff2-avidef.pdf, Sep. 1997, 42 pgs.
"OpenDML AVI File Format Extensions Version 1.02", OpenDML AVI MJPEG File Format Subcommittee. Last revision: Feb. 28, 1996. Reformatting: Sep. 1997, 42 pgs.
"QCast Tuner for PS2", printed May 11, 2009 from http://web.archive.org/web/20030210120605/www.divx.com/software/detail.php?ie=39, 2 pgs.
"Series H: Audiovisual and Multimedia Systems Infrastructure of audiovisual services—Coding of moving video; High efficiency video coding", International Telecommunication Union, ITU-T H.265, Apr. 2015, 634 pages (presented in six parts).
"Single-Encode Streaming for Multiple Screen Delivery", Telestream Wowza Media Systems, 2009, 6 pgs.
"Smooth Streaming Client", The Official Microsoft IIS Site, Sep. 24, 2010, 4 pages.
"Specifications | Matroska", Retrieved from the Internet: URL:http://web.archive.org/web/201 00706041303/http:/1www.matroska.org/technical/specs/index.html [retrieved on Jan. 29, 2016, Jul. 6, 2010.
"Specifications Matroska", Dec. 17, 2010, [retrieved on Mar. 2, 2018], 12 pages.
"Supplementary European Search Report for Application No. EP 10834935, International Filing Date Nov. 15, 2010, Search Completed May 27, 2014, 9 pgs."
"Supported Media Formats", Supported Media Formats, Android Developers, Printed on Nov. 27, 2013 from developer.android.com/guide/appendix/media-formats.html, 3 pgs.
"SWF and FLV File Format Specification", Adobe, Jun. 2007, Version 9, 298 pages.
"Text of ISO/IEC 14496-18/COR1, Font compression and streaming", ITU Study Group 16—Video Coding Experts Group—ISO/IEC MPEG & ITU-T VCEG(ISO/IEC JTC1/SC29/WG11 and ITU-T SG16 06), No. N8664, Oct. 27, 2006, 8 pgs.
"Text of ISO/IEC 14496-18/FDIS, Coding of Moving Pictures and Audio", ITU Study Group 16—Videocoding Experts Group—ISO/IEC MPEG & ITU-T VCEG(ISO/IEC JTC1/SC29/WG11 and ITU-T SG16 06), No. N6215, Dec. 2003, 26 pgs.
"The MPEG-DASH Standard for Multimedia Streaming Over the Internet", IEEE MultiMedia, vol. 18, No. 4, 2011, 7 pgs.
"Thread: SSME (Smooth Streaming Medial Element) config.xml review (Smooth Streaming Client configuration file)", Printed on Mar. 26, 2014, 3 pgs.
"Transcoding Best Practices", From movideo, Printed on Nov. 27, 2013 from code.movideo.com/Transcoding_Best_Practices, 5 pgs.
"Using HTTP Live Streaming", iOS Developer Library, http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, Feb. 11, 2014, 10 pgs.
"Video File Format Specification", Adobe, Apr. 2008, Version 9, 46 pages.
"Video Manager and Video Title Set IFO file headers", printed Aug. 22, 2009 from http://dvd.sourceforge.net/dvdinfo/ifo.htm, 6 pgs.
"What is a DVD?", printed Aug. 22, 2009 from http://www.videohelp.com/dvd, 8 pgs.
"What is a VOB file", http://www.mpucoder.com/DVD/vobov.html, printed on Jul. 2, 2009, 2 pgs.
"What's on a DVD?", printed Aug. 22, 2009 from http://www.doom9.org/dvd-structure.htm, 5 pgs.
"Windows Media Player 9", Microsoft, Mar. 23, 2017, 3 pgs.
"DVD-Mpeg differences", printed on Jul. 2, 2009, http://dvd.sourceforge.net/dvdinfo/dvdmpeg.html, 1 pg.
Casares, Juan et al., "Simplifying Video Editing Using Metadata". Long et al., "Silver: Simplifying Video Editing with Metadata", CHI 2003: New Horizons, Apr. 5-10, 2003, pp. 628-629.
U.S. Appl. No. 13/224,298, "Final Office Action", dated May 19, 2014, 26 pgs.
U.S. Appl. No. 13/905,804, "Non-Final Office Action Received", U.S. Appl. No. 13/905,804, "Non-Final Office Action", dated Jul. 25, 2014, 15 pgs.
Abomhara et al., "Enhancing Selective Encryption for H.264/AVC Using Advanced Encryption Standard", International Journal of computer Theory and Engineering, Apr. 2010, vol. 2, No. 2, pp. 223-229.
Adams et al., "Will http adaptive streaming become the dominant mode of video delivery in cable networks?", https://www.nctatechnicalpapers.com/Paper/2011/2011-will-http-adaptive-streaming-become-the-dominant-mode-of-video-delivery-in-cable-networks-, 10 pgs.
Adhikari et al., "Unreeling Netflix: Understanding and Improving Multi-CDN Movie Delivery", 2012 Proceedings IEEE InfoCom, Mar. 25-30, 2012, Orlando, Florida, 9 pgs.
Adzic et al., "Optimized Adaptive HTTP Streaming for Mobile Devices", International Society for Optics and Photonics, Applications of Digital Image Processing XXXIV, vol. 8135, Sep. 2011, p. 81350T.
Akhshabi et al. "An Experimental Evaluation of Rate-Adaptation Algorithms in Adaptive Streaming over HTTP", MMSys'11, Feb. 23-25, 2011, 12 pgs.
Alattar et al., A.M, "Improved selective encryption techniques for secure transmission of MPEG video bit-streams", In Proceedings 1999 International Conference on Image Processing (Cat. 99CH36348), vol. 4, IEEE, 1999, pp. 256-260.
Anonymous, "Method for the encoding of a compressed video sequence derived from the same video sequence compressed at a different bit rate without loss of data", ip.com, ip.com No. IPCOM000008165D, May 22, 2002, pp. 1-9.
Antoniou et al., "Adaptive Methods for the Transmission of Video Streams in Wireless Networks", 2015, 50 pgs.
Apostolopoulos et al., "Secure Media Streaming and Secure Transcoding", Multimedia Security Technologies for Digital Rights Management, 2006, 33 pgs.
Asai et al., "Essential Factors for Full-Interactive VOD Server: Video File System, Disk Scheduling, Network", Proceedings of Globecom '95, Nov. 14-16, 1995, 6 pgs.
Author Unknown, "Blu-ray Disc—Blu-ray Disc—Wikipedia, the free encyclopedia", printed Oct. 30, 2008 from http://en.wikipedia.org/wiki/Blu-ray_Disc, 11 pgs.
Author Unknown, "Blu-ray Movie Bitrates Here—Blu-ray Forum", printed Oct. 30, 2008 from http://forum.blu-ray.com/showthread.php?t=3338, 6 pgs.
Author Unknown, "MPEG-4 Video Encoder: Based on International Standard ISO/IEC 14496-2", Patni Computer Systems, Ltd., printed Jan. 24, 2007, USA, pp. 1-15.
Author Unknown, "O'Reilly—802.11 Wireless Networks: The Definitive Guide, Second Edition", printed Oct. 30, 2008 from http://oreilly.com/catalog/9780596100520, 2 pgs.
Author Unknown, "Turbo-Charge Your Internet and PC Performance", printed Oct. 30, 2008 from Speedtest.net—The Global Broadband Speed Test, 1 pg.
Author Unknown, "White paper, The New Mainstream Wireless LAN Standard", Broadcom Corporation, Jul. 2003, 12 pgs.
Beker et al., "Cipher Systems, The Protection of Communications", 1982, 40 pgs.
Blasiak, "Video Transrating and Transcoding: Overview of Video Transrating and Transcoding Technologies", Ingenient Technologies, TI Developer Conference, Aug. 6-8, 2002, 22 pgs.
Bloom et al., "Copy Protection for DVD Video", Proceedings of the IEEE, vol. 87, No. 7, Jul. 1999, pp. 1267-1276.
Bocharov et al., "Portable Encoding of Audio-Video Objects, The Protected Interoperable File Format (PIFF)", Microsoft Corporation, First Edition Sep. 8, 2009, 30 pgs.
Bross et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC

(56) References Cited

OTHER PUBLICATIONS

1/SC 29/WG 11, Document: JCTVC-L1003_v34, 12th Meeting: Geneva, CH, Jan. 14-23, 2013 (presented in three parts).
Bulterman et al. "Synchronized Multimedia Integration Language (SMIL 3.0)", W3C Recommendation, Dec. 1, 2008, https://www.w3.org/TR/2008/REC-SMIL3-20081201/, 321 pgs. (presented in five parts).
Cahill et al., "Locally Adaptive Deblocking Filter for Low Bit Rate Video", Proceedings 2000 International Conference on Image Processing, Sep. 10-13, 2000, Vancouver, BC, Canada, 4 pgs.
Candelore, U.S. Appl. No. 60/372,901, filed Apr. 17, 2002, 5 pgs.
Casares et al., "Simplifying Video Editing Using Metadata", DIS2002, 2002, pp. 157-166.
Chaddha et al., "A Frame-work for Live Multicast of Video Streams over the Internet", Proceedings of 3rd IEEE International Conference on Image Processing, Sep. 19, 1996, Lausanne, Switzerland, 4 pgs.
Cheng, "Partial Encryption for Image and Video Communication", Thesis, Fall 1998, 95 pgs.
Cheng et al., "Partial encryption of compressed images and videos", IEEE Transactions on Signal Processing, vol. 48, No. 8, Aug. 2000, 33 pgs.
Cheung et al., "On the Use of Destination Set Grouping to Improve Fairness in Multicast Video Distribution", Proceedings of IEEE INFOCOM'96, Conference on Computer Communications, vol. 2, IEEE, 1996, 23 pgs.
Collet, "Delivering Protected Content, An Approach for Next Generation Mobile Technologies", Thesis, 2010, 84 pgs.
Concolato et al., "Live HTTP Streaming of Video and Subtitles within a Browser", MMSys 2013, Feb. 26-Mar. 1, 2013, Oslo, Norway, 5 pgs.
De Cock et al., "Complexity-Based Consistent-Quality Encoding in the Cloud", IEEE International Conference on Image Processing (ICIP), Date of Conference Sep. 25-28, 2016, Phoenix, AZ, pp. 1484-1488.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 29, 2011, 14 pgs.
Diamantis et al., "Real Time Video Distribution using Publication through a Database", Proceedings SIBGRAPI'98. International Symposium on Computer Graphics, Image Processing, and Vision (Cat. No. 98EX237), Oct. 1990, 8 pgs.
Dworkin, "Recommendation for Block Cipher Modes of Operation: Methods and Techniques", NIST Special Publication 800-38A, 2001, 66 pgs.
Eskicioglu et al., "An Integrated Approach to Encrypting Scalable Video", Proceedings IEEE International Conference on Multimedia and Expo, Aug. 26-29, 2002, Lausanne, Switzerland, 4 pgs.
Fang et al., "Real-time deblocking filter for MPEG-4 systems", Asia-Pacific Conference on Circuits and Systems, Oct. 28-31, 2002, Bail, Indonesia, pp. 541-544.
Fecheyr-Lippens, "A Review of HTTP Live Streaming", check for duplicate Internet Citation, Jan. 25, 2010, pp. 1-37.
Fecheyr-Lippens, "A Review of HTTP Live Streaming", Jan. 2010, 38 pgs.
Fielding et al., "Hypertext Transfer Protocol—HTTP1.1", Network Working Group, RFC 2616, Jun. 1999, 114 pgs.
Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, pp. 969-972.
Garg et al., "An Experimental Study of Throughput for UDP and VoIP Traffic in IEEE 802.11b Networks", Wireless Communications and Networkings, Mar. 2003, pp. 1748-1753.
Gast, "When is 54 Not Equal to 54? A Look at 802.11a, b and g Throughput", Aug. 8, 2003, printed Oct. 30, 2008 from www.oreillynet.com/pub/a/wireless/2003/08/08/wireless_throughput.html, 4 pgs.
Ghosh, "Enhancing Silverlight Video Experiences with Contextual Data", Retrieved from: http://msdn.microsoft.com/en-us/magazine/ee336025.aspx, 2010, 15 pgs.
Griffith, Eric, "The Wireless Digital Picture Frame Arrives", Wi-Fi Planet, printed May 4, 2007 from http://www.wi-fiplanet.com/news/article.php/3093141, Oct. 16, 2003, 3 pgs.
Hartung et al., "DRM Protected Dynamic Adaptive HTTP Streaming", MMSys 2011 Proceedings of the Second Annual ACM Conference on Multimedia Systems, San Jose, California, Feb. 23-25, 2011, pp. 277-282.
Huang, U.S. Pat. No. 7,729,426, U.S. Appl. No. 11/230,794, filed Sep. 20, 2005, 143 pgs.
Huang et al., "Adaptive MLP post-processing for block-based coded images", IEEE Proceedings—Vision, Image and Signal Processing, vol. 147, No. 5, Oct. 2000, pp. 463-473.
Huang et al., "Architecture Design for Deblocking Filter in H.264/JVT/AVC", 2003 International Conference on Multimedia and Expo., Jul. 6-9, 2003, Baltimore, MD, 4 pgs.
Hurtado Guzman, "Development and Implementation of an Adaptive HTTP Streaming Framework for H264/MVC Coded Media", Politecnico di Torino, Nov. 2010, 108 pgs.
Hwang et al., "Efficient and User Friendly Inter-domain Device Authentication/Access control for Home Networks", Proceedings of the 2006 International Conference on Embedded and Ubiquitous Computing, Seoul, Korea, Aug. 1-4, 2006, pp. 131-140.
Inlet Technologies, "Adaptive Delivery to iDevices", 2010, 2 pages.
Inlet Technologies, "Adaptive delivery to iPhone 3.0", 2009, 2 pgs.
Inlet Technologies, "HTTP versus RTMP", 2009, 3 pages.
Inlet Technologies, "The World's First Live Smooth Streaming Event: The French Open", 2009, 2 pages.
I-O Data, "Innovation of technology arrived", Nov. 2004, Retrieved from http://www.iodata.com/catalogs/AVLP2DVDLA_Flyer200505.pdf, 2 pgs.
Jain et al., U.S. Appl. No. 61/522,623, filed Aug. 11, 2011, 44 pgs.
Jung et al., "Design and Implementation of an Enhanced Personal Video Recorder for DTV", IEEE Transactions on Consumer Electronics, vol. 47, No. 4, Nov. 2001, 6 pgs.
Kalva, Hari, "Delivering MPEG-4 Based Audio-Visual Services", 2001, 113 pgs.
Kang et al., "Access Emulation and Buffering Techniques for Steaming of Non-Stream Format Video Files", IEEE Transactions on Consumer Electronics, vol. 43, No. 3, Aug. 2001, 7 pgs.
Kaspar et al., "Using HTTP Pipelining to Improve Progressive Download over Multiple Heterogeneous Interfaces", IEEE ICC proceedings, 2010, 5 pgs.
Kim et al., "A Deblocking Filter with Two Separate Modes in Block-Based Video Coding", IEEE transactions on circuits and systems for video technology, vol. 9, No. 1, 1999, pp. 156-160.
Kim et al., "Tree-Based Group Key Agreement", Feb. 2004, 37 pgs.
Kozintsev et al., "Improving last-hop multicast streaming video over 802.11", Workshop on Broadband Wireless Multimedia, Oct. 2004, pp. 1-10.
Kurzke et al., "Get Your Content Onto Google TV", Google, Retrieved from: http://commondatastorage.googleapis.com/io2012/presentations/live%20to%20website/1300.pdf, 2012, 58 pgs.
Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.
Laukens, "Adaptive Streaming—A Brief Tutorial", EBU Technical Review, 2011, 6 pgs.
Legault et al., "Professional Video Under 32-bit Windows Operating Systems", SMPTE Journal, vol. 105, No. 12, Dec. 1996, 10 pgs.
Levkov, "Mobile Encoding Guidelines for Android Powered Devices", Adobe Systems Inc., Addendum B, Dec. 22, 2010, 42 pgs.
Li et al., "Content-Aware Playout and Packet Scheduling for Video Streaming Over Wireless Links", IEEE Transactions on Multimedia, vol. 10, No. 5, Aug. 2008, pp. 885-895.
Li et al., "Layered Video Multicast with Retransmission (LVMR): Evaluation of Hierarchical Rate Control", Proceedings of IEEE INFOCOM'98, the Conference on Computer Communications.

(56) References Cited

OTHER PUBLICATIONS

Seventeenth Annual Joint Conference of the IEEE Computer and Communications Societies. Gateway to the 21st Century, Cat. No. 98, vol. 3, 1998, 26 pgs.
Lian et al., "Efficient video encryption scheme based on advanced video coding", Multimed. Tools Appl. vol. 38, 2008, pp. 75-89.
Lin et al., "Multipass Encoding for Reducing Pulsing Artifacts in Cloud Based Video Transcoding", IEEE International Conference on Image Processing (ICIP), Date of Conference Sep. 27, 30, 2015, Quebec City, QC, Canada, pp. 907-911.
List et al., "Adaptive deblocking filter", IEEE transactions on circuits and systems for video technology, vol. 13, No. 7, Jul. 2003, pp. 614-619.
Liu et al., "A Formal Framework for Component Deployment", OOPSLA 2006, Proceedings of the 21st Annual ACM SIGPLAN Conference on Object-Oriented Programming Systems, Language, and Applications, Portland, Oregon, Oct. 22-26, 2006, pp. 325-344.
Long et al., "Silver: Simplifying Video Editing with Metadata", Demonstrations, CHI 2003: New Horizons, Apr. 5-10, 2003, pp. 628-629.
Massoudi et al., "Overview on Selective Encryption of Image and Video: Challenges and Perspectives", EURASIP Journal on Information Security, Nov. 2008, 18 pgs.
Matroska, "Diagram", Matroska, Technical/Info, Diagram, 2016, retrieved from https://www.matroska.org/technical/diagram/index.html on Jul. 20, 2017, 9 pages.
Matroska, "Specifications", Matroska, Technical/Info, Specifications, Jun. 25, 2017, retrieved from https://www.matroska.org/technical/specs/index.html on Jul. 20, 2017, 20 pages.
McCanne et al., "Receiver-driven Layered Multicast", Conference proceedings on Applications, technologies, architectures, and protocols for computer communications, Aug. 1996, 14 pgs.
Meier, "Reduction of Blocking Artifacts in Image and Video Coding", IEEE Transactions on Circuits and Systems for Video Technology, vol. 9, No. 3, Apr. 1999, pp. 490-500.
Miras, "On Quality Aware Adaptation of Internet Video", University of London, PhD dissertation, May 2004, 181 pgs.
Morrison, "EA IFF 85 Standard for Interchange Format Files", Jan. 14, 1985, printed from http://www.dcs.ed.ac.uk/home/mxr/gfx/2d/IFF.txt on Mar. 6, 2006, 24 pgs.
Moscoso, Pedro Gomes, "Interactive Internet TV Architecture Based on Scalable Video Coding", Instituto Superior Techico, Universidad Technica de Lisboa, May 2011, 103 pgs.
MSDN, "Adaptive streaming, Expression Studio 2.0", Apr. 23, 2009, 2 pgs.
Nelson, "Arithmetic Coding + Statistical Modeling = Data Compression: Part 1—Arithmetic Coding", Doctor Dobb's Journal, Feb. 1991, USA, pp. 1-12.
Nelson, Mark, "Arithmetic Coding + Statistical Modeling = Data Compression: Part 1—Arithmetic Coding", Doctor Dobb's Journal, Feb. 1991, printed from http://www.dogma.net/markn/articles/arith/part1.htm; printed Jul. 2, 2003, 12 pgs.
Nelson, Michael, "IBM's Cryptolopes", Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pages.
Newton et al., "Preserving Privacy by De-identifying Facial Images", Carnegie Mellon University School of Computer Science, Technical Report, CMU-CS-03-119, Mar. 2003, 26 pgs.
Noboru, "Play Fast and Fine Video on Web! codec", Co.9 No. 12, Dec. 1, 2003, pp. 178-179.
Noe, Alexander, "AVI File Format", http://www.alexander-noe.com/video/documentation/avi.pdf, Dec. 14, 2006, pp. 1-26.
Noe, Alexander, "Definitions", Apr. 11, 2006, retrieved from http://www.alexander-noe.com/video/amg/definitions.html on Oct. 16, 2013, 2 pages.
O'Brien, U.S. Appl. No. 60/399,846, filed Jul. 30, 2002, 27 pgs.
Ooyala, "Widevine Content Protection", Ooyala Support Center for Developers. Ooyala, Inc., 2013. Jun. 3, 2013. http://support.ooyala.com/developers/documentation/concepts/player_v3_widevine_integration.html.
O'Rourke, "Improved Image Decompression for Reduced Transform Coding Artifacts", IEEE Transactions on Circuits and Systems for Video Technology, vol. 5, No. 6, Dec. 1995, pp. 490-499.
Oyman et al., "Quality of Experience for HTTP Adaptive Streaming Services", IEEE Communications Magazine, Apr. 2012, vol. 50, No. 4, pp. 20-27, DOI: 10.1109/MCOM.2012.6178830.
Ozer, Jan, "Adaptive Streaming in the Field", Streaming Media, Dec. 2010-Jan. 2011, pp. 36-47.
Padiadpu, Rashmi, "Towards Mobile Learning: A Scorm Player for the Google Android Platform", Master Thesis, Hamburg University of Applied Sciences, 2008, 66 pgs.
Papagiannaki et al., "Experimental Characterization of Home Wireless Networks and Design Implications", INFOCOM 2006, 25th IEEE International Conference of Computer Communications, Proceedings, Apr. 2006, 13 pgs.
Park et al., "A postprocessing method for reducing quantization effects in low bit-rate moving picture coding", IEEE Transactions on Circuits and Systems for Video Technology, vol. 9, No. 1, Feb. 1999, pp. 161-171.
Peek, David, "Consumer Distributed File Systems", Dissertation, Doctor of Philosophy, Computer Science and Engineering, The University of Michigan, 2009, 118 pgs.
Phamdo, "Theory of Data Compression", printed on Oct. 10, 2003, 12 pgs.
Richardson, "H.264 and MPEG-4 Video Compression", Wiley, 2003, 306 pgs. (presented in 2 parts).
Rosenberg et al., "Indicating User Agent Capabilities in the Session Initiation Protocol (SIP)", Network Working Group, RFC 3840, Aug. 2004, 36 pgs.
Schulzrinne, H, "Real Time Streaming Protocol 2.0 (RTSP): draft-ietfmmusic-rfc2326bis-27", MMUSIC Working Group of the Internet Engineering Task Force (IETF), 296 pgs. (presented in two parts), Mar. 9, 2011, 296 pages.
Silvia, "Adaptive HTTP Streaming for Open Codecs", Oct. 9, 2010, [retrieved on: Mar. 2, 2018.
Sima et al., "An Efficient Architecture for Adaptive Deblocking Filter of H.264 AVC Video Coding", IEEE Transactions on Consumer Electronics, vol. 50, No. 1, Feb. 2004, pp. 292-296.
Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.
Srinivasan et al., "Windows Media Video 9: overview and applications", Signal Processing: Image Communication, 2004, 25 pgs.
Stockhammer, "Dynamic Adaptive Streaming over HTTP—Standards and Design Principles", Proceedings of the second annual ACM conference on Multimedia, Feb. 2011, pp. 133-145.
Tan, Yap-Peng et al., "Video transcoding for fast forward/reverse video playback", IEEE ICIP, 2002, pp. I-713 to I-716.
Taxan, "A Vel LinkPlayer2 for Consumer", I-O Data USA—Products—Home Entertainment, printed May 4, 2007 from http://www.iodata.com/usa/products/products.php?cat=HNP&sc=AVEL&pld=AVLP2/DVDLA&ts=2&tsc, 1 pg.
Timmerer et al., "HTTP Streaming of MPEG Media", Proceedings of Streaming Day, 2010, 4 pgs.
Tiphaigne et al., "A Video Package for Torch", Jun. 2004, 46 pgs.
Trappe et al., "Key Management and Distribution for Secure Multimedia Multicast", IEEE Transaction on Multimedia, vol. 5, No. 4, Dec. 2003, pp. 544-557.
Tripathi et al., "Improving Multimedia Streaming with Content-Aware Video Scaling", Retrieved from: http://digitalcommons.wpi.edu/computerscience-pubs/96, 2001, 17 pgs.
Unknown, "AVI RIFF File Reference (Direct X 8.1 C++ Archive)", printed from http://msdn.microsoft.com/archive/en-us/dx81_c/directx_cpp/htm/aviriffilereference.asp?fr . . . on Mar. 6, 2006, 7 pgs.
Unknown, "Entropy and Source Coding (Compression)", TCOM 570, 1999-9, pp. 1-22.

(56) References Cited

OTHER PUBLICATIONS

Unknown, "MPEG-4 Video Encoder: Based on International Standard ISO/IEC 14496-2", Patni Computer Systems, Ltd., publication date unknown, 15 pgs.
Van Deursen et al., "On Media Delivery Protocols in the Web", 2010 IEEE International Conference on Multimedia and Expo, Jul. 19-23, 2010, 6 pgs.
Venkatramani et al., "Securing Media for Adaptive Streaming", Multimedia 2003 Proceedings of the Eleventh ACM International Conference on Multimedia, Nov. 2-8, 2003, Berkeley, California, 4 pgs.
Ventura, Guillermo Albaida, "Streaming of Multimedia Learning Objects", AG Integrated Communication System, Mar. 2003, 101 pgs.
Waggoner, "Compression for Great Digital Video", 2002, 184 pgs.
Wang et al., "Image Quality Assessment: From Error Visibility to Structural Similarity", IEEE Transactions on Image Processing, Apr. 2004, vol. 13, No. 4, pp. 600-612.
Watanabem et al., "MPEG-2 decoder enables DTV trick plays", esearcher System LSI Development Lab, Fujitsu Laboratories Ltd., Kawasaki, Japan, Jun. 2001, 2 pgs.
Wiegand, "Joint Video Team (JVT) of ISO/IEC MPEG and ITU-T VCEG", Jan. 2002, 70 pgs.
Willig et al., U.S. Appl. No. 61/409,285, filed Nov. 2, 2010, 43 pgs.
Yang et al., "Projection-Based Spatially Adaptive Reconstruction of Block-Transform Compressed Images", IEEE Transactions on Image Processing, vol. 4, No. 7, Jul. 1995, pp. 896-908.
Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.
Yu et al., "Video deblocking with fine-grained scalable complexity for embedded mobile computing", Proceedings 7th International Conference on Signal Processing, Aug. 31-Sep. 4, 2004, pp. 1173-1178.
Zakhor, "Iterative Procedures for Reduction of Blocking Effects in Transform Image Coding", IEEE Transactions on Circuits and Systems for Video Technology, vol. 2, No. 1, Mar. 1992, pp. 91-95.
Prosecution File History for U.S. Pat. No. 10,225,588, IPR filed Feb. 15, 2020, 2937 pgs., presented in 29 parts.
U.S. Appl. No. 61/530,305, filed Sep. 1, 2011, 6 pgs.
Wayback Machine, Grooveshark—Features, All Your Music In One Place, printed Aug. 15, 2016 from https://web.archive.org/web/20081013115837/http://www,grooveshark.com/features, 6 pgs.
"Broadcom BCM7413 Product Brief", Dec. 11, 2008, 2 pgs.
"Common Interface Specification for Conditional Access and other Digital Video Broadcasting Decoder Applications", European Standard, EN 50221, Feb. 1997, 86 pgs.
"Free music was never so cool before Grooveshark", Wayback Machine, Grooveshark, Startup Meme, May 31, 2008, printed Aug. 15, 2016 from https://web.archive.org/web/20080601173852/http://startupmeme.com/2008/05/31/free-music-was-never-so-wool-before-grooveshark/, 2 pgs.
"HTTP Live Streaming on the Leading Media CDN", Akamai website, retrieved from http://www.akamai.com/html/resources/http-live-streaming.html, 2015, accessed May 11, 2015, 5 pgs.
"Instantly convert songs into tiny URLs with TinySong", Wayback Machine, Startup Memo Technology Blog, printed Aug. 15, 2016 from https://seb.archive.org/web/2008919133853/http://startupmeme.com/instantly-convert-songs-into-tiny-urls-with-tinysong/, 4pgs.
"Media Delivery Solutions for Streaming Video and Software Delivery", Akamai website, Retrieved from http://www.akamai.com/html/solutions/media-delivery-solutions.html, 2015, Accessed May 11, 2015, 5 pgs.
"Microsoft Announces Breakthrough Technology Enabling Simple Access to Broad Set of Digital Content, Including Music, Games, Video, Ring Tones and Pictures", Microsoft, Feb. 12, 2017, Retrieved from https://news.microsoft.com/2007/02/12/microsoft-announces-breakthrough-technology-enabling-simple-access-to-broad-set-of-digital-content-including-music-games-video-ring-tones-and-pictures/, 5 pgs.
"SDMI Secure Digital Music Initiative", SDMI Portable Device Specification, Part 1, Version 1.0, Jul. 8, 1999, pp. 1-35.
"Server 'Trick Play' support for MPEG-2 Transport Stream Files", www.live555.com/liveMedia/transport-stream-trick-play.html, 2006, Dec. 31, 2020, 1 pg.
"The Live555 Media Server", www.live555.com/mediaServer/#about, 2006, printed Dec. 31, 2020, 3 pgs.
"Twitpic's Future", Twitpic, Oct. 25, 2014, Retrieved from: https://web.archive.org/web/20150521043642/https://blog.twitpic.com/index.html, 12 pgs.
"What is Fliggo?", Wayback Machine, printed Aug. 15, 2016 from https://web.archive.org/web/20080623065120/http://www.fliggo.com/about, 3 pgs.
ADB, "ADB-3800W Datasheet", 2007, 2 pgs.
Agi et al., "An Empirical Study of Secure MPEG Video Transmissions", IEEE, Mar. 1996, 8 pgs., DOI: 10.1109/NDSS.1996.492420.
Ahmed et al., "An Efficient Chaos-Based Feedback Stream Cipher (ECBFSC) for Image Encryption and Decryption", Informatica, Mar. 2007, vol. 31, No. 1, pp. 121-129.
Arachchi et al., "Adaptation-aware encryption of scalable H.264/AVC for content security", Signal Processing: Image Communication, Jul. 2009, vol. 24, pp. 468-483, doi:10.1016/j.image.2009.02.004.
Bell et al., "The BellKor 2008 Solution to the Netflix Prize", Netflix Prize, 2008, 21 pgs.
Catone, Josh "10 Ways to Share Music on Twitter", Mashable, May 29, 2009, Retrieved from: https://mashable.com/2009/05/29/twitter-music/#vJCdrVzNOOqx, 5 pgs.
Chesler, Oliver "TinySong is like TinyURL for music", wire to the ear, Jun. 30, 2008, printed Aug. 15, 2016 from https://web.archive.org/web/20080907100459/http://www.wiretotheear.com/2008/06/30/tinysongis-like-tinyurl-for-music, 8 pgs.
Conklin et al., "Video coding for streaming media delivery on the Internet", IEEE Transactions on Circuits and Systems for Video Technology, Mar. 2001, vol. 11, No. 3, pp. 269-281.
Deshpande et al., "Scalable Streaming of JPEG2000 Images Using Hypertext Transfer Protocol", Multimedia '01: Proceedings of the Ninth ACM International Conference on Multimedia, Oct. 2001, pp. 372-381. https://doi.org/10.1145/500141.500197.
Entone, "Amulet High Definition IP Television Receiver User's Guide", 2008, 28 pgs.
Entone, "Hydra HD IP Video Gateway", 2008, 2 pgs.
International Standard, Information technology—Generic coding of moving pictures and associated audio information: Systems, ISO/IEC 13818-1:2000(E), Dec. 1, 2000 174 pgs.
Decision Granting Institution of Inter Partes Review 35 U.S.C. § 314, IPR2020-00558, U.S. Pat. No. 10,225,588, 46 pgs.
Decision Granting Petitioner's Request on Rehearing 37 C.F.R. § 42.71(d) Granting Institution of Inter Partes Review 35 U.S.C. § 314, IPR2020-00614 U.S. Pat. No. 7,295,673, 29 pgs.
Declaration of Patrick McDaniel, Ph.D., Inter Partes Review of U.S. Pat. No. 10,225,588, IPR filed Feb. 15, 2020, 211 pgs.
Extended European Search Report for European Application No. 19211286.0, Search completed Jul. 3, 2020, dated Jul. 13, 2020, 9 Pgs.
Extended European Search Report for European Application No. 19211291.0, Search completed Jul. 6, 2020, dated Jul. 14, 2020, 12 Pgs.
First Amended Complaint for Patent Infringement, *DivX, LLC* v. *Netflix, Inc.*, No. 2:19-cv-1602-PSG, Am. Compl. (C.D. Cal Aug. 21, 2019), 229 pgs., IPR filed Feb. 15, 2020.
International Preliminary report on Patentability for International Application No. PCT/US2005/025845, report dated Jun. 19, 2007, 6 pgs.
International Preliminary Report on Patentability for International Application PCT/US2010/020372, Completed Oct. 6, 2011, 6 Pgs.
Petition for Inter Partes Review of U.S. Pat. No. 10,225,588, IPR2020-00558, 96 pgs., IPR filed Feb. 15, 2020.
Power of Attorney—Hulu, LLC (IPR2020-00558), 4 pgs., IPR filed Feb. 15, 2020.

(56) References Cited

OTHER PUBLICATIONS

Power of Attorney—Netflix, Inc. (IPR2020-00558), 4 pgs., IPR filed Feb. 15, 2020.
Proceedings of the Second KDD Workshop on Large-Scale Recommender Systems and the Netflix Prize Competition, Las Vegas, Nevada, Aug. 24, 2008, 34 pgs.
Prosecution File History for U.S. Appl. No. 13/340,623 to Kiefer et al. ("Kiefer"), IPR filed Feb. 15, 2020, 1249 pgs., presented in 6 parts.
ETSI, "Digital Video Broadcasting (DVB) Support for use of scrambling and Conditional Access (CA) within digital broadcasting systems", Oct. 1996, 13 pgs.
ETSI, "Digital Video Broadcasting (DVB); Implementation guidelines for the use of Video and Audio Coding in Contribution and Primary Distribution Applications based on the MPEG-2 Transport Stream", ETSI TS 102 154 V1.2.1, May 2004, 73 pgs.
Fahmi et al., "Proxy Servers for Scalable Interactive Video Support", Computer, Sep. 2001, vol. 45, No. 9, pp. 54-60, https://doi.org/10.1109/2.947092.
Fitzek et al., "A Prefetching Protocol for Continuous Media Streaming in Wireless Environments", IEEE Journal on Selected Areas in Communications, Oct. 2001, vol. 19, No. 10, pp. 2015-2028, DOI: 10.1109/49.957315.
Ho, "Digital Video Broadcasting Conditional Access Architecture", Report prepared for CS265-Section 2, Fall 2002, Prof Stamp, 7 pgs.
INCITS/ISO/IEC, "Information Technology—Generic Coding of Moving Pictures And Associated Audio Information: Video (Formerly ANSI/ISO/IEC 13818-2-2000)", Second edition, Dec. 15, 2000, 220 pgs., (presented in two parts).
ISMA, "ISMA Encryption and Authentication, Version 1.1, Area / Task Force: DRM", Internet Streaming Media Alliance, Sep. 15, 2006, pp. 1-64.
ITU-T, "Series J: Cable Networks and Transmission of Television, Sound Programme and Other Multimedia Signals", Technical method for ensuring privacy in long-distance international MPEG-2 television transmission conforming to ITU-T J.89, ITU-T Recommendation J.96, Mar. 2001, 34 pgs.
Kabir, "Scalable and Interactive Multimedia Streaming Over the Internet", Thesis, 2005, 207 pgs.
Krikor et al., "Image Encryption Using DCT and Stream Cipher", European Journal of Scientific Research, Jan. 2009, vol. 32, No. 1, pp. 48-58.
Lew et al., "Content-Based Multimedia Information Retrieval: State of the Art and Challenges", ACM Transactions on Multimedia Computing, Communications and Applications, Feb. 2006, vol. 2, No. 1, pp. 1-19.
Lian et al., "Recent Advances in Multimedia Information System Security", Informatica, Jan. 2009, vol. 33, pp. 3-24.
Lian et al., "Selective Video Encryption Based on Advanced Video Coding", PCM, Nov. 2005, Part II, LNCS 3768, pp. 281-290.
Lievaart, "Characteristics that differentiate CA Systems", Irdeto access, Nov. 2001, 5 pgs.
Lloyd, "Supporting Trick Mode Playback Universally Across the Digital Television Industry", Thesis, 2005, 111 pgs.
Lomas et al., "Educause Learning Initiative, Collaboration Tools", Educause Learning Initiative, Aug. 2008, ELI Paper 2: 2008, 11 pgs.
Macaulay et al., "Whitepaper—IP Streaming of MPEG-4: Native RTP vs MPEG-2 Transport Stream", Envivio, Oct. 2005, 12 pgs.
Martin et al., "Privacy Protected Surveillance Using Secure Visual Object Coding", IEEE Transactions on Circuits and Systems for Video Technology, Aug. 2008, vol. 18, No. 8, pp. 1152-1162, DOI: 10.1109/TCSVT.2008.927110.
Meyer et al., "Security mechanisms for Multimedia-Data with the Example MPEG-I-Video", SECMPEG, 1992, 10 pgs.
Molavi et al., "A Security Study of Digital TV Distribution Systems", Thesis, Jun. 2005, 112 pgs.
Montes, "Muusic: mashup de servicios web musicales", Ingenieria Tecnica en Informatica de Gestion, Nov. 2008, 87 pgs.
Nelson, "The Data Compression Book", M&T Publishing, 1992, 533 pgs., (presented in two parts).
OIPF Open Forum, "OIPF Release 1 Specification, vol. 3, Content Metadata", OIPF, Oct. 8, 2009, vol. 1.1, 47 pgs.
OIPF Open Forum, "OIPF Release 1 Specification, vol. 7—Authentication, Content Protection and Service Protection", OIPF, Oct. 8, 2009, vol. 1.1, 88 pgs.
Open IPTV Forum, "Functional Architecture", Jan. 16, 2008, vol. 1.1, 141 pgs.
Open IPTV Forum, "OIPF Release 1 Specification, vol. 1—Overview", OIPF, Oct. 8, 2009, vol. 1.1, 48 pgs.
Open IPTV Forum, "OIPF Release 1 Specification, vol. 2, Media Formats", OIPF, Oct. 8, 2009, vol. 1.1, 22 pgs.
Park et al., "An Efficient Encryption and Key Management Scheme for Layered Access Control of H.265/Scalable Video Coding", IEICI Trans. Inf. & Syst., May 2009, vol. E92-D, No. 5, pp. 851-858, DOI: 1031587/transinf.E92.D.851.
Park et al., "Combined Scheme of Encryption and Watermarking in H.264/Scalable Video Coding", New Directions in Intelligent Interactive Multimedia, SCI 142, 2008, pp. 351-361.
Qiao et al., "Comparison of MPEG Encryption Algorithms", Comput. & Graphics, 1998, vol. 22, No. 4, pp. 437-448.
Raju et al., "Fast and Secure Real-Time Video Encryption", Sixth Indian Conference on Computer Vision, Graphics & Image Processing, Jan. 2009, pp. 257-264, doi:10.1109/ACVGIP.2008.100.
Senoh et al., "DRM Renewability & Interoperability", IEEE Xplore, Conference: Consumer Communications and Networking Conference, 2004, Feb. 2004, pp. 424-429, DOI: 10.1109/CCNC.2004.1286899 Conference: Consumer Communications and Networking Conference, 2004. CCNC 2004. First IEEE.
Sheu, Tsang-Ling et al., "Dynamic layer adjustments for SVC segments in P2P streaming networks", Computer Symposium (ICS), 2010, 2010 International, Tainan, Taiwan, R.O.C., pp. 793-798, 2010.
Shojania et al., "Experiences with MPEG-4 Multimedia Streaming", CiteSeer, Jan. 2001, 3 pgs., DOI: 10.1145/500141.500221.
Symes, "Video Compression Demystified", McGraw-Hill, 2001, 353 pgs., (presented in two parts).
Taymans et al., "GStreamer Application Development Manual (1.6.0)", 2007, 159 pgs.
Thomas et al., "A Novel Secure H.264 Transcoder Using Selective Encryption", Proceedings in International Conference on Image Processing, Jan. 2007, vol. 4, pp. IV-85-IV-88, DOI: 10.1109/ICIP.2007.4379960.
Toscher et al., "The BigChaos Solution to the Netflix Prize 2008", Netflix Prize, Nov. 25, 2008, 17 pgs.
Tosun et al., "Efficient multi-layer coding and encryption of MPEG video streams", 2000 IEEE International Conference on Multimedia and Expo. ICME2000. Proceedings. Latest Advances in the Fast Changing World of Multimedia (Cat. No. 00TH8532), July 30-Aug. 2, 2000, pp. 119-122, DOI: 10.1109/ICME.2000.869559.
Um, "Selective Video Encryption of Distributed Video Coded Bitstreams and Multicast Security over Wireless Networks", Thesis, Aug. 2006, 142 pgs.
Van Grove, Jennifer "Top 5 Ways to Share Videos on Twitter", Mashable, May 23, 2009, Retrieved from: https://mashable.com/2009/05/23/video-for-twitter/#Jvn9IIYy6qqA, 6 pgs.
Wang, "Lightweight Encryption in Multimedia", Thesis, Jun. 2005, 184 pgs.
Weng, "A Multimedia Socail-Networking Community for Mobile Devices", 2007, 30 pgs.
Wong, "Web Client Programming with Perl", 1997, printed Jan. 8, 2021 from: https://www.oreilly.com/openbook-webclientch03.html, 31 pgs.
Wu, "A Fast MPEG Encryption Algorithm and Implementation of AES on CAM", Thesis, Oct. 6, 2003, 91 pgs.
Yuksel, "Partial Encryption of Video for Communication and Storage", Thesis, Sep. 2003, 78 pgs.
"Supported Media Formats", Supported Media Formats, Android Developers, Nov. 27, 2013, 3 pgs.
European Search Report for Application 11855103.5, search completed Jun. 26, 2014, 9 pgs.
European Search Report for Application 11855237.1, search completed Jun. 12, 2014, 9 pgs.

(56) References Cited

OTHER PUBLICATIONS

Federal Computer Week, "Tool Speeds Info to Vehicles", Jul. 25, 1999, 5 pages.
HTTP Live Streaming Overview, Networking & Internet, Apple, Inc., Apr. 1, 2011, 38 pages.
Informationweek: Front End: Daily Dose, "Internet on Wheels", Jul. 20, 1999, 3 pgs.
International Search Report and Written Opinion for International Application PCT/US2011/066927, International Filing Date Dec. 22, 2011, Report Completed Apr. 3, 2012, Mailed Apr. 20, 2012, 14 pgs.
International Search Report and Written Opinion for International Application PCT/US2011/067167, International Filing Date Dec. 23, 2011, Report Completed Jun. 19, 2012, Mailed Jul. 2, 2012, 11 pgs.
The Official Microsoft IIS Site, Smooth Streaming Client, 4 pages.
Author Unknown, "Tunneling QuickTime RTSP and RTP over HTTP", Published by Apple Computer, Inc.: 1999 (month unknown), 6 pages.
"Netflix turns on subtitles for PC, Mac streaming", 3 pgs.
Deutscher, "IIS Transform Manager Beta-Using the MP4 to Smooth Task", Retrieved from: https://web.archive.org/web/20130328111303/http://blog.johndeutscher.com/category/smooth-streaming, Blog post of Apr. 17, 2010, 14 pgs.
Gannes, "The Lowdown on Apple's HTTP Adaptive Bitrate Streaming", GigaOM, Jun. 10, 2009, 12 pgs.
Kim, Kyuheon, "MPEG-2 ES/PES/TS/PSI", Kyung-Hee University, Oct. 4, 2010, 66 pages.
Nelson, "Smooth Streaming Deployment Guide", Microsoft Expression Encoder, Aug. 2010, 66 pgs.
Noe, A., "Matroska File Format (under construction!)", Retrieved from the Internet: URL: http://web.archive.org web/20070821155146/www.matroska.org/technical/specs/matroska.pdf, retrieved on Jan. 19, 2011, Jun. 24, 2007, 1-51.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Pantos, R, "HTTP Live Streaming: draft-pantos-http-live-streaming-06", Published by the Internet Engineering Task Force (IETF), Mar. 31, 2011, 24 pages.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Schulzrinne, H et al., "Real Time Streaming Protocol 2.0 (RTSP): draft-ietfmmusic-rfc2326bis-27", MMUSIC Working Group of the Internet Engineering Task Force (IETF), Mar. 9, 2011, 296 pages.
Siglin, "HTTP Streaming: What You Need to Know", streamingmedia.com, 2010, 15 pages.
Siglin, "Unifying Global Video Strategies, MP4 File Fragmentation for Broadcast, Mobile and Web Delivery", Nov. 16, 2011, 16 pgs.
Wu, Feng et al., "Next Generation Mobile Multimedia Communications: Media Codec and Media Transport Perspectives", In China Communications, Oct. 2006, pp. 30-44.
Zambelli, Alex "IIS Smooth Streaming Technical Overview", Microsoft Corporation, Mar. 2009.

* cited by examiner

200

USE OF OBJECTIVE QUALITY MEASURES OF STREAMED CONTENT TO REDUCE STREAMING BANDWIDTH

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a continuation reissue of application Ser. No. 15/950,950, which is an application for reissue of U.S. Pat. No. 9,313,510.*

BACKGROUND

Distribution of multimedia (also referred to herein as "media" and/or "program(s)"), such as movies and the like, from network services to a client device may be achieved through adaptive bitrate streaming of the media. Typically, the media may be encoded at different bitrates and resolutions into multiple bitrate streams that are stored in the network services. Conventional adaptive bitrate streaming of media includes determining streaming conditions, e.g., an available streaming bandwidth at the client device, and then streaming a selected one of the different bitrate streams from the network services to the client device based on the determined conditions.

From the perspective of the network service, streaming media includes transmitting the media in response to requests from the client device. From the perspective of the client device, streaming media includes continuously requesting and receiving the media from the network services, and storing the received media in a buffer for subsequent presentation or playback, essentially, in near real-time. The buffered media may be presented, i.e., played back, in audio-visual form, for example.

The human visual system perceives a perceptual or subjective quality of streamed, presented media, and is able to detect small changes in the perceptual quality. The perceptual quality generally increases and decreases as the encoded bitrate of the streamed program (i.e., "streaming bitrate") increases and decreases. Therefore, more or less available streaming bandwidth may translate to more or less perceptual quality, respectively.

Given the ever pressing need to conserve bandwidth at the client device, conventional streaming techniques tend to select a streaming bitrate deemed to be sufficiently high to meet an acceptable level of perceptual quality, based on the streaming bandwidth conditions determined at the client device, as mentioned above. This bandwidth-centric determination and selection at the client device does not take into consideration changes or variations in the content contained in the media itself over time as the media is streamed and, therefore, often results in unnecessarily high, and therefore, bandwidth-wasteful, streaming bitrates.

BRIEF DESCRIPTION OF THE DRAWINGS/FIGURES

Figure 1:
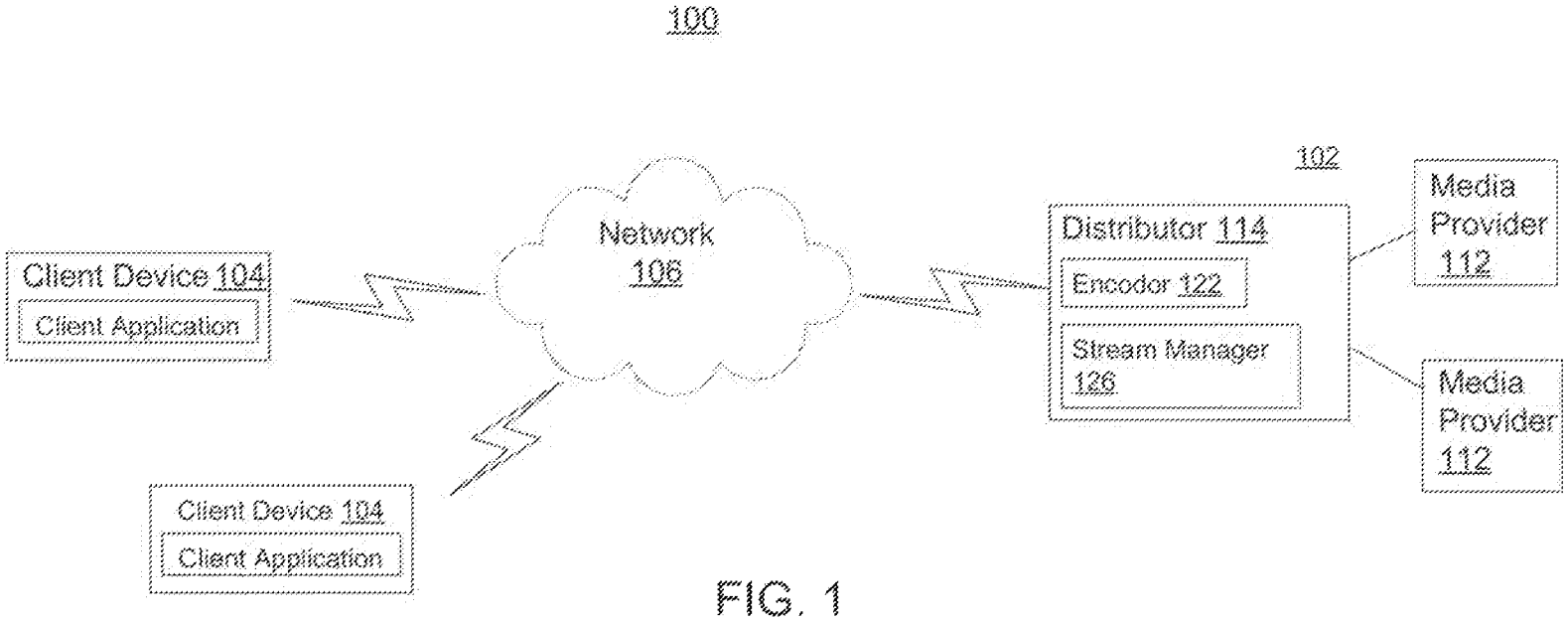
FIG. 1 is a block diagram of an example network environment in which adaptive streaming of multimedia (also referred to herein as "media" and "program(s)") from network services to a client device may be implemented.

In the drawings, the leftmost digit(s) of a reference number identifies the drawing in which the reference number first appears.

DETAILED DESCRIPTION

Embodiments described herein are directed to adaptive streaming of a video program from network services to a client device that utilize encoded video section swapping to reduce streaming bandwidth, while minimally impacting a perceptual/presentation quality of the streamed program at the client device. The adaptive streaming with section swapping embodiments reduce streaming bandwidth at client the device based on characteristics or properties of content in the video program, i.e., measures of objective quality indicative of perceptual quality, that change over time while the program is being streamed. More specifically, the embodiments determine swappable, corresponding/co-located sections of video encoded at different bitrates based on the measured objective quality levels of the co-located sections and the predetermined criterion of objective quality. The swappable, co-located sections include a section encoded at a first bitrate and a section encoded at a second bitrate that is less than the first bitrate. During streaming of the video program, the section encoded at the first bitrate is replaced with the co-located section encoded at the lesser second bitrate, thereby conserving streaming bandwidth by a substantial amount approximately equally to a difference between the first and second bitrates.

Network Environment

FIG. 1 is a block diagram of an example network environment 100 in which adaptive streaming of programs from network services to a client device may be implemented. Network environment 100 includes a collection of server-side services 102 that interact and cooperate to originate, manage, and distribute, e.g., stream, programs to a user operated client device 104 over one or more networks 106, such as the Internet. Such programs include, but are not limited to, entertainment programs (e.g., television shows, movies, cartoons, news programs, etc.), educational programs (e.g., classroom video, adult education video, learning programs, etc.), and advertising programs (e.g., commercials, infomercials, or marketing content). Network services 102 communicate with each other and with client device 104 using any suitable communication protocol, such as an Internet protocol, which may include Transmission Control Protocol/Internet Protocol (TCP/IP), Hypertext Transfer Protocol (HTTP), etc.

Client device 104 may be capable of wireless and/or wired communication with networks 106. Client device 104 includes processing, storage, communication, and user interface capabilities sufficient to provide all of the client device functionality described herein. Such functionality may be provided, at least in part, by one or more applications, such as computer programs, that execute on client device 104. Applications executed on client device 104 may include a client-side application, which presents Graphical User Interfaces (GUIs) through which a user of the client device may interact with and request services from corresponding server-side applications hosted in services 102. Accordingly, under user control, client device 104 may request/select programs from services 102, stream the selected programs from the services, and then present the streamed programs, in other words, playback the streamed programs.

Network services 102 include, but are not limited to, one or more media provider(s) 112 to originate source programs, and one or more media distributor(s) 114 to encode, store, and distribute the programs to client device 104. Each of the services 102 may be implemented as one or more computer servers that execute one or more associated server-side computer program applications suited to the given service. Media providers 112, such as Netflix®, HBO®, cable networks, and so on, utilize network services 102 to manage and deliver their revenue bearing programs to client device 104. Media providers 112 download their source programs to distributor 114, which encodes, stores, and then streams the encoded programs to client device 104 when requested to do so.

Distributor 114 includes an encoder 122 and a stream manager 126. Encoder 122 may encode each program into a number of alternative streams to support adaptive bitrate streaming of the program. The alternative streams encode the same program in different ways, such as at one or more of different bitrates, one or more different resolutions, and/or one of more different frame rates. As will be described more fully below in connection with FIG. 2, each of the encoded streams is typically stored in one or more container files. Encoder 122 also generates a program index file for the container files associated with the encoded program. Stream manager 126 manages streaming of the encoded program from the container files to client device 104 when the client device requests the program. Stream manager 126 cooperates with the requesting client device 104 to support adaptive bitrate streaming of the program from the container files to the client device.

Distributor 114 may also store auxiliary streams which contain information associated with the program streams mentioned above. The auxiliary streams are encoded at low bitrates, e.g., at bitrates of 200 kbps or much less. The auxiliary streams may include metadata synchronized in time with and descriptive of the content in associated main program streams. The metadata may include cues indicating or bracketing, e.g., commercial segments, or other non-program segments/content, such as level-drop information for encoded section swapping as will be described below, interspersed throughout the program streams. Typically, such auxiliary streams would be streamed simultaneously with their associated program streams and handled appropriately at the client device. However, the auxiliary streams may be streamed before the program streams.

As discussed above, client-side GUIs provide a user with access to services and program offerings. Such client-side GUIs typically include easily navigable program guides, and may present programs and channel selection options, program descriptions, advertisements, programming/user control options, and other typical programming features, as would be appreciated by those of ordinary skill in the relevant arts. The client-side GUIs accept user selections/requests, such as a request to view a program. In response to such GUI selections/requests, the client-side application sends appropriate requests to a counterpart server-side application residing in distributor 114, to initiate the appropriate actions among services 102 that will satisfy the client selections/requests, e.g., enable a client device to stream the selected program from the distributor for presentation to the user.

Container Files—Streaming Sources

As described above, distributor 114 encodes source programs from providers 112. To support adaptive bitrate streaming, distributor 122 may encode the source programs at multiple bitrates to produce multiple streams for each source program, as will be described more fully below in connection with FIG. 2. While streaming such encoded programs, client device 104 may switch between streams (and thus between encoded bitrates and corresponding streaming rates) according to conditions at the client device.

Figure 2:
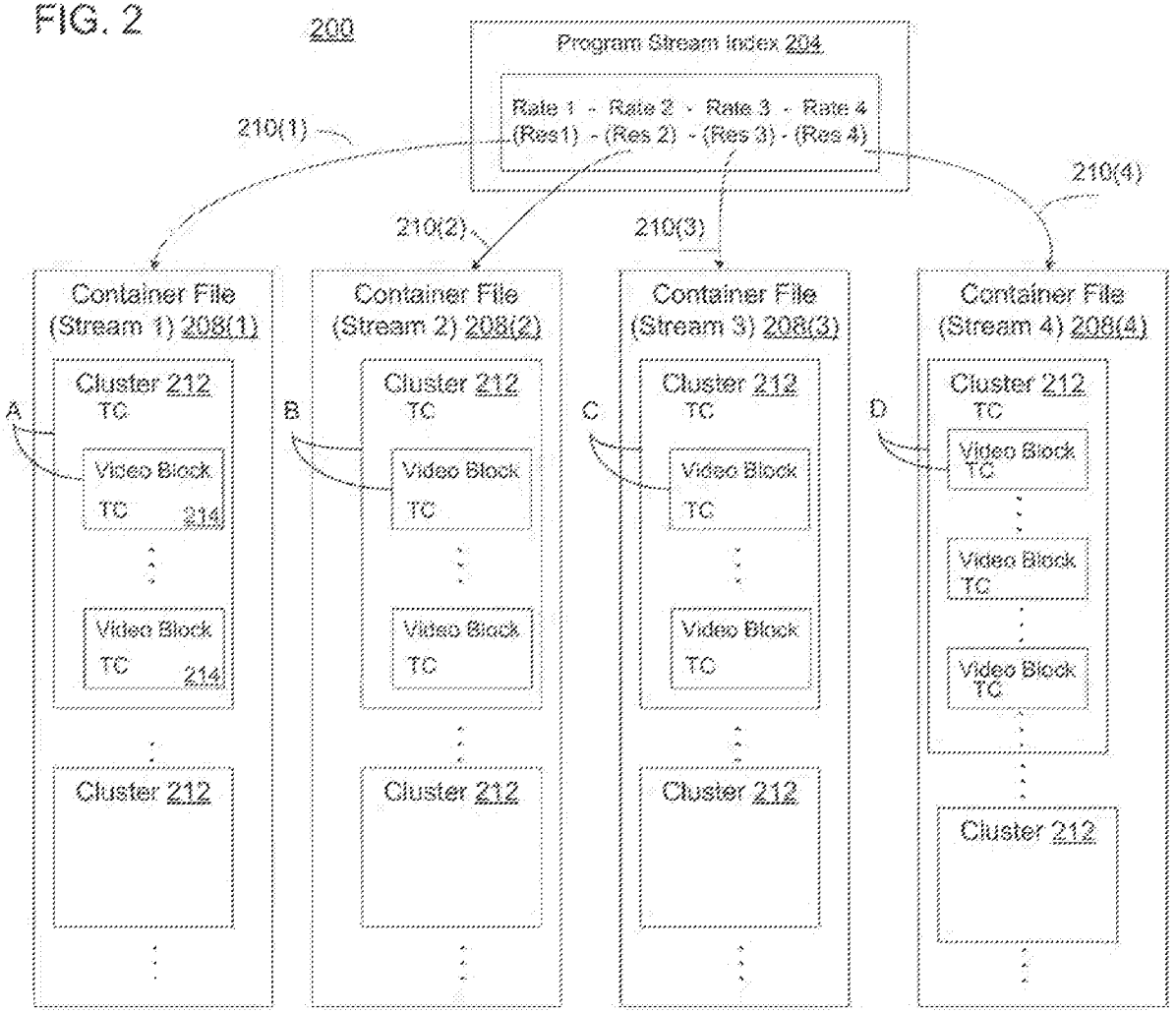
FIG. 2 is an illustration of an example encoded video program generated by a media distributor.

FIG. 2 is an illustration of an example encoded video program 200 generated by distributor 112. Encoded video program 200 includes multiple (encoded) video streams 1-4 encoded at multiple corresponding bitrates Rate 1-Rate 4. Encoded video streams 1-4 encode video at multiple video resolutions Res 1-Res 4, which may be equal to or different from each other. Encoded video program 200 includes a program stream index 204 and multiple container files 208(1)-208(4) corresponding to streams 1-4.

Program stream index 204 includes pointers 210(1)-(4), e.g., Uniform Resource Locators (URLs), to corresponding container files 208(1)-(4), and lists encoding parameters used to encode each of the streams 1-4, including, but not limited to, encoded bitrates Rate 1-Rate 4, encoding resolutions Res 1-Res 4, frame rates, and encoding techniques/standards. Exemplary, non-limiting, bitrates may range from below 125 kilo-bits-per-second (kbps) up to 15,000 kbps, or even higher, depending on the type of encoded media.

Each of container files 208 comprises sequential clusters 212 of a larger media sector (not shown in FIG. 2), and sequential blocks 214 of encoded media (which may also include audio, text, multimedia, etc., in addition to video) within each of the clusters. Each cluster 212, and each block 214, includes a time code TC indicating a start time for the media encoded in the blocks of that cluster, and encodes a fixed duration of media. For example, each cluster 212 of container file 208(1) encodes two seconds of video. In other embodiments, each cluster may encode a different duration of media, which may vary from two seconds. Each cluster 212 is a self-contained unit of media that may be decoded and presented on client devices 204 without reference to any other clusters. Clusters 212 may also include successive cluster numbers identifying a streaming sequence of the clusters.

Each cluster/block 212/214 in a given one of container files 208 encodes the same content (e.g., video content) as corresponding clusters in the other ones of the container files. For example, the cluster/block indicated at A in container file 208(1) has encoded therein the same video as that encoded in the clusters/blocks indicated at B, C, and D of container files 208(2), 208(3), and 208(4), respectively. Corresponding clusters/blocks are also referred to herein as "co-located" clusters/blocks because they encode the same video and share the same time code TC, i.e., they are aligned or coincide in time.

Figure 3:
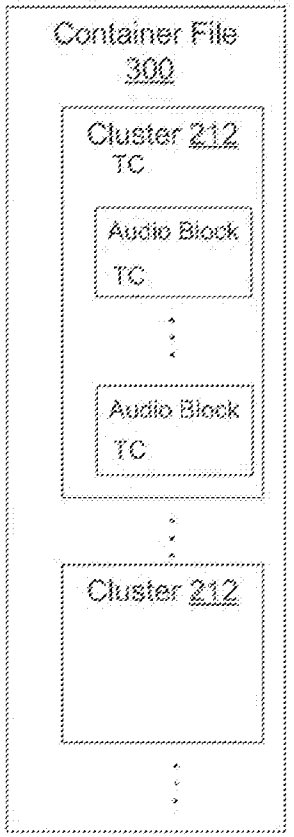
FIG. 3 is an illustration of a container file that encodes a single audio stream.
Figure 4:
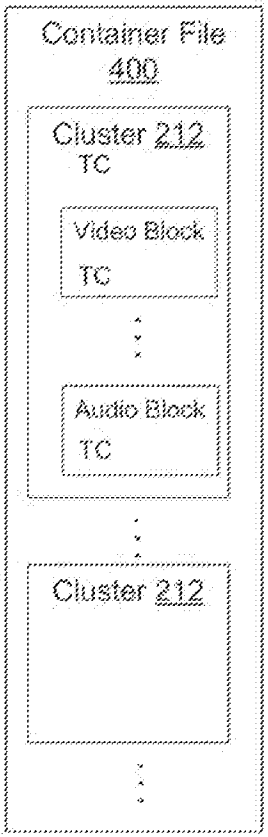
FIG. 4 is an illustration of a container file that encodes multiplexed audio and video streams.
Figure 5:
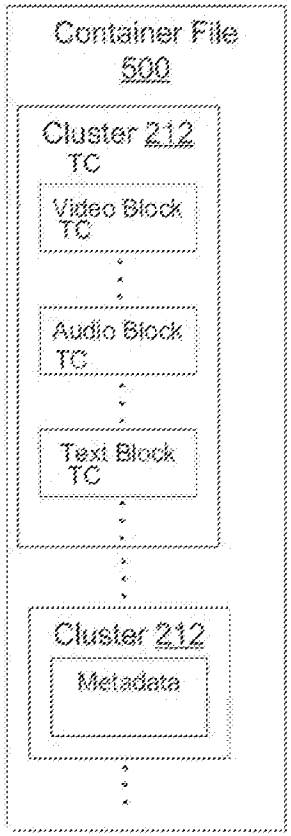
FIG. 5 is an illustration of a container file that encodes multiplexed video, audio, text, and metadata streams.

Container files may encode a single stream, such as a video stream (as depicted in FIG. 2), an audio stream, or a text stream (e.g., subtitles). Alternatively, each container file may encode multiple multiplexed streams, such as a mix of video, audio, and text streams. FIGS. 3-5 are further illustrations of diverse container files.

FIG. 3 is an illustration of a container file 300 that encodes a single audio stream.

FIG. 4 is an illustration of a container file 400 that encodes multiplexed audio and video streams.

FIG. 5 is an illustration of a container file 500 that encodes multiplexed video, audio, text, and metadata streams.

In addition, a container file may encode only a metadata stream at a relatively low bitrate.

The encoded container files depicted in FIGS. 2-5 support adaptive streaming to client device 104. If conditions change while streaming, then client device 104 may switch between container files to stream at rates best suited to the conditions.

In embodiments: the container files may be Matroska containers based on Extensible Binary Meta Language (EBML), which is a derivative of Extensible Binary Meta Language (XML), or files encoded in accordance with the Moving Picture Experts Group (MPEG) standard; the program index may be provided in a Synchronized Multimedia Integration Language (SMIL) format; and client device 104 may implement adaptive streaming from distributor 114 over networks 106 using the HTTP protocol.

The container files described above may support adaptive streaming of encoded video programs across an available spectrum bandwidth that is divided into multiple, i.e., n, levels. Video having a predetermined video resolution for each level may be encoded at a bitrate corresponding to the bandwidth associated with the given level. For example, in DivX® Plus Streaming, by Rovi Corporation, the starting bandwidth is 125 kbps and the ending bandwidth is 8400 kbps, and the number n of bandwidth levels is eleven (11). Each bandwidth level encodes a corresponding video stream, where the maximum encoded bitrate of the video stream (according to a hypothetical reference decoder model of the video coding standard H.264) is set equal to the bandwidth/bitrate of the given level. In DivX® Plus Streaming, the 11 levels are encoded according to 4 different video resolution levels, in the following way: mobile (2 levels), standard definition (4 levels), 720p (2 levels), and 1080p (3 levels).

Section Swapping: Objective Quality vs. Perceptual Quality

Adaptive streaming embodiments described herein take into consideration certain characteristics in the content in video programs (also referred to herein simply as "video") to be streamed, to reduce streaming bitrates, as will now be described. The human visual system is able to detect small changes in the perceptual or presentation quality of presented video. However, perceptual quality and changes in perceptual quality are difficult to measure directly. Instead, certain characteristics or properties of encoded video, that are indicative of perceptual quality video as actually presented (i.e., once the encoded video is decoded and presented), may be determined, e.g., measured directly, in a straight forward manner. Such measured properties represent an objective quality of the video. As the content of encoded video varies across successive sections of the encoded video, and between co-located sections of encoded video in different video streams, the objective quality correspondingly varies, and may be measured to determine a level of objective quality corresponding to each of the aforementioned sections. The term "section" as used herein refers to a number of successive frames of video, including, but not limited to, multimedia audio-visual content, which may be collected into successive blocks and clusters in container files for streaming, as described above.

The difference in objective quality levels between co-located sections of encoded video (e.g., between co-located clusters from two container files that encode the same video but at different bitrates) may be used to determine a corresponding difference in the perceptual quality of the two video sections. Specifically, the difference in objective quality levels may be used to determine whether that difference is sufficiently large as to cause a visually noticeable difference in the perceptual quality of the two sections (once decoded and presented). With this in mind, there exists a criterion of objective quality (referred to as a predetermined "swap criterion" of objective quality), for the two objective quality levels, that translates to a virtually imperceptible difference in perceptual quality. Two co-located sections having objective quality levels that meet this criterion are considered interchangeable or swappable with each other for purposes of streaming to a client device because of their imperceptible or nearly imperceptible difference in perceptual quality. "Co-located" sections are also referred to herein as "corresponding" sections.

Swappable, co-located, encoded sections may be swapped to reduce streaming bandwidth in cases where co-located sections include a first section encoded at a relatively high bitrate and a (co-located) second section encoded at a relatively low bitrate. Specifically, streaming the (lower bitrate) second section instead of (i.e., in place of) its co-located (higher bitrate) first section reduces streaming bandwidth, while maintaining perceptual quality. The first section is referred to herein as a "replaceable section" and the second section that is streamed instead of the first section is referred to herein as the "replacement section." The more often high bitrate sections are replaced with their co-located low bitrate sections while streaming, i.e., the more often bitrate swapping occurs, the more streaming bandwidth is conserved.

Measures of objective quality of a section of encoded video (e.g., of a cluster/block of encoded video) include, but are not limited to, a signal-to-noise ratio (SNR) of the section, a peak SNR (PSNR) of the section, a structural similarity index (SSIM) that measures a similarity between sections, and so on.

PSNR is a commonly used measure for assessing a quality of reconstructed video after compression (encoding). PSNR is measured on a logarithmic scale and depends on the Mean Squared Error (MSE) between an original source image and an impaired image or video frame. A higher PSNR generally indicates better quality, while a lower PSNR generally indicates poorer quality. Formulas for PSNR are given below:

$$\mathrm{MSE} = \frac{1}{mn}\sum_{i=0}^{m-1}[\mathrm{I}(i, j)-\mathrm{K}(i, j)]^2$$

$$\mathrm{PSNR} = 10\cdot\log_{10}(\mathrm{MAX}_I^2/\mathrm{MSEi})$$

Where: m & n are dimensions of an image; I & K are components of an image (Y, U, V); and $\mathrm{MAX}_I$ is a maximum possible pixel value.

Each section of encoded video may be assigned one or more scores based on the different possible objective quality measures. Multiple successive encoded sections may have their objective quality levels combined into and, therefore, associated with, a single measurement of objective quality, which may include, e.g., a mean or variance of the SNR (or PSNR) of each of the multiple sections.

A criterion of objective quality that indicates co-located sections may be swapped with little or no impact on perceptual quality—if the co-located section have levels of objective quality that each meet that criterion—may be based on one of:

a. an absolute level of objective quality, e.g., co-located clusters are declared swappable if the PSNR of each cluster is above a threshold PSNR; and
b. a difference between respective levels objective quality of co-located encoded sections, e.g., co-located clusters are declared swappable if a difference between their respective PSNR values is less than a certain PSNR difference threshold.

For relative criterion (b), a variable scale may be defined using as a base PSNR a highest level PSNR among encoded sections under consideration; e.g., for encoded section PSNR levels in a range of 29 dB and 31 dB, an acceptable difference value may be 1.5 dB, and for encoded section PSNR levels in a range of 27 dB and 29 dB, an acceptable PSNR difference level may be only 1 dB. The variable scale may be extended to cover all encoded section PSNR levels that are expected as part of an encoding process, and may also extend to cover other objective quality metrics such as a mean, a variance, a difference between highest and lowest PSNR levels in a cluster, or a formula combining some or all of these or other metrics. Such assignments may be altered based on the type of objective quality that is used.

Embodiments directed to adaptive streaming using section swapping described below include (i) a "swapping-while-streaming" embodiment in which swappable co-located sections from different files are swapped while streaming, and (ii) a "pre-swapped streaming" embodiment in which a single file containing pre-swapped sections is constructed from multiple encoded files before streaming is initiated, and then all of the sections in the single file, including the pre-swapped sections, are streamed from that file. Examples of these embodiments are described below.

Swapping-While-Streaming

In swapping-while-streaming, swappable co-located sections are swapped while streaming from multiple different container files in real-time, such as from multiple container files 208 in FIG. 2.

Figure 6:
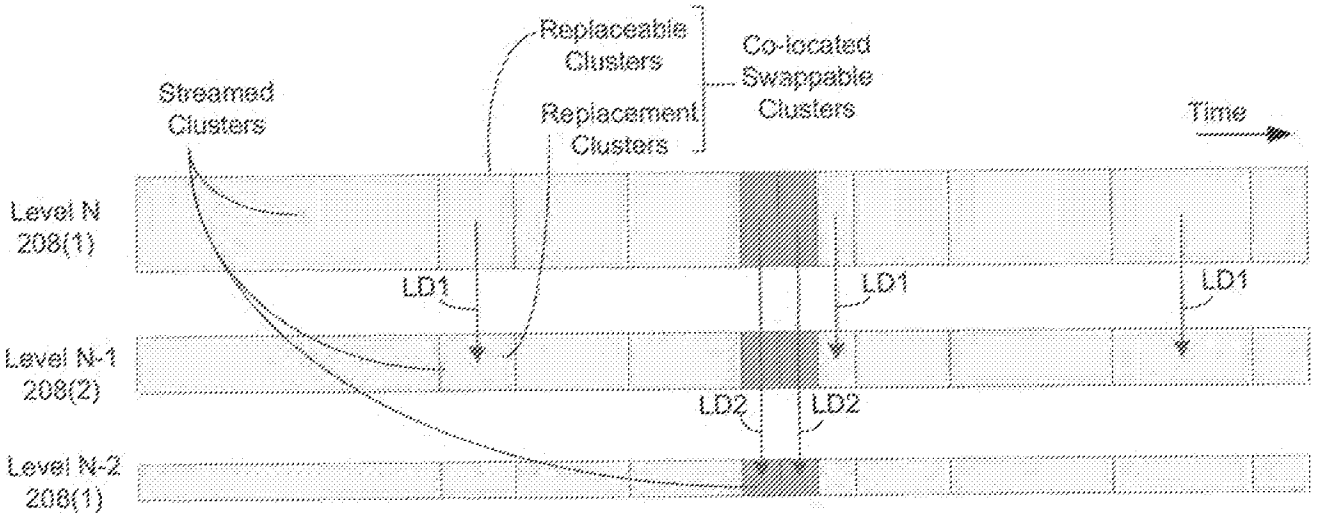
FIG. 6 is an illustration of an example of swapping-while-streaming from the container files of FIG. 2.

FIG. 6 is an illustration of an example of swapping-while-streaming from container files 208 of FIG. 2. With reference to FIG. 6, the example assumes the following:

a. Separate container files 208(1), 208(2), and 208(3) represent three levels N, N−1, and N−2, respectively, of the n levels available for, e.g., DivX® Plus Streaming;
b. Levels N, N−1, and N−2 are each encoded at successively decreasing bitrates but may be at the same resolution. In other examples, the Levels are each encoded at successively decreasing bitrates but may be at different resolutions;
c. Swappable, co-located clusters (including a replaceable section and its corresponding replacement section) have been determined and identified across the container files 208(1)-208(3). As described above, the swappable, co-located clusters are determined based on determined/measured objective quality levels of the clusters in the container files and a comparison of the determined/measured objective quality levels (of co-located sections) against a predetermined criterion of objective quality indicative of a minimal difference in perceptual quality; and
d. Level N is initially selected for streaming.

Traversing left-to-right in FIG. 6, initially, encoded sections from level N are streamed from container file 208(1). Encoded sections are streamed predominantly from level N. However, while the sections from Level N are streamed, replaceable (swappable) sections thereof are encountered and replaced with co-located replacement (swappable) sections from level N−1, or level N−2, as indicated at LD1, or LD2, respectively. That is, the lower level, co-located replacement sections are streamed instead of the higher level replaceable sections, resulting in conserved streaming bandwidth. Each replacement section is streamed at the same time its corresponding co-located replaceable section would have been streamed had it not been replaced, so as to maintain a proper encoded video sequence. A section swap is referred to as a "level-drop" because the source level (n) from which the replacement section is streamed is lower than the current level, e.g., in a swap, the level drops from Level N to Level N−1, or Level N−2. In swapping-while-streaming, client device 104 and distributor 114 cooperate with each other to swap sections from different container files.

Pre-Swapped Streaming

In pre-swapped streaming, a single file containing swappable sections, i.e., level-drops, is constructed from multiple files before streaming. Then, the sections in the single file, including the pre-swapped sections, are streamed from that file.

Figure 7:
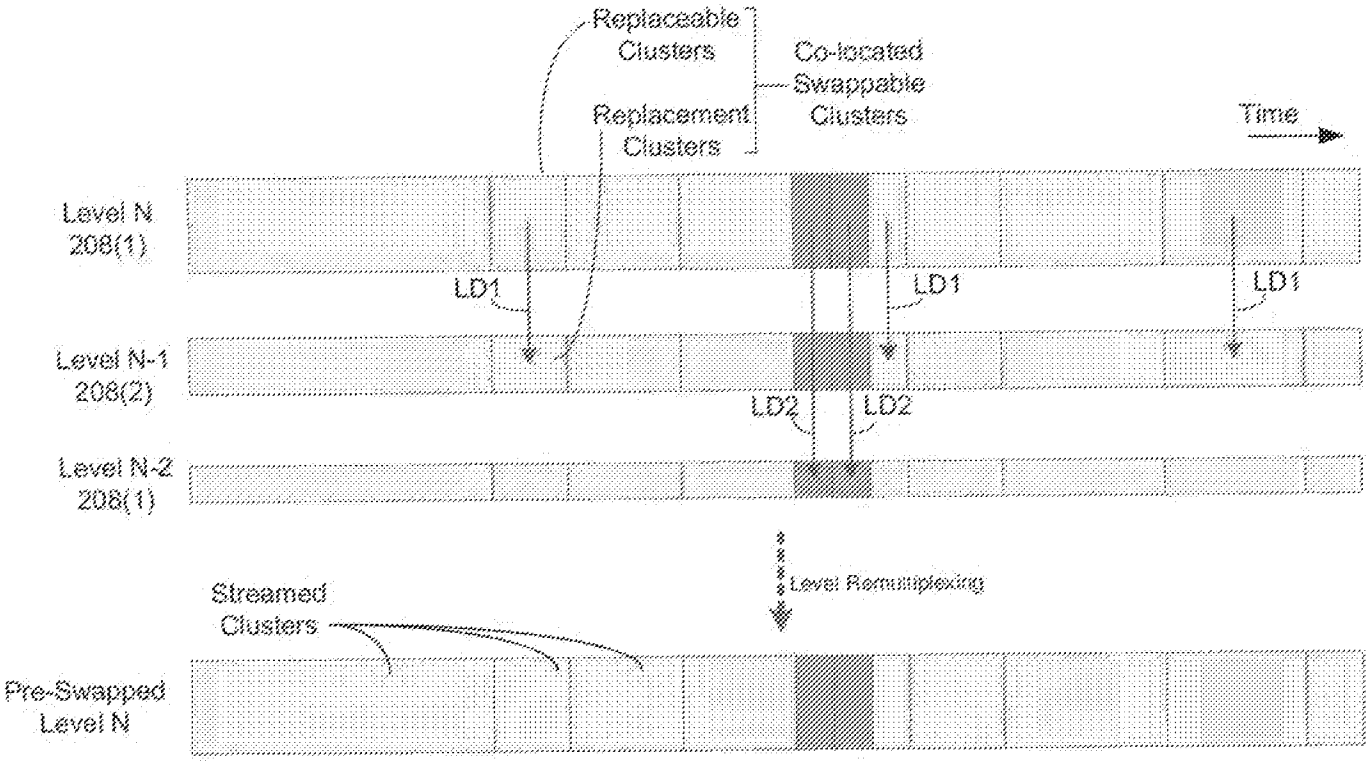
FIG. 7 is an illustration of an example of pre-swapped streaming using the container files of FIG. 2.

FIG. 7 is an illustration of an example of pre-swapped streaming using container files 208 of FIG. 2. Before streaming, swappable, co-located clusters are determined and identified across levels N, N−1, and N−2, similar to the swapping-while-streaming embodiment. The determined swaps, or level-drops, are incorporated into Level N. In other words, determined and identified replaceable sections of Level N are replaced with co-located replacement sections of Levels N−1 and N−2, as identified. As a result, a new, pre-swapped Level N file is constructed that incorporates original sections of Level N that were not indicated as replaceable, and the determined/identified replacement sections (i.e., level-drops) instead of the replaceable sections. Then, sections are streamed only from the new, pre-swapped Level N file. In pre-swapped streaming, streaming of the pre-swapped sections is transparent to client device 104, which simply requests streaming sections from the single file. The examples of FIGS. 6 and 7 may be extended over more container files at different bitrates, and thus more levels and corresponding level-drops.

Level-Drop Information

Figure 8:
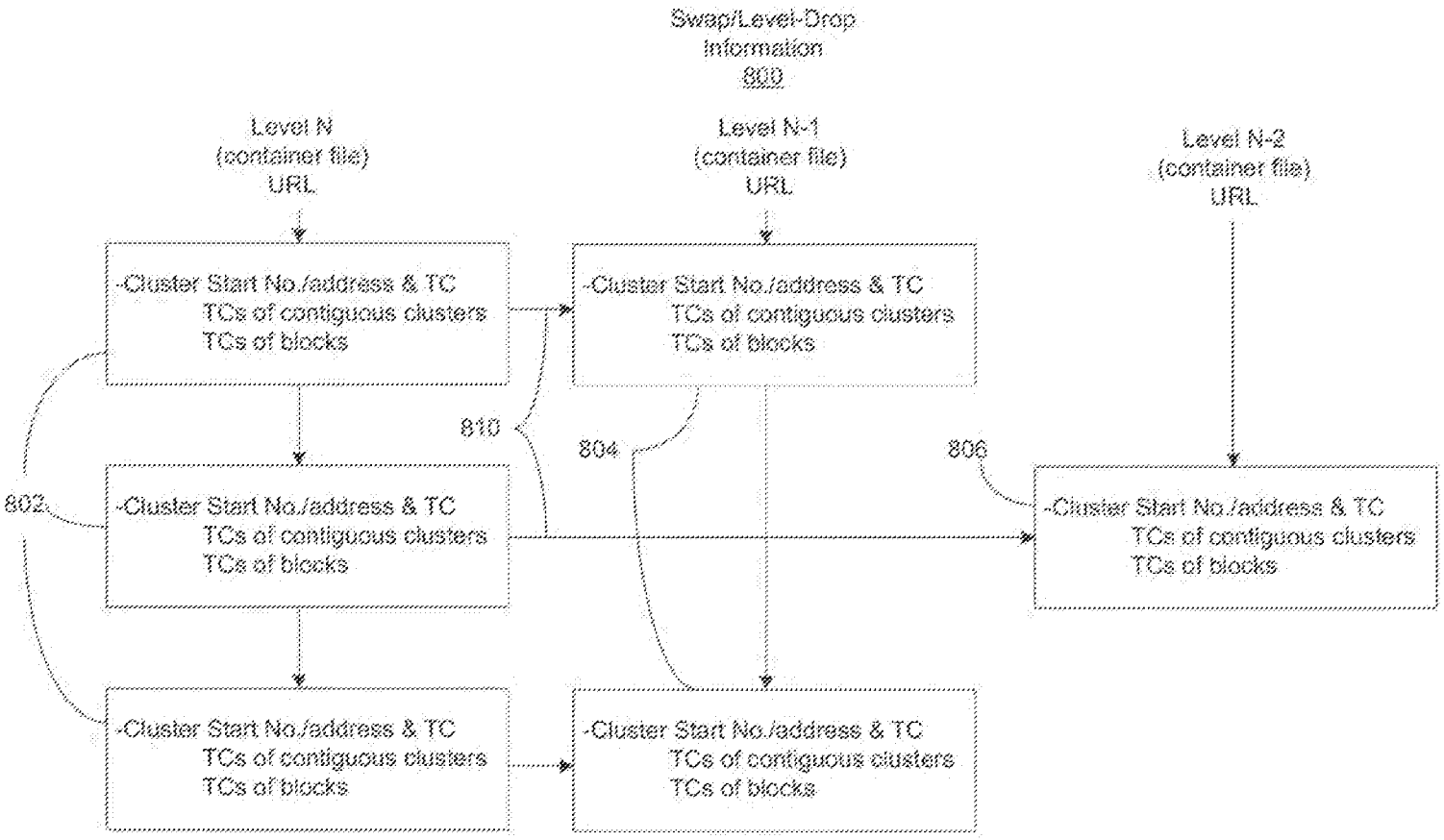
FIG. 8 is an illustration of example level-drop (or swap) information that identifies swappable, co-located clusters, as determined in cluster swapping examples of FIGS. 6 and 7.

FIG. 8 is an illustration of example level-drop (or swap) information 800 that identifies swappable, co-located clusters, as determined in the cluster swapping examples of FIGS. 6 and 7. In the manner described above, and further below, distributor 114 measures objective quality levels of sections, e.g., clusters in container files 208, and then determines swappable co-located clusters between the files based on the measured objective quality levels and a predetermined swap criterion. Distributor 114 generates level-drop information 800 as records 802, 804, and 806 that identify the determined, swappable, co-located clusters in the different files. Each record identifies swappable clusters including a starting cluster and its contiguous following clusters (if any), and also blocks within clusters. Each record may include one or more of cluster/block numbers, time codes TC, locations/addresses of the clusters in the file. Level-drop information 800 includes:

a. records 802 linked vertically to indicate determined, time-ordered, replaceable clusters among the clusters of level N, e.g., in container file 208(1);

b. records 804 linked vertically to indicate determined, time-ordered replacement clusters among the clusters of level N−1, e.g., in container file 208(2); and c. records 806 to indicate a determined replacement cluster among the clusters of level N−2, e.g., in container file 208(3).

Horizontal links 810 between records indicating co-located, replaceable and replacement clusters, e.g. between Level N and Levels N−1, N−2.

Distributor 114 may embed level-drop information 800 as in container files as metadata. Alternatively, or additionally, level-drop information may be stored as an auxiliary/metadata, level-drop file that is stored and indexed separately from the container files. Therefore, in the swapping-while-streaming embodiment, level-drop information 800 may be streamed from distributor 114, to client device 104, with streamed clusters. Alternatively, level-drop information may be streamed from the auxiliary file separately from the clusters.

In the pre-swapped embodiment, distributor 114 uses level-drop information 800 to construct a single pre-swapped file and need not be streamed to client device 104. However, client device 104 does not need the level-drop information.

Server-Client Sequence Diagram

Figure 9:
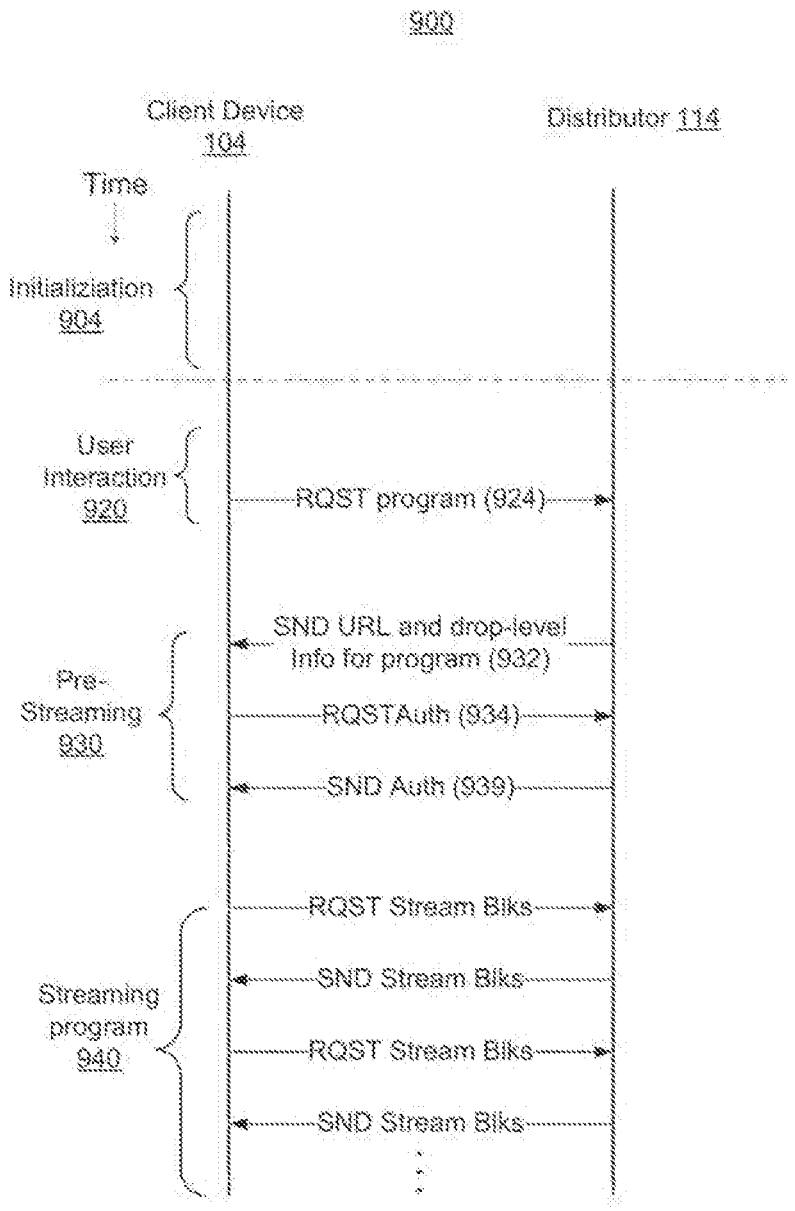
FIG. 9 is a sequence diagram of example high-level interactions between a distributor and a client device in the network environment of FIG. 1.

FIG. 9 is a sequence diagram of example high-level interactions 900 between distributor 114 and client device 104 in network environment 100. Interactions 900 progress in time from top-to-bottom in FIG. 9, as a sequence of phases beginning with an initialization/set-up phase 904 indicated in the top left-hand corner of FIG. 9.

During initialization/set-up phase 904, distributor 114 encodes video programs and stores the encoded video programs in container files for subsequent streaming to client device 104. Distributor 114 determines swappable co-located sections among the container files associated with each program based on determined objective quality measures and a predetermined swap criterion for the objective quality measures of co-located clusters in different files, as discussed above. Distributor 114 embeds drop-level information, such as information 900, in the container files, or stores the information in a separate drop-level file. In the pre-swapped embodiment, distributor 114 constructs a single file for streaming using the drop-level information and the multiple container files.

During a user interaction phase 920, client device 104 presents client-side GUIs to a user. At 924, the user selects a program from the GUIs, and, in response, client device 104 sends a request for the program to distributor 114.

During a pre-streaming phase 930, in response to the client device request (at 924), at 932, the distributor 114 sends an index of URLs associated with the requested program to client device 104. In the swapping-while-streaming embodiment, distributor 114 may also sends drop-level information if such information is provided in a separate file. Alternatively, distributor 114 may stream the drop-level information to client 104 in subsequent pre-streaming and streaming phases 930, 940, described below. The URLs may include a first URL directed to a program index (e.g., index 204 in FIG. 2) for the encoded program corresponding to the requested program and stored in distributor 114, and a second URL directed to a drop-level file, if available.

During streaming phase 940, streaming of the requested program from distributor 114 to client device 104 commences. Client device 104 determines a streaming bandwidth available at the client device and selects a stream from among the multi-bitrate streams, as indicated in the program index, that best matches the determined bandwidth. Client device 104 continually requests encoded stream sections from container files in distributor 114 based on the index information and the level-drop information (in the swapping-while-streaming embodiment), and receives the requested blocks from the distributor. In the swapping-while-streaming embodiment, the level-drop information may have been received during pre-streaming phase 930, may be streamed from a separate level-drop file, and/or may be embedded as records in the encoded video sections streamed during stage 940. Client device 104 buffers the received sections, decodes the buffered sections, and then presents the decoded sections. As streaming conditions change, client device 104 may switch to a new stream, i.e., request sections from another stream having a bitrate better suited to the changed conditions.

In yet another embodiment, level-drop information may be calculated dynamically at client device 104 instead of distributor 114 based on objective quality levels embedded in streamed sections. In this embodiment, distributor 114 embeds measured objective quality levels in corresponding encoded video sections, and streams the sections to the client device 104. Client device 104 calculates level-drop information based on the received objective quality levels, and performs swapping-while-streaming based on the dynamically calculated objective quality levels.

In both the swapping-while-streaming and pre-swapped embodiments, client device 104 intermittently requests replacement blocks having a lower encoded bitrate than the co-located replaceable block, which advantageously conserves streaming bandwidth at the client device. Each replacement block is streamed at the same its corresponding or co-located replaceable block would have been streamed had it not been replaced.

Client-Side Method

Figure 10:
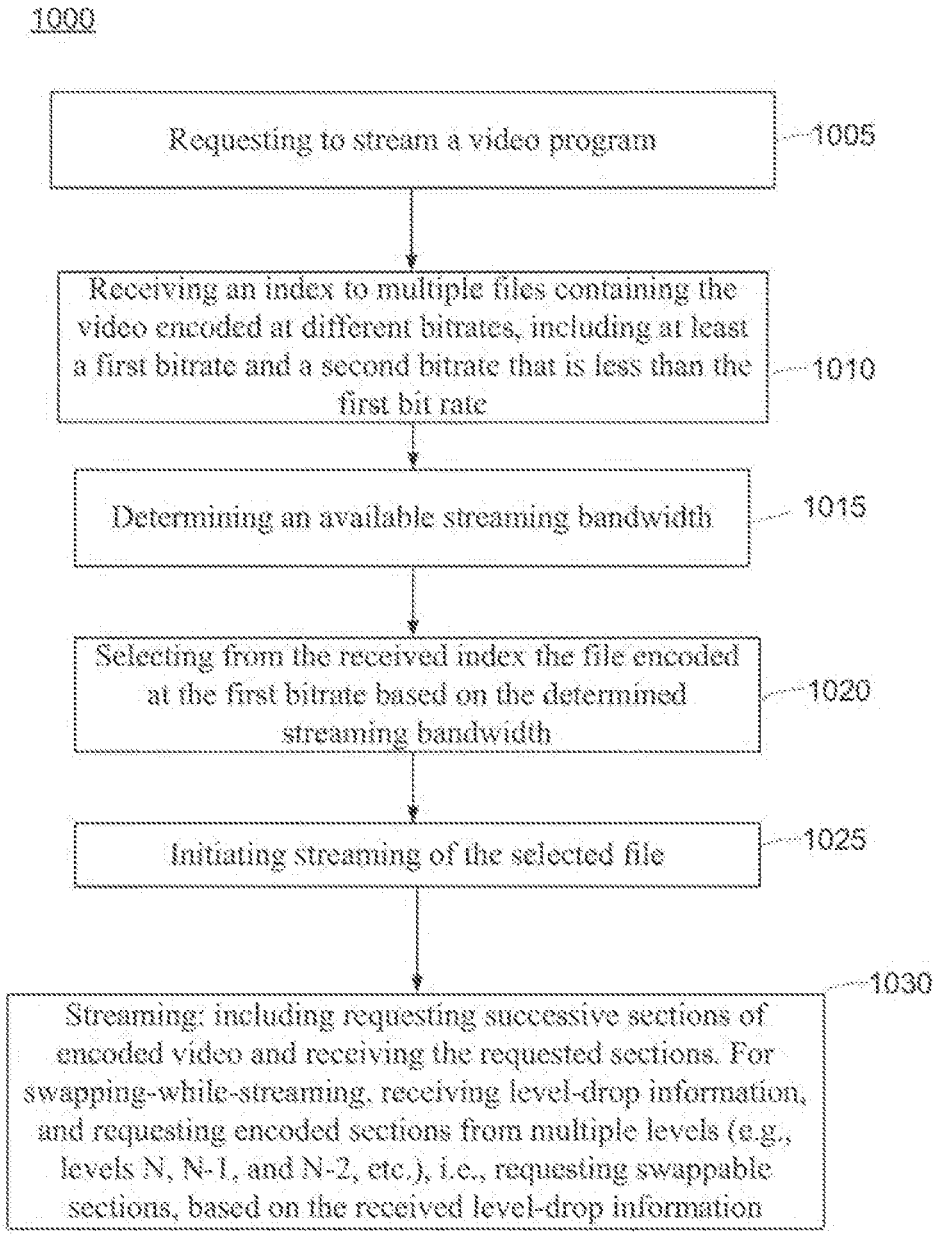
FIG. 10 is a flowchart of an example method of streaming a program, which may be performed at a client device of FIG. 1.

FIG. 10 is a flowchart of an example summary method 1000 of streaming a video program with swapped sections, which may be performed at client device 104.

1005 includes requesting to stream the video program.

1010 includes receiving an index to multiple files containing the video encoded at different bitrates, including at least a first bitrate and a second bitrate that is less than the first bit rate.

1015 includes determining an available streaming bandwidth.

1020 includes selecting from the received index the file encoded at the first bitrate based on the determined streaming bandwidth.

1025 includes initiating streaming of the selected file.

1030 includes streaming the selected file, including requesting successive sections of encoded video and receiving the requested sections. The swapping-while-streaming embodiment also includes receiving level-drop information in any number of ways, including streaming the level-drop information from an auxiliary file before or while streaming the encoded video, or as metadata embedded with the streamed encoded sections. The streaming in the swapping-while-streaming embodiment includes requesting encoded sections from multiple levels (e.g., levels N, N−1, and N−2, etc.), i.e., requesting swappable sections, based on the level-drop information, so as to conserve bandwidth.

Server/Network-Side Method

Figure 11:
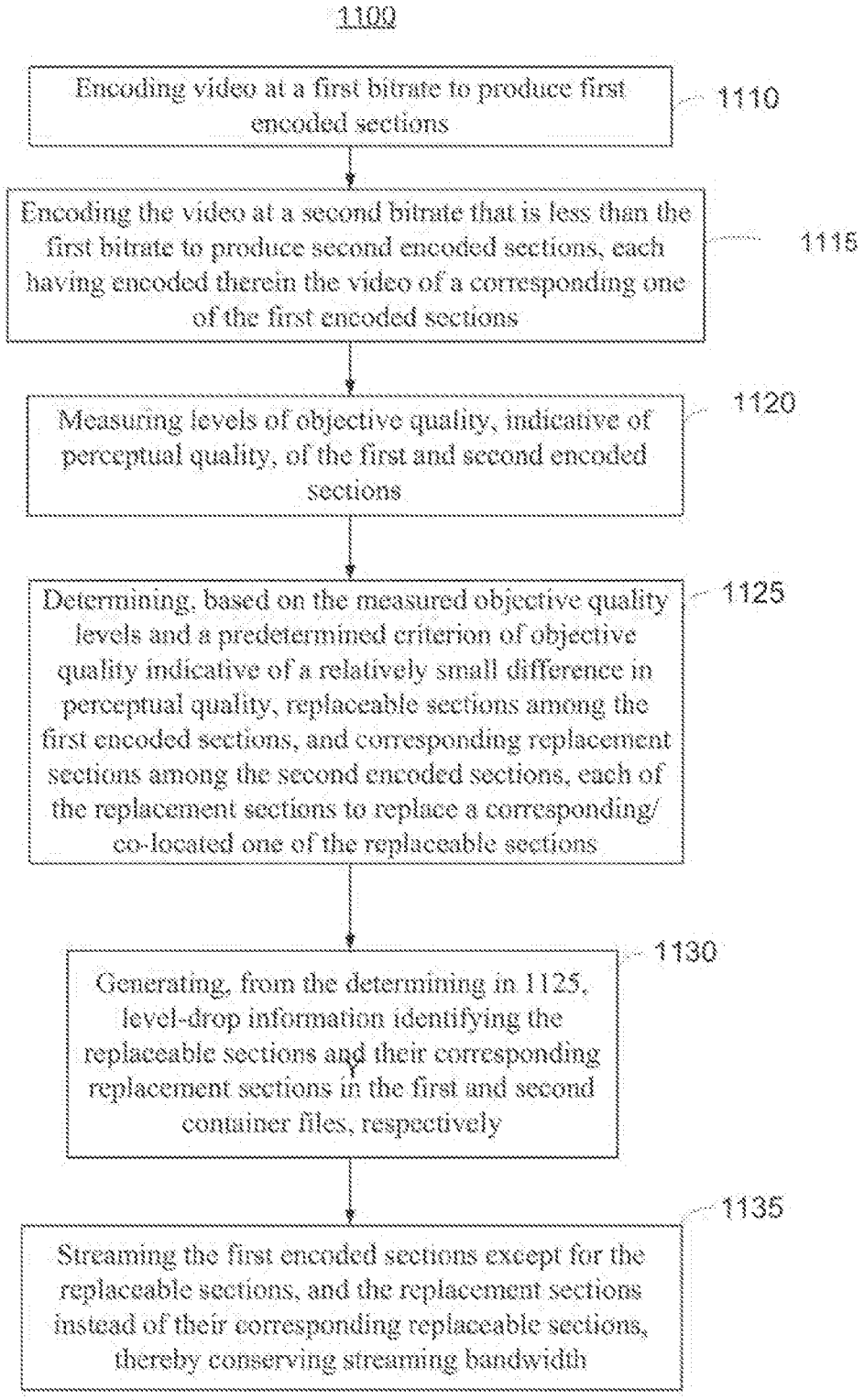
FIG. 11 is a flowchart of an example method of adaptive streaming of programs from network services to a client device, which may be performed in a distributor of the network services.

FIG. 11 is a flowchart of an example summary method 1100 of preparing, and adaptive streaming of, a video program with swapped sections from services 102 to client device 104, which may be performed in distributor 114.

1110 includes encoding video at a first bitrate to produce first encoded sections.

1115 includes encoding the video at a second bitrate that is less than the first bitrate to produce second encoded sections, each having encoded therein the video of a corresponding one of the first encoded sections. The first and second encoded sections may encode video that has the same resolution for each of the first and second encoded sections, or may encode video having different resolutions.

1120 includes measuring levels of objective quality, indicative of perceptual quality, of the first and second encoded sections.

1125 includes determining, based on the measured objective quality levels and a predetermined criterion of objective quality indicative of a relatively small difference in perceptual quality, swappable sections, including replaceable sections among the first encoded sections, and corresponding replacement sections among the second encoded sections, each of the replacement sections to replace a corresponding/co-located one of the replaceable sections. This can be thought of as declaring or identifying certain co-located sections as swappable sections if they meet the predetermined criterion. A result of the determining in 1125 is to identify sections in lower levels (e.g., N−1, N−2) which may be swapped with higher levels (e.g., N) with little or no impact to the subjective/perceptual quality of the video.

1130 includes generating, from the determining in 1125, level-drop information identifying the replaceable sections and their corresponding replacement sections in the first and second container files, respectively.

1135 includes streaming the first encoded sections except for the replaceable sections, and the replacement sections instead of their corresponding replaceable sections, thereby conserving streaming bandwidth. Each replacement section is streamed at the same time its corresponding or co-located replaceable section would have been streamed had it not been replaced.

Figure 12:
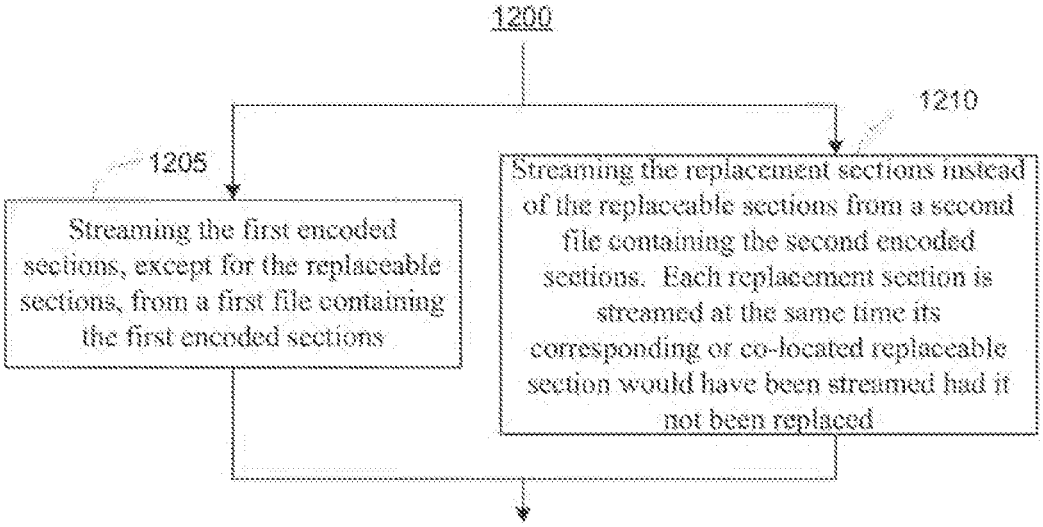
FIG. 12 is a flowchart of a method expanding on the streaming in the method of FIG. 11, corresponding to a swapping-while-streaming embodiment, in which streaming is from multiple files.

FIG. 12 is a flowchart of a method 1200 expanding on the streaming at 1140, corresponding to the swapping-while-streaming embodiment described above, in which streaming is from multiple files.

1205 includes streaming the replacement sections instead of the replaceable sections from a second file containing the second encoded sections. Each replacement section is streamed from the second file at the same time its corresponding replaceable section would have been streamed from the first file.

1210 includes streaming the replacement sections from a second file containing the second encoded sections.

Figure 13:
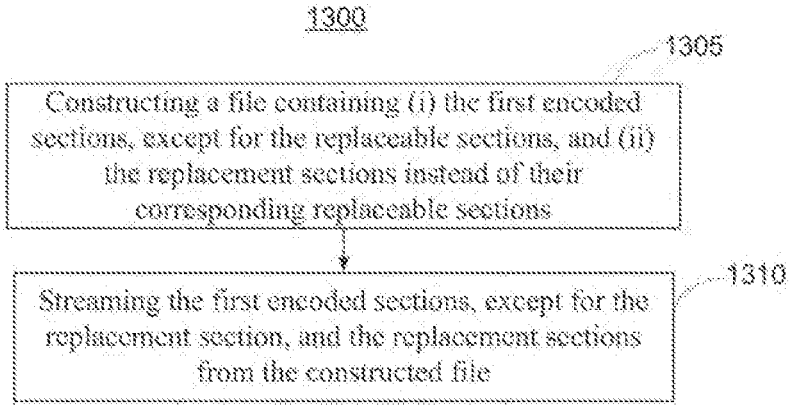
FIG. 13 is a flowchart of a method expanding on the streaming of the method of FIG. 11, corresponding to a pre-swapped embodiment, in which streaming is from a single file constructed from multiple different files.

FIG. 13 is a flowchart of a method 1300 expanding on the streaming at 1140, corresponding to the pre-swapped embodiment described above, in which streaming is from a single file constructed from multiple different bitrate files.

1305 includes constructing a file containing (i) the first encoded sections, except for the replaceable sections, and (ii) the replacement sections instead of their corresponding replaceable sections.

1310 includes streaming the first encoded sections, except for the replacement section, and the replacement sections from the constructed file.

Methods and systems disclosed herein may be implemented with respect to one or more of a variety of systems including one or more consumer systems, such as described below with reference to FIGS. 13 and 14. Methods and systems disclosed herein are not, however, limited to the examples of FIGS. 13 and 14.

Prototype Example

In a prototype example, a full length feature movie (video program) (2 hours and 25 minutes) was encoded at three bitrates: 8400 kbps, 5300 kbps, and 3500 kbps utilizing a 2-pass encoding process at a resolution of 1920×816 pixels and 24 frames per second. The PSNR for each frame was determined against the original source video, and the frames were grouped into clusters of 48 frames, corresponding to 2 seconds of video frames. From here, the lowest PSNR of the frames in a cluster was determined for each cluster, and a minimum PSNR of 40 dB was chosen as the least acceptable objective quality metric for a cluster. If the minimum PSNR for a cluster at a lower level was available, that cluster was swapped for the higher level cluster. This approach was used for 8400 kbps (using 8400 kbps, 5300 kbps, and 3500 kbps), and for 5300 kbps (using 5300 kbps and 3500 kbps). The results were an accumulative bandwidth savings of 36% for an 8400 kbps stream and 18% for a 5300 kbps stream, with minimal impact on perceptual quality.

System and Computer Block Diagrams

Figure 14:
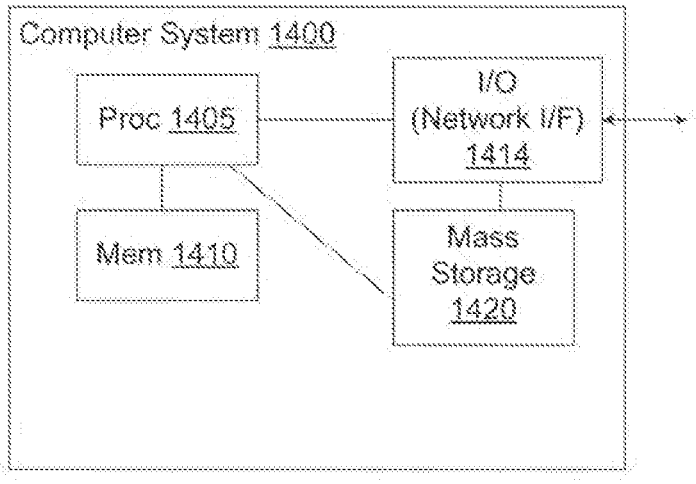
FIG. 14 is a block diagram of an example computer system corresponding to any network services, including a distributor in the network services.

FIG. 14 is a block diagram of an example computer system 1400 corresponding to any of services 102, including distributor 114. Computer system 1400, which may be, e.g., a server, includes one or more processors 1405, a memory 1410 in which instruction sets and databases for computer program applications are stored, a mass storage 1420 for storing, e.g., encoded programs and drop-level information, and an input/output (I/O) module 1415 through which components of computer system 1400 may communicate with networks 106.

Figure 15:
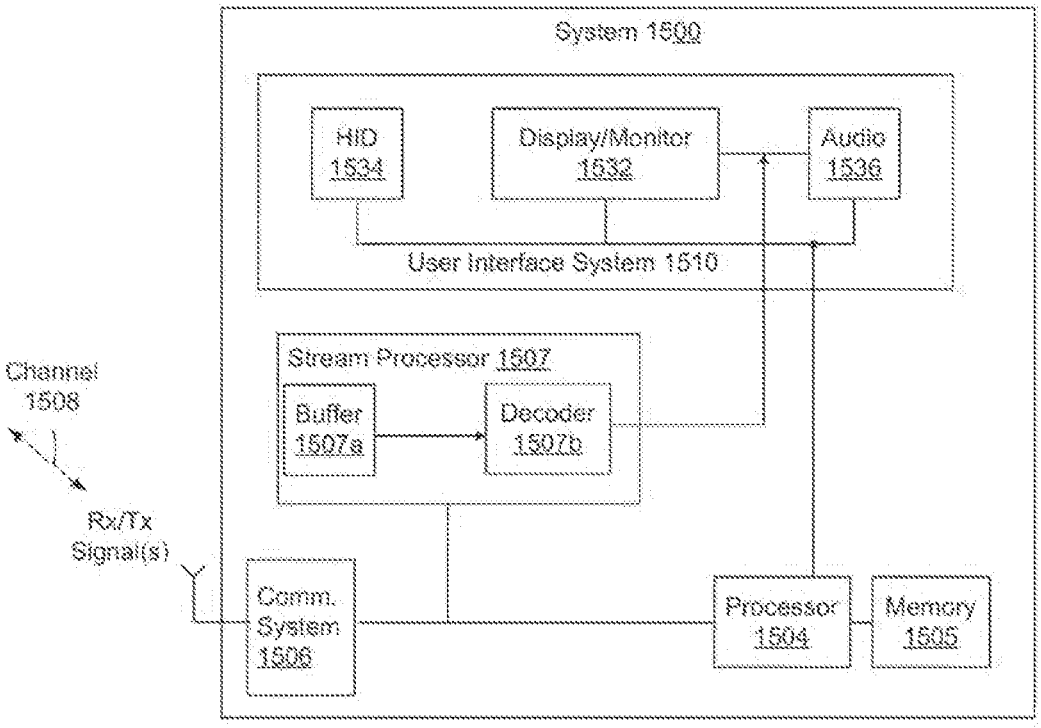
FIG. 15 is a block diagram of an example system representing a client device.

FIG. 15 is a block diagram of an example system 1500 representing, e.g., client device 104, and may be implemented, and configured to operate, as described in one or more examples herein.

System 1500 or portions thereof may be implemented within one or more integrated circuit dies, and may be implemented as a system-on-a-chip (SoC).

System 1500 may include one or more processors 1504 to execute client-side application programs stored in memory 1505.

System 1500 may include a communication system 1506 to interface between processors 1504 and communication networks, such as networks 106. Communication system 1506 may include a wired and/or wireless communication system.

System 1500 may include a stream processor 1507 to process program streams, received over channel 1508 and through communication system 1506, for presentation at system 1500. Stream processor 1507 includes a buffer 1507a to buffer portions of received, streamed programs, and a decoder 1507b to decode and decrypt the buffered programs in accordance with encoding and encryption standards, and using decryption keys. In an alternative embodiment, decoder 1507b may be integrated with a display and graphics platform of system 1500. Stream processor 1507 together with processors 1504 and memory 1505 represent a controller of system 1500. This controller includes modules to perform the functions of one or more examples described herein, such as a streaming module to stream programs through communication system 1506.

System 1500 may include a user interface system 1510.

User interface system 1510 may include a monitor or display 1532 to display information from processor 1504, such as client-side storefront GUIs.

User interface system 1510 may include a human interface device (HID) 1534 to provide user input to processor 1504. HID 1534 may include, for example and without limitation, one or more of a key board, a cursor device, a touch-sensitive device, and or a motion and/or image sensor. HID 1534 may include a physical device and/or a virtual device, such as a monitor-displayed or virtual keyboard.

User interface system 1510 may include an audio system 1536 to receive and/or output audible sound.

System 1500 may correspond to, for example, a computer system, a personal communication device, and/or a television set-top box.

System 1500 may include a housing, and one or more of communication system 1506, processors 1504, memory 1505, user interface system 1510, or portions thereof may be positioned within the housing. The housing may include, without limitation, a rack-mountable housing, a desk-top housing, a lap-top housing, a notebook housing, a net-book housing, a set-top box housing, a portable housing, and/or other conventional electronic housing and/or future-developed housing. For example, communication system 1502 may be implemented to receive a digital television broadcast signal, and system 1500 may include a set-top box housing or a portable housing, such as a mobile telephone housing.

Accordingly, system 1500 may include, but is not limited to, stand-alone equipment, such as personal computers, laptops, ultrabooks, and tablets, and mobile phones and smartphones/Personal Digital Assistants (PDAs). System 150 may also represent and include a suite of interconnected devices, such a set-top box/video game console device, a remote to operate such a device, and an audio-visual display and/or computer. System 1500 may also represent and include (digital video disk) DVD and Blu-ray players, and televisions.

Figure 16:
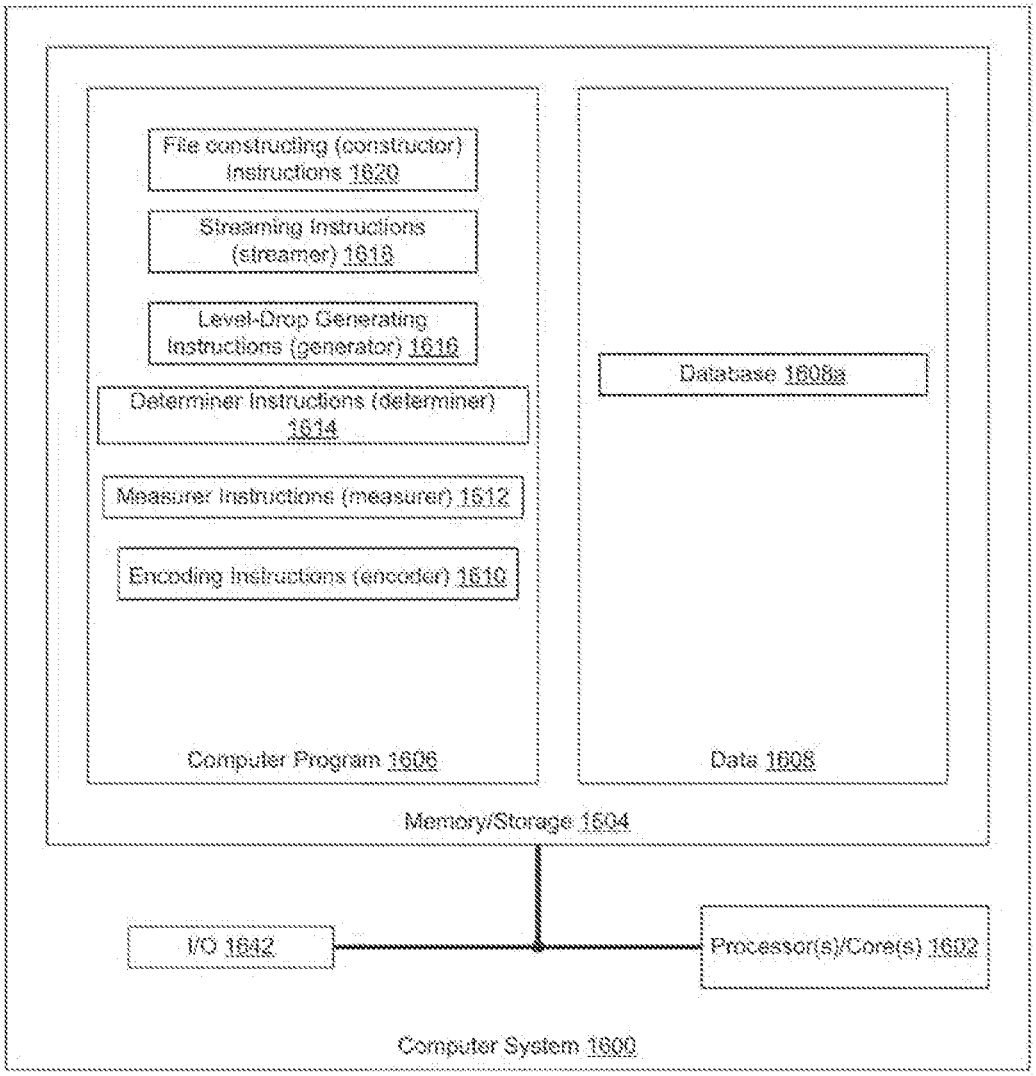
FIG. 16 is a block diagram of a computer system configured to perform processing of media/programs and adaptive streaming.

FIG. 16 is a block diagram of a computer system 1600, configured to perform processing of media/programs and adaptive streaming as described herein.

Computer system 1600 includes one or more computer instruction processing units and/or processor cores, illustrated here as processor 1602, to execute computer readable instructions, also referred to herein as computer program logic.

Computer system 1600 may include memory, cache, registers, and/or storage, illustrated here as memory 1604, which may include a non-transitory computer readable medium encoded with computer programs, illustrated here as computer program 1606.

Memory 1604 may include data 1608 to be used by processor 1602 in executing computer program 1606, and/or generated by processor 1602 during execution of computer program 1606. Data 1608 includes a database 1608a of container files and generated drop-level information for use in the methods described herein.

Computer program 1606 may include the following server-side instructions:

a. encoding instructions 1610 to cause processor 1602 to encode programs at different bitrates into different container files;
b. measurer instructions 1612 to measure objective quality levels of encoded video sections;
c. determiner instructions 1614 to cause processor 1602 to determine, based on the measured objective quality levels and a predetermined criterion of objective quality indicative of a relatively small difference in perceptual quality, swappable, co-located sections among the different container files, e.g., to determine replaceable sections and corresponding replacement sections;
d. generating instructions 1616 to generate level-drop information identifying the determined co-located swappable sections;
e. streaming instructions 1618 to stream the encoded programs, and swap the swappable sections as appropriate in the swapping-while-streaming embodiment; and
f. file constructing instructions 1620 to construct a file from multiple files containing pre-swapped sections in the pre-swapped embodiment.

Figure 17:
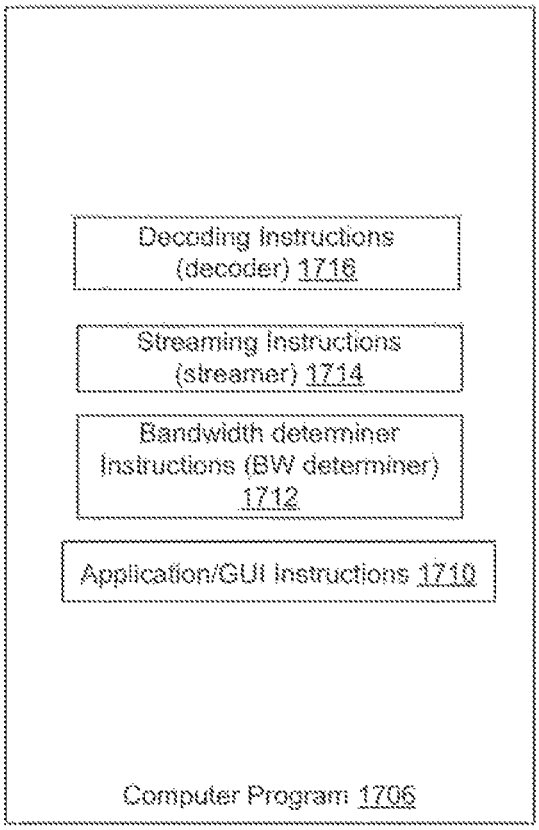
FIG. 17 is a block diagram of an example computer program hosted in a client-side computer system (e.g., client device) similar to the computer system of FIG. 14.

FIG. 17 is a block diagram of an example computer program 1706 hosted in a client-side computer system similar to computer system 1600. Computer program 1606 may include the following client-side instructions:

a. client-side application instructions 1710 to cause a client-side processor to communicate with corresponding server-side distributors, present corresponding client-side navigable GUIs, permit a user to select programs for presentation, and present streamed programs;
b. bandwidth determiner instructions 1712 to cause the processor to determine an available streaming bandwidth;
c. streaming instructions 1714 to cause the processor to initiate and maintain streaming of programs. Streaming instructions 1714 include instructions to cause the processor to identify swappable co-located sections from drop-level information received from a server-side peer and to stream the identified swappable sections accordingly; and d. decoding instructions 1716 to cause the processor to decode streamed programs.

Methods and systems disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. Software may include a computer readable medium encoded with a computer program including instructions to cause a processor to perform one or more functions in response thereto. The computer readable medium may include a transitory and/or non-transitory medium. The processor may include a general purpose instruction processor, a controller, a microcontroller, and/or other instruction-based processor.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

A method embodiment which may be performed at a client-side or a network/server-side comprises:

identifying a. replaceable sections among first sections of video encoded at a first bitrate, and b. replacement sections of the video each encoded at a bitrate that is less than the first bitrate and having encoded therein the video of a corresponding one of the replaceable sections, each replacement section and the corresponding replaceable section having respective measured levels of objective quality that meet a predetermined criterion of objective quality; and streaming the first sections of video except for the replaceable sections, and the replacement sections instead of the corresponding replaceable sections.

The method may further comprise:

decoding the streamed first sections and the replacement sections to recover the video encoded therein; and presenting the recovered video.

In the method, the predetermined criterion of objective quality, if met, may translate to an acceptable difference in perceptual quality levels of the video when decoded from the corresponding replaceable and replacement sections, and then presented.

In the method, the replacement sections may include:

first replacement sections encoded at a second bit rate that is less than the first bitrate; and second replacement sections encoded at a third bitrate that is less than the second bitrate.

In the method, the streaming may include:

streaming the first sections except for the replaceable sections from a first file containing the first sections and the replaceable sections; and streaming the replacement sections instead of the replaceable sections from a second file containing the replacement sections.

The method may further comprise:

requesting to stream the video;

receiving an index to multiple files containing the video encoded at different bitrates, including at least the first bitrate and the bitrate that is less than the first bit rate;

determining an available streaming bandwidth;

selecting the file encoded at the first bitrate based on the determined streaming bandwidth, wherein the identifying may include receiving level-drop information identifying the replaceable and replacement sections, and the streaming may include streaming the first sections except for the replaceable sections, and the replacement sections instead of the corresponding replaceable sections, based on the identifying information.

The streaming may include receiving requests for the sections of video and transmitting the requested sections of video.

The identifying may include streaming information identifying the replaceable and replacement sections in streaming sources.

In the method, each of the measured levels of objective quality may be based on a signal to noise ratio (SNR) and the predetermined criterion may be based on a one of an absolute SNR level and a relative SNR between the measured levels of objective quality.

A computer program product embodiment corresponding to the above-recited method embodiment comprises a non-transitory computer readable medium encoded with a computer program, including instructions to cause a processor to:

identify a. replaceable sections among first sections of video encoded at a first bitrate, and b. replacement sections of the video each encoded at a bitrate that is less than the first bitrate and having encoded therein the video of a corresponding one of the replaceable sections, each replacement section and the corresponding replaceable section having respective measured levels of objective quality that meet a predetermined criterion of objective quality; and stream the first sections of video except for the replaceable sections, and the replacement sections instead of the corresponding replaceable sections.

The predetermined criterion of objective quality, if met, may translate to an acceptable difference in perceptual quality levels of the video decoded from the corresponding replaceable and replacement sections, and then presented.

The replacement sections may include:

first replacement sections encoded at a second bit rate that is less than the first bitrate; and second replacement sections encoded at a third bitrate that is less than the second bitrate.

The instruction to cause the processor to stream may include instructions to cause the processor to:

stream the first sections except for the replaceable sections from a first file containing the first sections and the replaceable sections; and stream the replacement sections instead of the replaceable sections from a second file containing the replacement sections.

The instructions may further include instructions to cause the processor to:

request to stream the video;

receive an index to multiple files containing the video encoded at different bitrates, including at least the first bitrate and the bitrate that is less than the first bit rate;

determine an available streaming bandwidth;

select the file encoded at the first bitrate based on the determined streaming bandwidth; and receive the information identifying the replaceable and replacement sections, wherein the instructions to cause the processor to identify may include instructions to cause the processor to receive level-drop information that identifies the replaceable and replacement sections, and the instructions to cause the processor to stream may include instructions to cause the processor to stream the first sections except for the replaceable sections, and the replacement sections instead of the corresponding replaceable sections, based on the identifying information.

The instructions to cause the processor to stream may include instructions to cause the processor to receive requests for the sections of video and transmit the requested sections of video.

The instructions to cause the processor to identify may include instructions to cause the processor to stream information identifying the replaceable and replacement sections in streaming sources.

Each of the measured levels of objective quality may be based on a signal to noise ratio (SNR) and the predetermined criterion is based on a one of an absolute SNR level and a relative SNR between the measured levels of objective quality.

An apparatus embodiment corresponding to the above method and computer program product embodiments comprises:

a processor and memory configured to:

identify a. replaceable sections among first sections of video encoded at a first bitrate, and b. replacement sections of the video each encoded at a bitrate that is less than the first bitrate and having encoded therein the video of a corresponding one of the replaceable sections, each replacement section and the corresponding replaceable section having respective measured levels of objective quality that meet a predetermined criterion of objective quality; and stream the first sections of video except for the replaceable sections, and the replacement sections instead of the corresponding replaceable sections.

The predetermined criterion of objective quality, if met, may translate to an acceptable difference in perceptual quality levels of the video decoded from the corresponding replaceable and replacement sections, and then presented.

The replacement sections may include:

first replacement sections encoded at a second bit rate that is less than the first bitrate; and second replacement sections encoded at a third bitrate that is less than the second bitrate.

The processor and memory, configured to stream, may be configured to:

stream the first sections except for the replaceable sections from a first file containing the first sections and the replaceable sections; and stream the replacement sections instead of the replaceable sections from a second file containing the replacement sections.

The processor and memory may be further configured to:

request to stream the video;

receive an index to multiple files containing the video encoded at different bitrates, including at least the first bitrate and the bitrate that is less than the first bit rate;

determine an available streaming bandwidth;

select the file encoded at the first bitrate based on the determined streaming bandwidth, wherein the processor and memory, configured to identify, may be further configured to receive level-drop information identifying the replaceable and replacement sections, and the processor and memory, configured to stream, may be further configured to stream the first sections except for the replaceable sections, and the replacement sections instead of the corresponding replaceable sections, based on the identifying information.

The processor and memory, configured to stream, may be further configured to receive requests for the sections of video and transmit the requested sections of video.

The processor and memory, configured to identify, may be further configured to identify the replaceable and replacement sections from streamed information.

The apparatus may further comprise:

a user interface system;

a communication system to communicate with a network; and a housing to house the processor and memory, the communication system, and the user interface system.

The communication system may include a wireless communication system; and the housing includes a mobile hand-held housing to receive the processor and memory, the user interface system, the communication system, and a battery.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the examples disclosed herein.

What is claimed is:

[1. A method of encoding video, the method performed by an encoding system, comprising:

encoding video at a first bitrate to produce first encoded sections using an encoding system;

encoding the video at a second bitrate that is less than the first bitrate to produce second encoded sections using the encoding system, each having encoded therein the video of a corresponding one of the first encoded sections;

measuring levels of objective quality using the encoding system, indicative of perceptual quality, of the first and second encoded sections;

determining, based on the measured objective quality levels, replaceable sections among the first encoded sections, and replacement sections among the second encoded sections using the encoding system, each to replace a corresponding one of the replaceable sections;

generating identifying information that identifies the replaceable sections and their corresponding replacement sections in the first and second container files, respectively, using the encoding system;

streaming the identifying information using the encoding system; and in response to requests from a streaming client device that are dependent on the streamed identifying information, streaming the first encoded sections except for the replaceable sections using the encoding device, and streaming the replacement sections instead of their corresponding replaceable sections at a same time as the corresponding replaceable section would have been streamed had the corresponding replaceable section not been replaced.]

[2. The method of claim 1, wherein the determining includes:

determining, using the encoding device, if corresponding first and second encoded sections have respective measured objective quality levels that each meet a predetermined criterion of objective quality; and declaring, using the encoding device, the corresponding first and second encoded sections as corresponding replaceable and replacement sections, respectively, if the respective measured objective quality levels each meet the predetermined criterion.]

[3. The method of claim 2, wherein the predetermined criterion of objective quality is indicative of an acceptable difference in the perceptual quality levels of the corresponding replaceable and replacement sections when decoded and presented.]

[4. The method of claim 2, wherein the predetermined criterion of objective quality is one of:

a threshold level of objective quality that must be exceeded by each of the respective measured objective quality levels; and a maximum difference between the respective measured objective quality levels that must not be exceeded.]

[5. The method of claim 1, wherein:

the measuring includes measuring a signal-to-noise ratio (SNR) as the objective quality level; and the determining includes determining whether the measured objective quality levels meet a predetermined criterion that is based on one of an absolute objective quality level and a relative objective quality level.]

[6. The method of claim 1, further comprising:

constructing a first file containing the first encoded sections, including the replaceable sections;

constructing a second file containing the second encoded sections, including the replacement sections; and wherein the streaming includes:

streaming the first encoded sections, except for the replaceable sections, from the first container file; and streaming the replacement sections from the second container file.]

[7. The method of claim 1, further comprising constructing a file containing the first encoded sections, except for the replaceable sections which are replaced by their corresponding replacement sections, wherein the streaming includes streaming from the file the first encoded sections, except for the replaceable sections, and the replacement sections.]

[8. A non-transitory computer readable medium encoded with a computer program, including instructions to cause a processor to:

encode video at a first bitrate to produce first encoded sections;

encode the video at a second bitrate that is less than the first bitrate to produce second encoded sections, each having encoded therein the video of a corresponding one of the first encoded sections;

measure objective quality levels, indicative of perceptual quality levels, of the first and second encoded sections;

determine, based on the measured objective quality levels, replaceable sections among the first encoded sections, and replacement sections among the second encoded sections, each to replace a corresponding one of the replaceable sections;

generate identifying information that identifies the replaceable sections and their corresponding replacement sections in the first and second container files, respectively, using the encoding system;

stream the identifying information; and in response to requests from a playback device that are dependent on the streamed identifying information, stream the first encoded sections except for the replaceable sections, and stream the replacement sections instead of their corresponding replaceable sections at a same time as the corresponding replaceable section would have been streamed had the corresponding replaceable section not been replaced.]

[9. The computer readable medium of claim 8, wherein the instructions to cause the processor to determine include instructions to cause the processor to:

determine if corresponding first and second encoded sections have respective measured objective quality levels that each meet a predetermined criterion of objective quality; and declare the corresponding first and second encoded sections as corresponding replaceable and replacement sections, respectively, if the respective measured objective quality levels each meet the predetermined criterion.]

[10. The computer readable medium of claim 9, wherein the predetermined criterion of objective quality is indicative of an acceptable difference in the perceptual quality levels of the corresponding replaceable and replacement sections when decoded and presented.]

[11. The computer readable medium of claim 9, wherein the predetermined criterion of objective quality is one of:

a threshold level of objective quality that must be exceeded by each of the respective measured objective quality levels; and a maximum difference between the respective measured objective quality levels that must not be exceeded.]

[12. The computer readable medium of claim 8, wherein:

the instructions to cause the processor to measure include instructions to cause the processor to measure a signal-to-noise ratio (SNR) as the objective quality level; and the instructions to cause the processor to determine include instructions to cause the processor to determine whether the measured objective quality levels meet a predetermined criterion that is based on one of an absolute objective quality level and a relative objective quality level.]

[13. The computer readable medium of claim 8, wherein the instructions further include instructions to cause the processor to:

construct a first file containing the first encoded sections, including the replaceable sections;

construct a second file containing the second encoded sections, including the replacement sections; and wherein the instructions to cause the processor to stream include instructions to cause the processor to:

stream the first encoded sections, except for the replaceable sections, from the first container file; and stream the replacement sections from the second container file.]

[14. The computer readable medium of claim 8, further comprising constructing a file containing the first encoded sections, except for the replaceable sections which are replaced by their corresponding replacement sections, wherein the streaming includes streaming from the file the first encoded sections, except for the replaceable sections, and the replacement sections.]

[15. An apparatus, comprising:

a processor and memory configured to:

encode video at a first bitrate to produce first encoded sections, and encode the video at a second bitrate that is less than the first bitrate to produce second encoded sections, each having encoded therein the video of a corresponding one of the first encoded sections;

measure objective quality levels, indicative of perceptual quality levels, of the first and second encoded sections;

determine, based on the measured objective quality levels, replaceable sections among the first encoded sections, and replacement sections among the second encoded sections, each to replace a corresponding one of the replaceable sections; and generate identifying information that identifies the replaceable sections and their corresponding replacement sections in the first and second container files, respectively, using the encoding system;

stream the identifying information; and in response to requests from a playback device that are dependent on the streamed identifying information stream the first encoded sections except for the replaceable sections, and the replacement sections instead of their corresponding replaceable sections at a same time as the corresponding replaceable section would have been streamed had the corresponding replaceable section not been replaced.]

[16. The apparatus of claim 15, wherein the processor and memory, configured to determine, are further configured to:

determine if corresponding first and second encoded sections have respective measured objective quality levels that each meet a predetermined criterion of objective quality; and declare the corresponding first and second encoded sections as corresponding replaceable and replacement sections, respectively, if the respective measured objective quality levels each meet the predetermined criterion.]

[17. The apparatus of claim 16, wherein the predetermined criterion of objective quality is indicative of an acceptable difference in the perceptual quality levels of the corresponding replaceable and replacement sections when decoded and presented.]

[18. The apparatus of claim 16, wherein the predetermined criterion of objective quality is one of:

a threshold level of objective quality that must be exceeded by each of the respective measured objective quality levels; and a maximum difference between the respective measured objective quality levels that must not be exceeded.]

[19. The apparatus of claim 16, wherein:

the processor and memory, configured to measure, are further configured to measure a signal-to-noise ratio (SNR) as the objective quality level; and the processor and memory, configured to determine, are further configured to determine whether the measured objective quality levels meet a predetermined criterion that is based on one of an absolute objective quality level and a relative objective quality level.]

[20. The apparatus of claim 16, wherein:

the processor and memory are further configured to construct a first file containing the first encoded sections, including the replaceable sections, and construct a second file containing the second encoded sections, including the replacement sections; and the processor and memory, configured to stream, are further configured to stream the first encoded sections, except for the replaceable sections, from the first container file, and stream the replacement sections from the second container file.]

[21. The apparatus of claim 16, wherein:

the processor and memory are further configured to construct a file containing the first encoded sections, except for the replaceable sections which are replaced by their corresponding replacement sections; and the processor and memory, configured to stream, are further configured to stream from the file the first encoded sections, except for the replaceable sections, and the replacement sections.]

[22. The apparatus of claim 15, further comprising:

a communication system to communicate with a network; and a housing to house the processor and memory, and the communication system.]

*23. A method of encoding video, the method performed by an encoding system, comprising:*

*encoding a portion of video at a first bitrate to produce a first encoded section using an encoding system;*

*encoding the same portion of video at a second bitrate that is less than the first bitrate to produce a second encoded section using the encoding system;*

*measuring objective quality levels using the encoding system with respect to each of the first and second encoded sections;*

*selecting one of the first and second encoded sections based on the measured objective quality levels of the first and second encoded sections using the encoding system;*

*constructing a file containing the selected one of the first and second encoded sections, wherein the file contains at least one encoded section encoded at the first bitrate and at least one encoded section encoded at the second bitrate using the encoding system;*

*storing a video stream comprising the file containing the selected one of the first and second encoded sections using the encoding system; and*

*streaming, using the encoding system, the stored video stream in response to a request from a playback device.*

*24. The method of claim 23, wherein the first and second sections encode video at a same resolution.*

*25. The method of claim 23, wherein the first and second encoded sections are each a self-contained unit of media capable of being decoded without reference to any other encoded section.*

*26. The method of claim 25, wherein the video stream comprises a plurality of encoded sections including the selected one of the first and second encoded sections and each of the plurality of encoded sections encodes a fixed duration of media.*

*27. The method of claim 26, wherein the video stream comprises a plurality of encoded sections including the selected one of the first and second encoded sections and at least some of the plurality of encoded sections encode different durations of media.*

*28. The method of claim 23, wherein each of the first and second encoded sections comprises a number of successive frames of video.*

*29. The method of claim 23, wherein a measured objective quality of a section of video is at least one measure selected from the group consisting of: a signal-to-noise ratio (SNR) of the section, a peak SNR (PSNR) of the section, and a structural similarity index (SSIM) that measures a similarity between sections.*

*30. The method of claim 23, further comprising:*

*determining when the second encoded section has a respective measured objective quality level that meets a predetermined criterion for objective quality; and*

*selecting the corresponding second encoded section when the measured objective quality level meets the predetermined criterion.*

*31. The method of claim 30, wherein the predetermined criterion of objective quality is indicative of an acceptable difference in the perceptual quality levels of the corresponding first and second sections when decoded and presented.*

*32. The method of claim 30, wherein the measuring includes measuring a signal-to-noise ratio (SNR) as the objective quality level; and the determining includes determining whether the measured objective quality level meet a predetermined criterion that is based on one of an absolute objective quality level and a relative objective quality level.*

*33. A method of encoding video, the method performed by an encoding system, comprising:*

*encoding a portion of video at a first bitrate to produce a first encoded section using an encoding system, where the first encoded section is a self-contained unit of media capable of being decoded without reference to any other encoded section;*

*encoding the same portion of video at a second bitrate that is less than the first bitrate to produce a second encoded section using the encoding system, where the second encoded section is a self-contained unit of media capable of being decoded without reference to any other encoded section;*

*measuring objective quality levels with respect to each of the first and second encoded sections using the encoding system;*

*determining when the second encoded section has a respective measured objective quality level that meets a predetermined criterion for objective quality using the encoding system;*

*selecting one of the first and second encoded sections based on the measured objective quality levels of the first and second encoded sections using the encoding system, where the second encoded section is selected when the measured objective quality level of the second encoded section meets the predetermined criterion for objective quality;*

*constructing a file containing the selected one of the first and second encoded sections using the encoding system, wherein the file contains at least one encoded section encoded at the first bitrate and at least one encoded section encoded at the second bitrate;*

*storing a video stream comprising the file containing the selected one of the first and second encoded sections using the encoding system; and*

*streaming the stored video stream in response to a request from a playback device using the encoding system.*

* * * * *